United States Patent
Zhang et al.

(10) Patent No.: US 11,812,067 B2
(45) Date of Patent: Nov. 7, 2023

(54) SLICE AND TILE PARTITIONING IN VIDEO CODING

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Ye-kui Wang, San Diego, CA (US); Zhipin Deng, Beijing (CN); Kui Fan, San Diego, CA (US); Jizheng Xu, San Diego, CA (US); Hongbin Liu, Beijing (CN)

(73) Assignees: BEIJING BYTEDANCE NETWORK TECHNOLGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/892,858

(22) Filed: Aug. 22, 2022

(65) Prior Publication Data
US 2022/0417565 A1    Dec. 29, 2022

Related U.S. Application Data

(63) Continuation of application No. PCT/CN2021/077215, filed on Feb. 22, 2021.

(30) Foreign Application Priority Data

Feb. 21, 2020 (WO) ................ PCT/CN2020/076158

(51) Int. Cl.
*H04N 19/96* (2014.01)
*H04N 19/184* (2014.01)
(Continued)

(52) U.S. Cl.
CPC .......... *H04N 19/96* (2014.11); *H04N 19/119* (2014.11); *H04N 19/129* (2014.11);
(Continued)

(58) Field of Classification Search
CPC ...................................................... H04N 19/96
(Continued)

(56) References Cited

U.S. PATENT DOCUMENTS 7,965,296 B2    6/2011    Xu et al.
10,136,150 B2   11/2018   Ugur et al.
(Continued)

FOREIGN PATENT DOCUMENTS

CN    103220507 A    7/2013
CN    104054347 A    9/2014
(Continued)

OTHER PUBLICATIONS

Document: JCTVC-AC1005-v2, Boyce, J., et al., "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11 29th Meeting: Macao, CN, Oct. 19-25, 2017, 56 pages.

(Continued)

*Primary Examiner* — Yulin Sun
(74) *Attorney, Agent, or Firm* — Conley Rose, P.C.

(57) ABSTRACT

A method includes performing a conversion between a video that includes at least a video tile and a bitstream of the video according to a rule. The rule specifies that a height of a slice in the video tile in units of coding tree units is derived based on a value of a first syntax element in the bitstream indicating a number of explicitly provided slice heights for slices in the video tile that includes the slice.

20 Claims, 29 Drawing Sheets

(51) Int. Cl.
H04N 19/70 (2014.01)
H04N 19/174 (2014.01)
H04N 19/119 (2014.01)
H04N 19/129 (2014.01)
H04N 19/172 (2014.01)
H04N 19/176 (2014.01)

(52) U.S. Cl.
CPC ......... *H04N 19/172* (2014.11); *H04N 19/174* (2014.11); *H04N 19/176* (2014.11); *H04N 19/184* (2014.11); *H04N 19/70* (2014.11)

(58) Field of Classification Search
USPC .................................................. 375/240.12
See application file for complete search history.

(56) References Cited

U.S. PATENT DOCUMENTS

| | | |
|---|---|---|
| 2008/0285652 A1 | 11/2008 | Oxman |
| 2012/0230428 A1 | 9/2012 | Segall |
| 2013/0076770 A1 | 3/2013 | Cheng |
| 2014/0192899 A1 | 7/2014 | Wang |
| 2015/0016503 A1 | 1/2015 | Rapaka et al. |
| 2015/0023406 A1 | 1/2015 | Lee |
| 2015/0023409 A1* | 1/2015 | Schierl ................ H04N 19/70 375/240.02 |
| 2015/0208095 A1 | 7/2015 | Schierl |
| 2016/0286235 A1 | 9/2016 | Yamamoto |
| 2018/0063528 A1* | 3/2018 | An ...................... H04N 19/176 |
| 2018/0255295 A1 | 9/2018 | Lee et al. |
| 2019/0141338 A1 | 5/2019 | Bultje et al. |
| 2019/0327469 A1 | 10/2019 | Misra et al. |
| 2021/0120235 A1* | 4/2021 | Liao .................... H04N 19/105 |
| 2021/0250584 A1 | 8/2021 | Lee |
| 2021/0329305 A1 | 10/2021 | Sychev |
| 2022/0279179 A1* | 9/2022 | Kim ...................... H04N 19/46 |
| 2022/0329794 A1 | 10/2022 | Kotra et al. |
| 2023/0013167 A1 | 1/2023 | Hendry et al. |
| 2023/0027997 A1 | 1/2023 | Deshpande |

FOREIGN PATENT DOCUMENTS

| | | |
|---|---|---|
| CN | 107750462 A | 3/2018 |
| CN | 109076216 A | 12/2018 |
| CN | 110662053 A | 1/2020 |
| WO | 2019100060 A1 | 5/2019 |
| WO | 2020008103 A1 | 1/2020 |
| WO | 2020008106 A1 | 1/2020 |

OTHER PUBLICATIONS

Document: JVET-Q2001-VB, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 519 pages.
Document: JVET-Q2001-VC, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 508 pages.
"Series H: Audiovisual and Multimedia Systems Infrastructure of audiovisual services—Coding of moving video High efficiency video coding," Recommendation ITU-T H.265, Nov. 2019, 712 pages.
Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Document: JVET-Q2002-v3, Chen, J., et al., "Algorithm description for Versatile Video Coding and Test Model 8 (VTM8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

Retrieved from the Internet: https://vcgit.hhi.fraunhofer.de/jvet/VVCSoftware_VTM.git, VTM software, Nov. 15, 2022, 3 pages.
Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.
Document: JVET-Q0218-v1, Deshpande, S., "On Slice Signalling," Joint Video Experts Team (JVET) of ITU-T SG 16 WP 3 and ISO/IEC JTC 1/SC 29/WG 11 17th Meeting: Brussels, BE, Jan. 7-17, 2020, 9 pages.
Document: JVET-Q0119-v1, Wang, Y-K., et al., "AHG12: Cleanups on signalling of subpictures, tiles, and rectangular slices," Joint Video Experts Team (JVET) of ITU-T SG 16 WP 3 and ISO/IEC JTC 1/SC 29/WG 11 17th Meeting Brussels, BE, Jan. 7-17, 2020, 9 pages.
Document: JVET-Q0373, Do, J., et al., "AHG12: On signalling of slice,"Joint Video Experts Team (JVET) of ITU-T SG 16 WP 3 and ISO/IEC JTC 1/SC 29/WG 11 17th Meeting: Brussels, BE, Jan. 7-17, 2020, 8 pages.
Document: JVET-Q0230, Lee, B-K., et al., "AHG12: Singalling of rectangular slices," Joint Video Experts Team (JVET) of ITU-T SG 16 WP 3 and ISO/IEC JTC 1/SC 29/WG 11 17th Meeting: Brussels, BE, Jan. 7-17, 2020, 6 pages.
Document: JVET-Q0244-v2, Paluri, S., et al., "[AHG12]: Misc improvements to tile and rectangular slice signalling," Joint Video Experts Team (JVET) of ITU-T SG 16 WP 3 and ISO/IEC JTC 1/SC 29/WG 11 17th Meeting: Brussels, BE, Jan. 7-17, 2020, 7 pages.
Document: JVET-Q0164, Wu, P., "AHG9: On indication of rectangular slice height in video subpictures," Joint Video Experts Team (JVET) of ITU-T SG 16 WP 3 and ISO/IEC JTC 1/SC 29/WG 11 17th Meeting: Brussels, BE, Jan. 7-17, 2020, 12 pages.
Document: JVET-Q0225-v1, Chen, L., et al., "AHG9/AHG12: On raster scan slice within a tile," Joint Video Experts Team (JVET) of ITU-T SG 16 WP 3 and ISO/IEC JTC 1/SC 29/WG 11 17th Meeting: Brussels, BE, Jan. 7-17, 2020, 6 pages.
Document: JCTVC-V1005, Joshi, R., et al., "High Efficiency Video Coding (HEVC) Screen Content Coding: Draft 5," Joint Collaborative Team on Video Coding (JCT-VC) of ITU-T SG 16 WP 3 and ISO/IEC JTC 1/SC 29/WG 11 22nd Meeting: Geneva, CH, Oct. 15-21, 2015, 682 pages.
Document: JVET-Q0202, Hendry, "[AHG12]: On signalling of subpicture and rectangular slice," Joint Video Experts Team (JVET) of ITU-T SG 16 WP 3 and ISO/IEC JTC 1/SC 29/WG 11 17th Meeting: Brussels, BE, Jan. 7-17, 2020, 3 pages.
Document: JVET-Q0586-v2, Hendry, "AHG9/AHG12: A summary of HLS contributions on tiles and slices," Joint Video Experts Team (JVET) of ITU-T SG 16 WP 3 and ISO/IEC JTC 1/SC 29/WG 11 17th Meeting: Brussels, BE, Jan. 7-17, 2020, 8 pages.
Document: JVET-Q0120-v1, Zhang, L., et al., "AHG12: Control of loop filtering across subpicture/tile/slice boundaries," Joint Video Experts Team (JVET) of ITU-T SG 16 WP 3 and ISO/IEC JTC 1/SC 29/WG 11 17th Meeting Brussels, BE, Jan. 7-17, 2020, 11 pages.
Document: JVET-R0239, Zhang, K., et al., "AHG9: Cleanups on signalling of tiles, slices, and subpictures," Joint Video Experts Team (JVET) of ITU-T SG 16 WP 3 and ISO/IEC JTC 1/SC 29/WG 11 18th Meeting: by teleconference, Apr. 15-24, 2020, 5 pages.
Document: JVET-P0096, Hannuksela, M., et al., "AHG12: On signalling of tile and brick partitioning," Joint Video Experts Team (JVET) of ITU-T SG 16 WP 3 and ISO/IEC JTC 1/SC 29/WG 11 16th Meeting: Geneva, CH, Oct. 1-11, 2019, 5 pages.
Document: JVET-R0209, Esenlik, S., et al., "AHG12/AHG9: On signalling of rectangular slices," Joint Video Experts Team (JVET) of ITU-T SG 16 WP 3 and ISO/IEC JTC 1/SC 29/WG 11 18th Meeting: by teleconference, AT, Apr. 15-24, 2020, 7 pages.
Document: JVET-R0187, Hendry, "AHG12: On signalling for picture with one tile and multiple slices," Joint Video Experts Team (JVET) of ITU-T SG 16 WP 3 and ISO/IEC JTC 1/SC 29/WG 11 18th Meeting: by teleconference, Apr. 15-24, 2020, 5 pages.
Document: JVET-R0062-v1, Zhang, L., et al., "AHG12: A cleanup on uniform tile and rectangular slice partitioning," Joint Video Experts Team (JVET) of ITU-T SG 16 WP 3 and ISO/IEC JTC 1/SC 29/WG 11 18th Meeting: by teleconference, Apr. 15-24, 2020, 6 pages.

(56) References Cited

OTHER PUBLICATIONS

Foreign Communication From A Counterpart Application, International Application No. PCT/CN2021/077214, English Translation of International Search Report dated Jun. 2, 2021, 13 pages.
Foreign Communication From A Counterpart Application, International Application No. PCT/CN2021/077215, English Translation of International Search Report dated May 24, 2021, 10 pages.
Foreign Communication From A Counterpart Application, International Application No. PCT/CN2021/077216, English Translation of International Search Report dated May 25, 2021, 11 pages.
Foreign Communication From A Counterpart Application, International Application No. PCT/CN2021/077217, English Translation of International Search Report dated May 24, 2021, 11 pages.
Foreign Communication From A Counterpart Application, International Application No. PCT/CN2021/077220, English Translation of International Search Report dated May 24, 2021, 13 pages.
Document: JVET-Q0228, Lee, B., et al., "AHG12: Signalling of rectangular slices," Joint Video Experts Team (JVET) of ITU-T SG 16 WP 3 and ISO/IEC JTC 1/SC 29/WG 11 17th Meeting: Brussels, BE, Jan. 7-17, 2020, 5 pages.
Document: JVET-R0241, Zhang, K., et al., "AHG12: A direct signalling method of rectangular slice partitioning," Joint Video Experts Team (JVET) of ITU-T SG 16 WP 3 and ISO/IEC JTC 1/SC 29/WG 11 18th Meeting: by teleconference, Apr. 15-24, 2020, 6 pages.
Document: JVET-Q0244-v1, Paluri, S., et al., "[AHG12]: Misc improvements to tile and rectangular slice signalling," Joint Video Experts Team (JVET) of ITU-T SG 16 WP 3 and ISO/IEC JTC 1/SC 29/WG 11 17th Meeting: Brussels, BE, Jan. 7-17, 2020, 7 pages.
Document: JVET-Q2001-v6, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 489 pages.
Foreign Communication From A Related Counterpart Application, Indian Application No. 202247047758, Indian Office Action dated Dec. 29, 2022, 6 pages.
Foreign Communication From A Related Counterpart Application, European Application No. 21756578.7, Extended European Search Report dated Jan. 30, 2023, 11 pages.
Non-Final Office Action dated Jan. 31, 2023, 233 pages, U.S. Appl. No. 17/891,800, filed Aug. 19, 2022.
Foreign Communication From A Related Counterpart Application, European Application No. 21757952.3, Extended European Search Report dated Jan. 2, 2023, 11 pages.
Non-Final Office Action dated Mar. 16, 2023, 10 pages, U.S. Appl. No. 17/892,866, filed Aug. 22, 2022.
Non-Final Office Action dated Apr. 12, 2023, 10 pages, U.S. Appl. No. 17/892,746, filed Aug. 22, 2022.
Notice of Allowance dated Feb. 13, 2023, 16 pages, U.S. Appl. No. 17/892,746, filed Aug. 22, 2022.
Document: JVET-Q0244-v2 Paluri, S., et al., "[AHG12]: Misc improvements to tile and rectangular slice signalling," Joint Video Experts Team (JVET) of ITU-T SG 16 WP 3 and ISO/IEC JTC 1/SC 29/WG 11 17th Meeting: Brussels, BE, Jan. 2020, pp. 1-7.

* cited by examiner

1300

1310 performing a conversion between a video picture of a video and a bitstream of the video according to a rule, where the video picture comprises one or more slices and the rule specifies that a syntax element indicating a difference between tile indices of two rectangular slices is present in the bitstream responsive to at least one condition being satisfied, a first rectangular slice of the two rectangular slices represented as i-th rectangular slice, where i is an integer.

FIG. 13 performing a conversion between a video picture of a video and a bitstream of the video according to a rule, where the video picture comprises one or more slices, and, in case slice partitioning information of the video picture is included in a syntax structure of a video unit, a slice is represented by a top-left location and a dimension of the slice.

2200 performing a conversion between a video picture of a video and a bitstream of the video according to a rule, where the video picture comprises one or more rectangular slices and each slice comprises one or more tiles and the rule specifies that signaling between a difference between a first tile index of a first tile in $j^{th}$ rectangular slice and a second tile index of a first tile in $(i+1)^{th}$ rectangular slice is omitted in the bitstream — 2210

FIG. 22

2400

2410 — performing a conversion between a video picture of a video and a bitstream of the video, where the video picture comprises one or more sub-pictures, and the bitstream conforms to a format rule specifying that, in case a variable that specifies a subpicture identifier of a subpicture that includes a slice is present in the bitstream, there is one and only one syntax element that satisfies a condition that a second variable corresponding to the syntax element is equal to the variable

FIG. 24

2500 performing a conversion between a video picture of a video and a bitstream of the video, the video picture comprises one or more sub-pictures, and, in case a non-rectangular partitioning is applied or sub-picture information is omitted in the bitstream, two tiles in a slice have different addresses — 2510

2610: performing a conversion between a video picture of a video and a bitstream of the video according to a rule, the video picture comprises one or more tiles and the rule specifies that a syntax element is used to indicate a type of tile layout in case the one or more tiles are organized in both uniform spacing and non-uniform spacing

performing a conversion between a video picture comprising a video tile including one or more slices and a bitstream of the video according to a rule specifying that a second slice in a tile that includes a first slice in a picture has a height that is represented in a unit of coding tree units, where the first slice has a first slice index, the second slice has a second slice index that is determined based on the first slice index and a number of explicitly provided slice heights in the video tile, and the height of the second slice is determined based on the first slice index and the second slice index

performing a conversion between a video comprising a video picture including one or more tiles and a bitstream of the video, where the video picture refers to a picture parameter set and the picture parameter set conforms to a format rule specifying that the picture parameter set includes a list of column widths for N tile columns, where N is an integer, and an (N-1)-th tile column exists in the video picture and the (N-1)-th tile column has a width that is equal to an (N-1)-th entry in a list of explicitly included tile column widths plus one number of coding tree blocks

FIG. 30

performing a conversion between a video comprising a video picture including one or more tiles and a bitstream of the video, where the video picture refers to a picture parameter set and the picture parameter set conforms to a format rule specifying that the picture parameter set includes a list of row heights for N tile rows, where N is an integer and an (N-1)-th tile row exists in the video picture and the (N-1)-th tile row has a height that is equal to an (N-1)-th entry in a list of explicitly included tile row heights plus one number of coding tree blocks

FIG. 31

SLICE AND TILE PARTITIONING IN VIDEO CODING

CROSS REFERENCE TO RELATED APPLICATIONS

This application is a continuation of International Patent Application No. PCT/CN2021/077215 filed on Feb. 22, 2021, which claims the priority to and benefits of International Patent Application No. PCT/CN2020/076158, filed on Feb. 21, 2020, all of which are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of video using control information useful for decoding of the coded representation.

In one example aspect, a video processing method is disclosed. The method includes performing a conversion between a video picture of a video and a bitstream of the video according to a rule. The video picture comprises one or more slices and the rule specifies that a syntax element indicating a difference between tile indices of two rectangular slices is present in the bitstream responsive to at least one condition being satisfied. A first rectangular slice of the two rectangular slices is represented as i-th rectangular slice, where i is an integer.

In another example aspect, a video processing method is disclosed. The method includes performing a conversion between a video picture of a video and a bitstream of the video according to a rule. The video picture comprises one or more sub-pictures and each sub-picture comprises one or more rectangular slices. The rule specifies that a slice index at a sub-picture level for each rectangular slice in each sub-picture is derived to determine a number of coding tree units in each slice.

In another example aspect, a video processing method is disclosed. The method includes determining, for a conversion between a video picture of a video that comprises one or more sub-pictures and a bitstream of the video, a mapping relationship between a sub-picture-level slice index of a slice in a sub-picture and a picture level slice index of the slice. The method also includes performing the conversion based on the determining.

In another example aspect, a video processing method is disclosed. The method includes performing a conversion between a video picture of a video and a bitstream of the video according to a rule. The video picture comprises one or more sub-pictures and the rule specifies that a tile of the video is positioned entirely within a single sub-picture of the video picture.

In another example aspect, a video processing method is disclosed. The method includes performing a conversion between a video picture of a video and a bitstream of the video, wherein the video picture comprises one or more sub-pictures. The bitstream conforms to a format rule specifying that information of partitioning a picture is included in a syntax structure associated with the picture.

In another example aspect, a video processing method is disclosed. The method includes determining, for a conversion between a video picture of a video that comprises one or more slices having a non-rectangular shape and a bitstream of the video, slice partitioning information of the video picture. The method also includes performing the conversion based on the determining.

In another example aspect, a video processing method is disclosed. The method includes performing a conversion between a video picture of a video that comprises one or more slices and a bitstream of the video according to a rule. The rule specifies that a number of slices in the video picture is equal to or greater than a minimum number of slices determined based on whether rectangular partitioning or non-rectangular partitioning is applied to the video picture.

In another example aspect, a video processing method is disclosed. The method includes performing a conversion between a video picture of a video and a bitstream of the video according to a rule. The video picture comprises one or more slices. In case slice partitioning information of the video picture is included in a syntax structure of a video unit, a slice is represented by a top-left location and a dimension of the slice.

In another example aspect, a video processing method is disclosed. The method includes performing a conversion between a video picture of a video and a bitstream of the video according to a rule. The video picture comprises one or more sub-pictures and each sub-picture comprises one or more slices. The rule specifies a manner by which partitioning information of the one or more slices in each sub-picture is present in the bitstream.

In another example aspect, a video processing method is disclosed. The method includes performing a conversion between a video picture of a video and a bitstream of the video according to a rule. The video picture comprises one or more rectangular slices and each slice comprises one or more tiles. The rule specifies that signalling between a difference between a first tile index of a first tile in ith rectangular slice and a second tile index of a first tile in (i+1)th rectangular slice is omitted in the bitstream.

In another example aspect, a video processing method is disclosed. The method includes determining, for a conversion between a video picture of a video and a bitstream of the video, that information for deriving a number of columns of tiles and a number of rows of tiles in the video picture is conditionally included in the bitstream responsive to a relationship between a dimension of the video picture and a dimension of a coding tree block. The method also includes performing the conversion based on the determining.

In another example aspect, a video processing method is disclosed. The method includes performing a conversion between a video picture of a video and a bitstream of the video. The video picture comprises one or more sub-pictures. The bitstream conforms to a format rule specifying that, in case a variable that specifies a subpicture identifier of a subpicture that includes a slice is present in the bitstream, there is one and only one syntax element that satisfies a condition that a second variable corresponding to the syntax element is equal to the variable.

In another example aspect, a video processing method is disclosed. The method includes performing a conversion between a video picture of a video and a bitstream of the video. The video picture comprises one or more sub-pictures. In case a non-rectangular partitioning is applied or sub-picture information is omitted in the bitstream, two tiles in a slice have different addresses.

In another example aspect, a video processing method is disclosed. The method includes performing a conversion between a video picture of a video and a bitstream of the video according to a rule. The video picture comprises one or more tiles. The rule specifies that a syntax element is used to indicate a type of tile layout in case the one or more tiles are organized in both uniform spacing and non-uniform spacing.

In another example aspect, a video processing method is disclosed. The method includes performing a conversion between a video picture of a video and a bitstream of the video according to a rule. The rule specifies that whether or how a Merge Estimation Region (MER) size is processed in the conversion is conditioned on a minimum allowed coding block size.

In another example aspect, a video processing method is disclosed. The method includes performing a conversion between a video that comprises at least a video tile and a bitstream of the video according to a rule. The rule specifies that a height of a slice in the video tile in units of coding tree units is derived based on a value of a first syntax element in the bitstream indicating a number of explicitly provided slice heights for slices in the video tile that includes the slice.

In another example aspect, a video processing method is disclosed. The method includes performing a conversion between a video comprising a video picture comprising a video tile including one or more slices and a bitstream of the video according to a rule. The rule specifies that a second slice in a tile that includes a first slice in a picture has a height that is represented in a unit of coding tree units. The first slice has a first slice index, and the second slice has a second slice index that is determined based on the first slice index and a number of explicitly provided slice heights in the video tile. The height of the second slice is determined based on the first slice index and the second slice index.

In another example aspect, a video processing method is disclosed. The method includes performing a conversion between a video comprising a video picture including one or more tiles and a bitstream of the video. The video picture refers to a picture parameter set and the picture parameter set conforms to a format rule specifying that the picture parameter set includes a list of column widths for N tile columns, where N is an integer. An (N−1)-th tile column exists in the video picture and the (N−1)-th tile column has a width that is equal to an (N−1)-th entry in a list of explicitly included tile column widths plus one number of coding tree blocks.

In another example aspect, a video processing method is disclosed. The method includes performing a conversion between a video comprising a video picture including one or more tiles and a bitstream of the video. The video picture refers to a picture parameter set and the picture parameter set conforms to a format rule specifying that the picture parameter set includes a list of row heights for N tile rows, where N is an integer. An (N−1)-th tile row exists in the video picture and the (N−1)-th tile row has a height that is equal to an (N−1)-th entry in a list of explicitly included tile row heights plus one number of coding tree blocks.

In another example aspect, a video processing method is disclosed. The method includes performing a conversion between a video comprising one or more video pictures, wherein each video picture comprises one or more subpictures that comprise one or more slices and a coded representation of a video, wherein the coded representation conforms to a format rule; wherein the format rule specifies that, in case that a rectangular slices mode is enabled for a video picture, then a picture-level slice index for each slice in each subpicture in the video picture is derived without explicit signalling in the coded representation; and wherein the format rule specifies that a number of coding tree units in each slice is derivable from the picture-level slice index.

In another example aspect, another video processing method is disclosed. The method includes performing a conversion between a video comprising one or more video pictures, wherein each video picture comprises one or more subpictures that comprise one or more slices and a coded representation of a video, wherein the coded representation conforms to a format rule; wherein the format rule specifies that a subpicture level slice index is derivable based on information in the coded representation without signalling the sub-picture level slice index in the coded representation.

In another example aspect, another video processing method is disclosed. The method includes performing a conversion between a video comprising one or more video pictures, wherein each video picture comprises one or more subpictures and/or one or more tiles and a coded representation of a video, wherein the coded representation conforms to a format rule; and wherein the conversion conforms to a constraint rule.

In another example aspect, another video processing method is disclosed. The method includes performing a conversion between a video comprising one or more video pictures, wherein each video picture comprises one or more tiles and/or one or more slices; wherein the coded representation conforms to a format rule; wherein the format rule specifies that a field at a video picture level carries information about portioning of slices and/or tiles in the video picture.

In another example aspect, another video processing method is disclosed. The method includes performing a conversion between a video comprising one or more pictures and a coded representation of the video, wherein the conversion conforms to a partitioning rule that a minimum number of slices in which a video picture is partitioned is a function of whether rectangular partitioning is used for partitioning the video picture.

In another example aspect, another video processing method is disclosed. The method includes performing a conversion between a video slice of a video region of a video and a coded representation of the video; wherein the coded representation conforms to a format rule; wherein the format rule specifies that the coded representation signals the video slice based on a top-left location of the video slice and wherein the format rule specifies that the coded representation signals a height and/or a width of the video slice in partitioning information that is signalled at a video unit level.

In another example aspect, another video processing method is disclosed. The method includes performing a conversion between a video comprising video pictures and a coded representation of the video; wherein the coded representation conforms to a format rule; wherein the format rule specifies to omit signalling a difference between a tile index of a first tile in a rectangular slice and a tile index of a first tile in a next rectangular slice.

In another example aspect, another video processing method is disclosed. The method includes performing a conversion between a video and a coded representation of the video, wherein the coded representation conforms to a format rule, wherein the format rule specifies that a relationship between a width of a video picture and a size of a coding tree unit controls signalling of information used for deriving a number of tile columns or rows in the video picture.

In another example aspect, another video processing method is disclosed. The method includes performing a conversion between a video comprising one or more video pictures and a coded representation of the video, wherein the coded representation conforms to a format rule, wherein the format rule specifies that a tile layout information is included in the coded representation for a video picture that comprises uniform spacing tiles and non-uniform spacing tiles.

In yet another example aspect, a video encoder apparatus is disclosed. The video encoder comprises a processor configured to implement the above-described methods.

In yet another example aspect, a video decoder apparatus is disclosed. The video decoder comprises a processor configured to implement the above-described methods.

In yet another example aspect, a computer readable medium having code stored thereon is disclosed. The code embodies one of the methods described herein in the form of processor-executable code.

These, and other, features are described throughout the present document.

BRIEF DESCRIPTION OF DRAWINGS

FIG. 13 is flowchart representation of a method for video processing according to various embodiments of the present disclosure.

FIG. 22 is flowchart representation of another method for video processing according to various embodiments of the present disclosure.

FIG. 24 is flowchart representation of another method for video processing according to various embodiments of the present disclosure.

FIG. 25 is flowchart representation of another method for video processing according to various embodiments of the present disclosure.

FIG. 26 is flowchart representation of another method for video processing according to various embodiments of the present disclosure.

FIG. 29 is flowchart representation of another method for video processing according to various embodiments of the present disclosure.

FIG. 30 is flowchart representation of another method for video processing according to various embodiments of the present disclosure.

FIG. 31 is flowchart representation of another method for video processing according to various embodiments of the present disclosure.

DETAILED DESCRIPTION

Figure 2:
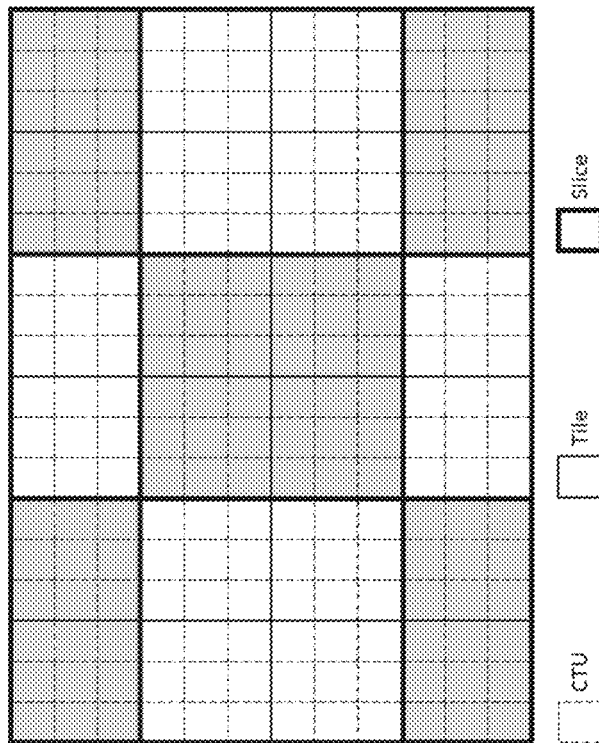
FIG. 2 shows an example of rectangular slice partitioning of a picture, where the picture is divided into 24 tiles (6 tile columns and 4 tile rows) and 9 rectangular slices.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Overview

This document is related to video coding technologies. Specifically, it is about signalling of subpictures, tiles, and slices. The ideas may be applied individually or in various combination, to any video coding standard or non-standard video codec that supports multi-layer video coding, e.g., the being-developed Versatile Video Coding (VVC).

2. Abbreviations

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DPB Decoded Picture Buffer
DPS Decoding Parameter Set
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
JEM Joint Exploration Model
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RB SP Raw Byte Sequence Payload
SEI Supplemental Enhancement Information
SPS Sequence Parameter Set
SVC Scalable Video Coding
VCL Video Coding Layer
VPS Video Parameter Set
VTM VVC Test Model
VUI Video Usability Information
VVC Versatile Video Coding

3. Initial Discussion

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Picture Partitioning Schemes in HEVC

HEVC includes four different picture partitioning schemes, namely regular slices, dependent slices, tiles, and Wavefront Parallel Processing (WPP), which may be applied for Maximum Transfer Unit (MTU) size matching, parallel processing, and reduced end-to-end delay.

Regular slices are similar as in H.264/AVC. Each regular slice is encapsulated in its own NAL unit, and in-picture prediction (intra sample prediction, motion information prediction, coding mode prediction) and entropy coding dependency across slice boundaries are disabled. Thus, a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slice-based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units, to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching.

However, if MTU size matching is required, regular slices can be used with WPP, with certain coding overhead.

Tiles define horizontal and vertical boundaries that partition a picture into tile columns and rows. Tile column runs from the top of a picture to the bottom of the picture. Likewise, tile row runs from the left of the picture to the right of the picture. The number of tiles in a picture can be derived simply as number of tile columns multiply by number of tile rows.

The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included into individual NAL units (same as WPP in this regard); hence tiles may not be used for MTU size matching. Each tile can be processed by one processor/core, and the inter-processor/inter-core communication required for in-picture prediction between processing units decoding neighboring tiles is limited to conveying the shared slice header in cases a slice is spanning more than one tile, and loop filtering related sharing of reconstructed samples and metadata. When more than one tile or WPP segment is included in a slice, the entry point byte offset for each tile or WPP segment other than the first one in the slice is signalled in the slice header.

For simplicity, restrictions on the application of the four different picture partitioning schemes have been specified in HEVC. A given coded video sequence may not include both tiles and wavefronts for most of the profiles specified in HEVC. For each slice and tile, either or both of the following conditions may be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it may end in the same CTB row.

A recent amendment to HEVC is specified in the JCT-VC output document JCTVC-AC1005, J. Boyce, A. Ramasubramonian, R. Skupin, G. J. Sullivan, A. Tourapis, Y.-K. Wang (editors), "HEVC Additional Supplemental Enhancement Information (Draft 4)," Oct. 24, 2017, publicly available herein: http://phenix.int-evry.fr/jct/doc_end_user/documents/29_Macau/wg11/JCTVC-AC1005-v2.zip. With this amendment included, HEVC specifies three MCTS-related SEI (supplemental enhancement information) messages, namely temporal MCTSs SEI message, MCTSs extraction information set SEI message, and MCTSs extraction information nesting SEI message.

The temporal MCTSs SEI message indicates existence of MCTSs in the bitstream and signals the MCTSs. For each MCTS, motion vectors are restricted to point to full-sample locations inside the MCTS and to fractional-sample locations that require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for an MCTS set. The information consists of a number of extraction information sets, each defining a number of MCTS sets and containing RBSP bytes of the replacement VPSs, SPSs, and PPSs to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment_in_pic_flag and slice_segment_address) typically would need to have different values.

3.2. Partitioning of Pictures in VVC

In VVC, a picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster scan slice mode and the rectangular slice mode. In the raster scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

Figure 1:
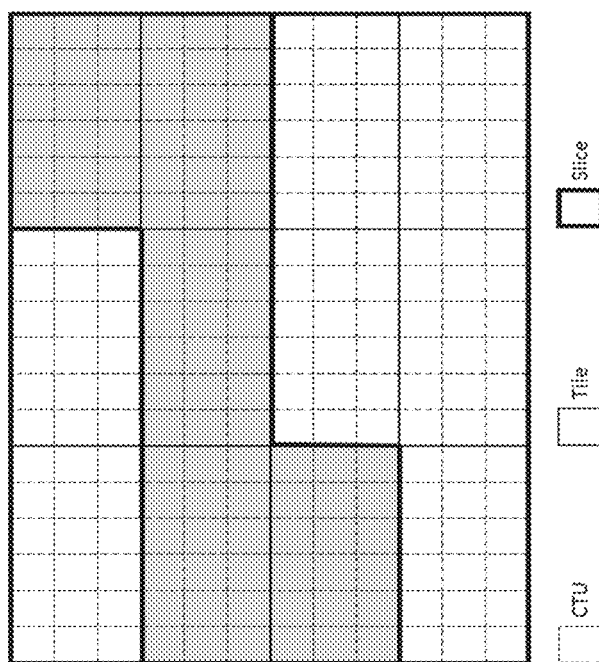
FIG. 1 shows an example of raster scan slice partitioning of a picture, where the picture is divided into 12 tiles and 3 raster scan slices.

FIG. 1 shows an example of raster scan slice partitioning of a picture, where the picture is divided into 12 tiles and 3 raster scan slices.

FIG. 2 shows an example of rectangular slice partitioning of a picture, where the picture is divided into 24 tiles (6 tile columns and 4 tile rows) and 9 rectangular slices.

Figures 3, 4:
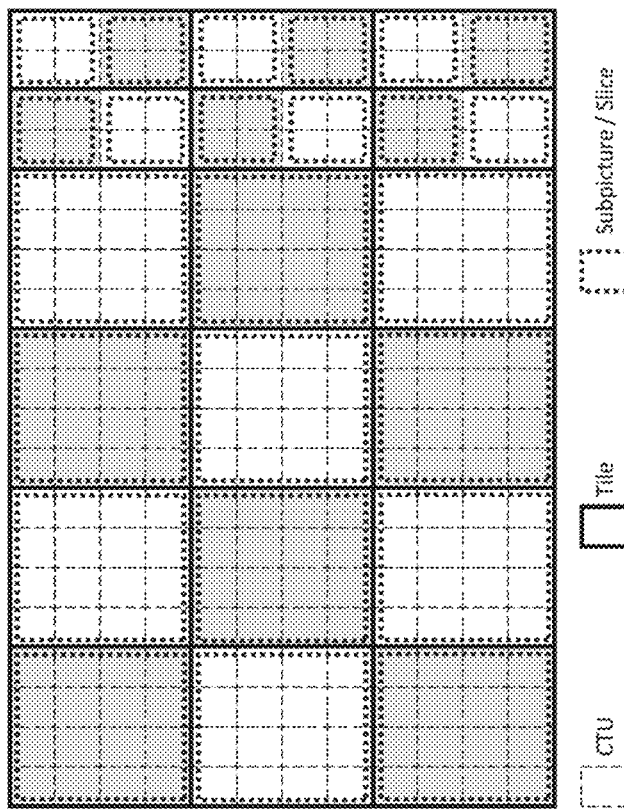
FIG. 3 shows an example of a picture partitioned into tiles and rectangular slices, where the picture is divided into 4 tiles (2 tile columns and 2 tile rows) and 4 rectangular slices.
FIG. 4 shows a picture that is partitioned into 15 tiles, 24 slices and 24 subpictures.

FIG. 3 shows an example of a picture partitioned into tiles and rectangular slices, where the picture is divided into 4 tiles (2 tile columns and 2 tile rows) and 4 rectangular slices.

FIG. 4 shows an example of subpicture partitioning of a picture, where a picture is partitioned into 18 tiles, 12 on the left-hand side each covering one slice of 4 by 4 CTUs and 6 tiles on the right-hand side each covering 2 vertically-stacked slices of 2 by 2 CTUs, altogether resulting in 24 slices and 24 subpictures of varying dimensions (each slice is a subpicture).

3.3. Signalling of SPS/PPS/Picture Header/Slice Header in VVC 7.3.2.3 Sequence Parameter Set RBSP Syntax

| | Descriptor |
|---|---|
| seq_parameter_set_rbsp( ) { | |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |

-continued

| | Descriptor |
|---|---|
| gdr_enabled_flag | u(1) |
| chroma_format_idc | u(2) |
| if( chroma_format_idc == 3 ) | |
|   separate_colour_plane_flag | u(1) |
| res_change_in_clvs_allowed_flag | u(1) |
| pic_width_max_in_luma_samples | ue(v) |
| pic_height_max_in_luma_samples | ue(v) |
| sps_conformance_window_flag | u(1) |
| if( sps_conformance_window_flag ) { | |
|   sps_conf_win_left_offset | ue(v) |
|   sps_conf_win_right_offset | ue(v) |
|   sps_conf_win_top_offset | ue(v) |
|   sps_conf_win_bottom_offset | ue(v) |
| } | |
| sps_log2_ctu_size_minus5 | u(2) |
| subpic_info_present_flag | u(1) |
| if( subpic_info_present_flag ) { | |
|   sps_num_subpics_minus1 | ue(v) |
|   sps_independent_subpics_flag | u(1) |
|   for( i = 0; sps_num_subpics_minus1 > 0&& i <= sps_num_subpics_minus1; i++ ) { | |
|     if( i > 0 && pic_width_max_in_luma_samples > CtbSizeY ) | |
|       subpic_ctu_top_left_x[ i ] | u(v) |
|     if( i > 0 && pic_height_max_in_luma_samples > CtbSizeY ) { | |
|       subpic_ctu_top_left_y[ i ] | u(v) |
|     if( i < sps_num_subpics_minus1 && | |
|       pic_width_max_in_luma_samples > CtbSizeY ) | |
|       subpic_width_minus1[ i ] | u(v) |
|     if( i < sps_num_subpics_minus1 && | |
|       pic_height_max_in_luma_samples > CtbSizeY ) | |
|       subpic_height_minus1[ i ] | u(v) |
|     if( !sps_independent_subpics_flag) { | |
|       subpic_treated_as_pic_flag[ i ] | u(1) |
|       loop_filter_across_subpic_enabled_flag[ i ] | u(1) |
|     } | |
|   } | |
|   sps_subpic_id_len_minus1 | ue(v) |
|   subpic_id_mapping_explicitly_signalled_flag | u(1) |
|   if( subpic_id_mapping_explicitly_signalled_flag ) { | |
|     subpic_id_mapping_in_sps_flag | u(1) |
|     if( subpic_id_mapping_in_sps_flag ) | |
|       for( i = 0; i <= sps_num_subpics_minus1; i++ ) | |
|         sps_subpic_id[ i ] | u(v) |
|   } | |
| } | |
| bit_depth_minus8 | ue(v) |
| sps_entropy_coding_sync_enabled_flag | u(1) |
| if( sps_entropy_coding_sync_enabled_flag ) | |
|   sps_wpp_entry_point_offsets_present_flag | u(1) |
| sps_weighted_pred_flag | u(1) |
| sps_weighted_bipred_flag | u(1) |
| log2_max_pic_order_cnt_lsb_minus4 | u(4) |
| sps_poc_msb_flag | u(1) |
| if( sps_poc_msb_flag ) | |
|   poc_msb_len_minus1 | ue(v) |
| num_extra_ph_bits_bytes | u(2) |
|   extra_ph_bits_struct( num_extra_ph_bits_bytes ) | |
| num_extra_sh_bits_bytes | u(2) |
|   extra_sh_bits_struct( num_extra_sh_bits_bytes ) | |
| if( sps_max_sublayers_minus1 > 0 ) | |
|   sps_sublayer_dpb_params_flag | u(1) |
| if( sps_ptl_dpb_hrd_params_present_flag ) | |
|   dpb_parameters( sps_max_sublayers_minus1, sps_sublayer_dpb_params_flag ) | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|   num_ref_pic_lists_in_sps[i ] | ue(v) |
|   for( j = 0; j < num_ref_pic_lists_in_sps[ i ]; j++) | |
|     ref_pic_list_struct( i, j ) | |
| } | |
| if( ChromaArrayType != 0 ) | |
|   qtbtt_dual_tree_intra_flag | u(1) |
| log2_min_luma_coding_block_size_minus2 | ue(v) |
| partition_constraints_override_enabled_flag | u(1) |

|  | Descriptor |
|---|---|
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_max_luma_transform_size_64_flag | u(1) |
| if( ChromaArrayType != 0 ) { | |
|   sps_joint_cbcr_enabled_flag | u(1) |
|   same_qp_table_for_chroma | u(1) |
|   numQpTables = same_qp_table_for_chroma ? 1 : ( | |
| sps_joint_cbcr_enabled_flag ? 3 : 2 ) | |
|   for( i = 0; i < numQpTables; i++ ) { | |
|     qp_table_start_minus26[ i ] | se(v) |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_diff_val[ i ][ j ] | ue(v) |
|     } | |
|   } | |
| } | |
| sps_sao_enabled_flag | u(1) |
| sps_alf_enabled_flag | u(1) |
| if( sps_alf_enabled_flag && ChromaArrayType != 0 ) | |
|   sps_ccalf_enabled_flag | u(1) |
| sps_transform_skip_enabled_flag | u(1) |
| if( sps_transform_skip_enabled_flag ) { | |
|   log2_transform_skip_max_size_minus2 | ue(v) |
|   sps_bdpcm_enabled_flag | u(1) |
| } | |
| sps_ref_wraparound_enabled_flag | u(1) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| if( sps_bdof_enabled_flag ) | |
|   sps_bdof_pic_present_flag | u(1) |
| sps_smvd_enabled_flag | u(1) |
| sps_dmvr_enabled_flag | u(1) |
| if( sps_dmvr_enabled_flag ) | |
|   sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|   sps_cclm_enabled_flag | u(1) |
| if( chroma_format_idc == 1 ) { | |
|   sps_chroma_horizontal_collocated_flag | u(1) |
|   sps_chroma_vertical_collocated_flag | u(1) |
| } | |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| six_minus_max_num_merge_cand | ue(v) |
| sps_sbt_enabled_flag | u(1) |
| sps_affine_enabled_flag | u(1) |
| if( sps_affine_enabled_flag ) { | |

-continued

| | Descriptor |
|---|---|
| five_minus_max_num_subblock_merge_cand | ue(v) |
| sps_affine_type_flag | u(1) |
| if( sps_amvr_enabled_flag ) | |
|   sps_affine_amvr_enabled_flag | u(1) |
| sps_affine_prof_enabled_flag | u(1) |
| if( sps_affine_prof_enabled_flag ) | |
|   sps_prof_pic_present_flag | u(1) |
| } | |
| sps_palette_enabled_flag | u(1) |
| if( ChromaArrayType = = 3 && !sps_max_luma_transform_size_64_flag ) | |
|   sps_act_enabled_flag | u(1) |
| if( sps_transform_skip_enabled_flag \|\| sps_palette_enabled_flag ) | |
|   min_qp_prime_ts_minus4 | ue(v) |
| sps_bcw_enabled_flag | u(1) |
| sps_ibc_enabled_flag | u(1) |
| if( sps_ibc_enabled_flag ) | |
|   six_minus_max_num_ibc_merge_cand | ue(v) |
| sps_ciip_enabled_flag | u(1) |
| if( sps_mmvd_enabled_flag ) | |
|   sps_fpel_mmvd_enabled_flag | u(1) |
| if( MaxNumMergeCand >= 2 ) { | |
|   sps_gpm_enabled_flag | u(1) |
|   if( sps_gpm_enabled_flag && MaxNumMergeCand >= 3 ) | |
|     max_num_merge_cand_minus_max_num_gpm_cand | ue(v) |
| } | |
| sps_lmcs_enabled_flag | u(1) |
| sps_lfnst_enabled_flag | u(1) |
| sps_ladf_enabled_flag | u(1) |
| if( sps_ladf_enabled_flag) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| log2_parallel_merge_level_minus2 | ue(v) |
| sps_scaling_list_enabled_flag | u(1) |
| sps_dep_quant_enabled_flag | u(1) |
| if( !sps_dep_quant_enabled_flag ) | |
|   sps_sign_data_hiding_enabled_flag | u(1) |
| sps_virtual_boundaries_enabled_flag | u(1) |
| if( sps_virtual_boundaries_enabled_flag ) { | |
|   sps_virtual_boundaries_present_flag | u(1) |
|   if( sps_virtual_boundaries_present_flag ) { | |
|     sps_num_ver_virtual_boundaries | u(2) |
|     for( i = 0; i < sps_num_ver_virtual_boundaries; i++ ) | |
|       sps_virtual_boundaries_pos_x[ i ] | u(13) |
|     sps_num_hor_virtual_boundaries | u(2) |
|     for( i = 0; i < sps_num_hor_virtual_boundaries; i++ ) | |
|       sps_virtual_boundaries_pos_y[ i ] | u(13) |
|   } | |
| } | |
| if( sps_ptl_dpb_hrd_params_present_flag ) { | |
|   sps_general_hrd_params_present_flag | u(1) |
|   if( sps_general_hrd_params_present_flag ) { | |
|     general_hrd_parameters( ) | |
|     if( sps_max_sublayers_minus1 > 0 ) | |
|       sps_sublayer_cpb_params_present_flag | u(1) |
|     firstSubLayer = sps_sublayer_cpb_params_present_flag ? 0 : sps_max_sublayers_minus1 | |
|     ols_hrd_parameters( firstSubLayer, sps_max_sublayers_minus1 ) | |
|   } | |
| } | |
| field_seq_flag | u(1) |
| vui_parameters_present_flag | u(1) |
| if( vui_parameters_present_flag ) | |
|   vui_parameters( ) /* Specified in ITU-T H.SEI \| ISO/IEC 23002-7 */ | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

7.3.2.4 Picture Parameter Set RBSP Syntax

| | Descriptor |
|---|---|
| pic_parameter_set_rbsp( ) { | |
|   pps_pic_parameter_set_id | ue(v) |
|   pps_seq_parameter_set_id | u(4) |
|   mixed_nalu_types_in_pic_flag | u(1) |
|   pic_width_in_luma_samples | ue(v) |
|   pic_height_in_luma_samples | ue(v) |
|   pps_conformance_window_flag | u(1) |
|   if( pps_conformance_window_flag ) { | |
|     pps_conf_win_left_offset | ue(v) |
|     pps_conf_win_right_offset | ue(v) |
|     pps_conf_win_top_offset | ue(v) |
|     pps_conf_win_bottom_offset | ue(v) |
|   } | |
|   scaling_window_explicit_signalling_flag | u(1) |
|   if( scaling_window_explicit_signalling_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
|   output_flag_present_flag | u(1) |
|   subpic_id_mapping_in_pps_flag | u(1) |
|   if( subpic_id_mapping_in_pps_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     if( NumTilesInPic > 1 ) | |
|       rect_slice_flag | u(1) |
|     if( rect_slice_flag ) | |
|       single_slice_per_subpic_flag | u(1) |
|     if( rect_slice_flag && ! single_slice_per_subpic_flag ) { | |
|       num_slices_in_pic_minus1 | ue(v) |
|       if( num_slices_in_pic_minus1 > 0 ) | |
|         tile_idx_delta_present_flag | u(1) |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && | |
|           ( tile_idx_delta_present_flag \|\| tileIdx % NumTileColumns = = 0 ) ) | |
|           slice_height_in_tiles_minus1[ i ] | ue(v) |
|         if( slice_width_in_tiles_minus1[ i ] = = 0 && | |
|           slice_height_in_tiles_minus1[ i ] = = 0 && | |
|           RowHeight[ SliceTopLeftTileIdx[ i ] / NumTileColumns ] > 1 ) { | |
|           num_exp_slices_in_tile[ i ] | ue(v) |
|           numExpSlicesInTile = num_exp_slices_in_tile[ i ] | |
|           for( j = 0; j < numExpSlicesInTile; j++ ) | |
|             exp_slice_height_in_ctus_minus1[ j ] | ue(v) |
|           i += NumSlicesInTile[ i ] | |
|         } | |
|         if( tile_idx_delta_present_flag && i < num_slices_in_pic_minus1 ) | |
|           tile_idx_delta[ i ] | se(v) |
|       } | |
|     } | |
|     loop_filter_across_tiles_enabled_flag | u(1) |
|     loop_filter_across_slices_enabled_flag | u(1) |
|   } | |
|   cabac_init_present_flag | u(1) |
|   for( i = 0; i < 2; i++ ) | |
|     num_ref_idx_default_active_minus1[ i ] | ue(v) |
|   rpl1_idx_present_flag | u(1) |
|   init_qp_minus26 | se(v) |
|   cu_qp_delta_enabled_flag | u(1) |
|   pps_chroma_tool_offsets_present_flag | u(1) |
|   if( pps_chroma_tool_offsets_present_flag ) { | |

-continued

| | Descriptor |
|---|---|
| pps_cb_qp_offset | se(v) |
| pps_cr_qp_offset | se(v) |
| pps_joint_cbcr_qp_offset_present_flag | u(1) |
| if( pps_joint_cbcr_qp_offset_present_flag ) | |
|     pps_joint_cbcr_qp_offset_value | se(v) |
| pps_slice_chroma_qp_offsets_present_flag | u(1) |
| pps_cu_chroma_qp_offset_list_enabled_flag | u(1) |
| } | |
| if( pps_cu_chroma_qp_offset_list_enabled_flag ) { | |
|     chroma_qp_offset_list_len_minus1 | ue(v) |
|     for( i = 0; i <= chroma_qp_offset_list_len_minus1; i++ ) { | |
|         cb_qp_offset_list[ i ] | se(v) |
|         cr_qp_offset_list[ i ] | se(v) |
|         if( pps_joint_cbcr_qp_offset_present_flag ) | |
|             joint_cbcr_qp_offset_list[ i ] | se(v) |
|     } | |
| } | |
| pps_weighted_pred_flag | u(1) |
| pps_weighted_bipred_flag | u(1) |
| deblocking_filter_control_present_flag | u(1) |
| if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|         pps_beta_offset_div2 | se(v) |
|         pps_tc_offset_div2 | se(v) |
|         pps_cb_beta_offset_div2 | se(v) |
|         pps_cb_tc_offset_div2 | se(v) |
|         pps_cr_beta_offset_div2 | se(v) |
|         pps_cr_tc_offset_div2 | se(v) |
|     } | |
| } | |
| rpl_info_in_ph_flag | u(1) |
| if( deblocking_filter_override_enabled_flag ) | |
|     dbf_info_in_ph_flag | u(1) |
| sao_info_in_ph_flag | u(1) |
| alf_info_in_ph_flag | u(1) |
| if( ( pps_weighted_pred_flag || pps_weighted_bipred_flag ) && rpl_present_in_ph_flag ) | |
|     wp_info_in_ph_flag | u(1) |
| qp_delta_info_in_ph_flag | u(1) |
| pps_ref_wraparound_enabled_flag | u(1) |
| if( pps_ref_wraparound_enabled_flag ) | |
|     pps_ref_wraparound_offset | ue(v) |
| picture_header_extension_present_flag | u(1) |
| slice_header_extension_present_flag | u(1) |
| pps_extension_flag | u(1) |
| if( pps_extension_flag ) | |
|     while( more_rbsp_data( ) ) | |
|         pps_extension_data_flag | u(1) |
| rbsp_trailing_bits( ) | |
| } | |

7.3.2.7 Picture Header Structure Syntax

| | Descriptor |
|---|---|
| picture_header_structure( ) { | |
|     gdr_or_irap_pic_flag | u(1) |
|     if( gdr_or_irap_pic_flag ) | |
|         gdr_pic_flag | u(1) |
|     ph_inter_slice_allowed_flag | u(1) |
|     if( ph_inter_slice_allowed_flag ) | |
|         ph_intra_slice_allowed_flag | u(1) |
|     non_reference_picture_flag | u(1) |
|     ph_pic_parameter_set_id | ue(v) |
|     ph_pic_order_cnt_lsb | u(v) |
|     if( gdr_or_irap_pic_flag ) | |
|         no_output_of_prior_pics_flag | u(1) |
|     if( gdr_pic_flag ) | |
|         recovery_poc_cnt | ue(v) |
|     for( i = 0; i < NumExtraPhBits; i++ ) | |
|         ph_extra_bit[ i ] | u(1) |
|     if( sps_poc_msb_flag ) { | |

-continued

|  | Descriptor |
|---|---|
| ph_poc_msb_present_flag | u(1) |
| if( ph_poc_msb_present_flag ) |  |
|   poc_msb_val | u(v) |
| } |  |
| if( sps_alf_enabled_flag && alf_info_in_ph_flag ) { |  |
|   ph_alf_enabled_flag | u(1) |
|   if( ph_alf_enabled_flag ) { |  |
|     ph_num_alf_aps_ids_luma | u(3) |
|     for( i = 0; i < ph_num_alf_aps_ids_luma; i++ ) |  |
|       ph_alf_aps_id_luma[ i ] | u(3) |
|     if( ChromaArrayType != 0 ) |  |
|       ph_alf_chroma_idc | u(2) |
|     if( ph_alf_chroma_idc ) |  |
|       ph_alf_aps_id_chroma | u(3) |
|     if( sps_ccalf_enabled_flag ) { |  |
|       ph_cc_alf_cb_enabled_flag | u(1) |
|       if( ph_cc_alf_cb_enabled_flag ) |  |
|         ph_cc_alf_cb_aps_id | u(3) |
|       ph_cc_alf_cr_enabled_flag | u(1) |
|       if( ph_cc_alf_cr_enabled_flag ) |  |
|         ph_cc_alf_cr_aps_id | u(3) |
|     } |  |
|   } |  |
| } |  |
| if( sps_lmcs_enabled_flag ) { |  |
|   ph_lmcs_enabled_flag | u(1) |
|   if( ph_lmcs_enabled_flag ) { |  |
|     ph_lmcs_aps_id | u(2) |
|     if( ChromaArrayType != 0 ) |  |
|       ph_chroma_residual_scale_flag | u(1) |
|   } |  |
| } |  |
| if( sps_scaling_list_enabled_flag ) { |  |
|   ph_scaling_list_present_flag | u(1) |
|   if( ph_scaling_list_present_flag ) |  |
|     ph_scaling_list_aps_id | u(3) |
| } |  |
| if( sps_virtual_boundaries_enabled_flag && !sps_virtual_boundaries_present_flag ) { |  |
|   ph_virtual_boundaries_present_flag | u(1) |
|   if( ph_virtual_boundaries_present_flag ) { |  |
|     ph_num_ver_virtual_boundaries | u(2) |
|     for( i = 0; i < ph_num_ver_virtual_boundaries; i++ ) |  |
|       ph_virtual_boundaries_pos_x[ i ] | u(13) |
|     ph_num_hor_virtual_boundaries | u(2) |
|     for( i = 0; i < ph_num_hor_virtual_boundaries; i++ ) |  |
|       ph_virtual_boundaries_pos_y[ i ] | u(13) |
|   } |  |
| } |  |
| if( output_flag_present_flag ) |  |
|   pic_output_flag | u(1) |
| if( rpl_info_in_ph_flag ) |  |
|   ref_pic_lists( ) |  |
| if( partition_constraints_override_enabled_flag ) |  |
|   partition_constraints_override_flag | u(1) |
| if( ph_intra_slice_allowed_flag ) { |  |
|   if( partition_constraints_override_flag ) { |  |
|     ph_log2_diff_min_qt_min_cb_intra_slice_luma | ue(v) |
|     ph_max_mtt_hierarchy_depth_intra_slice_luma | ue(v) |
|     if( ph_max_mtt_hierarchy_depth_intra_slice_luma != 0 ) { |  |
|       ph_log2_diff_max_bt_min_qt_intra_slice_luma | ue(v) |
|       ph_log2_diff_max_tt_min_qt_intra_slice_luma | ue(v) |
|     } |  |
|     if( qtbtt_dual_tree_intra_flag ) { |  |
|       ph_log2_diff_min_qt_min_cb_intra_slice_chroma | ue(v) |
|       ph_max_mtt_hierarchy_depth_intra_slice_chroma | ue(v) |
|       if( ph_max_mtt_hierarchy_depth_intra_slice_chroma != 0 ) { |  |
|         ph_log2_diff_max_bt_min_qt_intra_slice_chroma | ue(v) |
|         ph_log2_diff_max_tt_min_qt_intra_slice_chroma | ue(v) |
|       } |  |
|     } |  |
|   } |  |
|   if( cu_qp_delta_enabled_flag ) |  |
|     ph_cu_qp_delta_subdiv_intra_slice | ue(v) |
|   if( pps_cu_chroma_qp_offset_list_enabled_flag ) |  |
|     ph_cu_chroma_qp_offset_subdiv_intra_slice | ue(v) |
| } |  |

| | Descriptor |
|---|---|
| if( ph_inter_slice_allowed_flag ) { | |
|   if( partition_constraints_override_flag ) { | |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter_slice != 0 ) { | |
|       ph_log2_diff_max_bt_min_qt_inter_slice | ue(v) |
|       ph_log2_diff_max_tt_min_qt_inter_slice | ue(v) |
|     } | |
|   } | |
|   if( cu_qp_delta_enabled_flag ) | |
|     ph_cu_qp_delta_subdiv_inter_slice | ue(v) |
|   if( pps_cu_chroma_qp_offset_list_enabled_flag ) | |
|     ph_cu_chroma_qp_offset_subdiv_inter_slice | ue(v) |
|   if( sps_temporal_mvp_enabled_flag ) { | |
|     ph_temporal_mvp_enabled_flag | u(1) |
|     if( ph_temporal_mvp_enabled_flag && rpl_info_in_ph_flag ) { | |
|       ph_collocated_from_l0_flag | u(1) |
|       if( ( ph_collocated_from_l0_flag && | |
|         num_ref_entries[ 0 ][ PicRplsIdx[ 0 ] ] > 1 ) \|\| | |
|         ( !ph_collocated_from_l0_flag && | |
|         num_ref_entries[ 1 ][ PicRplsIdx[ 1 ] ] > 1 ) ) | |
|         ph_collocated_ref_idx | ue(v) |
|     } | |
|   } | |
|   mvd_l1_zero_flag | u(1) |
|   if( sps_fpel_mmvd_enabled_flag ) | |
|     ph_fpel_mmvd_enabled_flag | u(1) |
|   if( sps_bdof_pic_present_flag ) | |
|     ph_disable_bdof_flag | u(1) |
|   if( sps_dmvr_pic_present_flag ) | |
|     ph_disable_dmvr_flag | u(1) |
|   if( sps_prof_pic_present_flag ) | |
|     ph_disable_prof_flag | u(1) |
|   if( ( pps_weighted_pred_flag \|\| pps_weighted_bipred_flag ) && wp_info_in_ph_flag ) | |
|     pred_weight_table( ) | |
| } | |
| if( qp_delta_info_in_ph_flag ) | |
|   ph_qp_delta | se(v) |
| if( sps_joint_cbcr_enabled_flag ) | |
|   ph_joint_cbcr_sign_flag | u(1) |
| if( sps_sao_enabled_flag && sao_info_in_ph_flag ) { | |
|   ph_sao_luma_enabled_flag | u(1) |
|   if( ChromaArrayType != 0 ) | |
|     ph_sao_chroma_enabled_flag | u(1) |
| } | |
| if( sps_dep_quant_enabled_flag ) | |
|   ph_dep_quant_enabled_flag | u(1) |
| if( sps_sign_data_hiding_enabled_flag && !ph_dep_quant_enabled_flag ) | |
|   pic_sign_data_hiding_enabled_flag | u(1) |
| if( deblocking_filter_override_enabled_flag && dbf_info_in_ph_flag ) { | |
|   ph_deblocking_filter_override_flag | u(1) |
|   if( ph_deblocking_filter_override_flag ) { | |
|     ph_deblocking_filter_disabled_flag | u(1) |
|     if( !ph_deblocking_filter_disabled_flag ) { | |
|       ph_beta_offset_div2 | se(v) |
|       ph_tc_offset_div2 | se(v) |
|       ph_cb_beta_offset_div2 | se(v) |
|       ph_cb_tc_offset_div2 | se(v) |
|       ph_cr_beta_offset_div2 | se(v) |
|       ph_cr_tc_offset_div2 | se(v) |
|     } | |
|   } | |
| } | |
| if( picture_header_extension_present_flag ) { | |
|   ph_extension_length | ue(v) |
|   for( i = 0; i < ph_extension_length; i++) | |
|     ph_extension_data_byte[ i ] | u(8) |
| } | |
| } | |

7.3.7.1 General Slice Header Syntax

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \|\| | |
|     ( !rect_slice_flag && NumTilesInPic > 1 ) ) | |
|     slice_address | u(v) |
|   for( i = 0; i < NumExtraPhBits; i++ ) | |
|     sh_extra_bit[ i ] | u(1) |
|   if( !rect_slice_flag && NumTilesInPic > 1 ) | |
|     num_tiles_in_slice_minus1 | ue(v) |
|   if( ph_inter_slice_allowed_flag ) | |
|     slice_type | ue(v) |
|   if( sps_alf_enabled_flag && !alf_info_in_ph_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag ) | |
|           slice_cc_alf_cb_aps_id | u(3) |
|         slice_cc_alf_cr_enabled_flag | u(1) |
|         if( slice_cc_alf_cr_enabled_flag ) | |
|           slice_cc_alf_cr_aps_id | u(3) |
|       } | |
|     } | |
|   } | |
|   if( separate_colour_plane_flag = = 1 ) | |
|     colour_plane_id | u(2) |
|   if( !rpl_info_in_ph_flag && ( ( nal_unit_type != IDR_W_RADL && nal_unit_type != | |
|     IDR_N_LP ) \|\| sps_idr_rpl_present_flag ) ) | |
|     ref_pic_lists( ) | |
|   if( ( rpl_info_in_ph_flag \|\| ( ( nal_unit_type != IDR_W_RADL && nal_unit_type != | |
|     IDR_N_LP ) \|\| sps_idr_rpl_present_flag ) ) && | |
|     ( slice_type != I && num_ref_entries[ 0 ][ RplsIdx[ 0 ] ] > 1 ) \|\| | |
|     ( slice_type = = B && num_ref_entries[ 1 ][ RplsIdx[ 1 ] ] > 1 ) ) { | |
|     num_ref_idx_active_override_flag | u(1) |
|     if( num_ref_idx_active_override_flag ) | |
|       for( i = 0; i < ( slice_type = = B ? 2: 1 ); i++ ) | |
|         if( num_ref_entries[ i ][ RplsIdx[ i ] ] > 1 ) | |
|           num_ref_idx_active_minus1[ i ] | ue(v) |
|   } | |
|   if( slice_type != I ) { | |
|     if( cabac_init_present_flag ) | |
|       cabac_init_flag | u(1) |
|     if( ph_temporal_mvp_enabled_flag && !rpl_info_in_ph_flag ) { | |
|       if( slice type = = B ) | |
|         slice_collocated_from_l0_flag | u(1) |
|       if( ( slice_collocated_from_l0_flag && NumRefIdxActive[ 0 ] > 1 ) \|\| | |
|         ( ! slice_collocated_from_l0_flag && NumRefIdxActive[ 1 ] > 1 ) ) | |
|         slice_collocated_ref_idx | ue(v) |
|     } | |
|     if( !wp_info_in_ph_flag && ( ( pps_weighted_pred_flag && slice_type = = P ) \|\| | |
|       (pps_weighted_bipred_flag && slice_type = = B ) ) ) | |
|       pred_weight_table( ) | |
|   } | |
|   if( !qp_delta_info_in_ph_flag ) | |
|     slice_qp_delta | se(v) |
|   if( pps_slice_chroma_qp_offsets_present_flag ) { | |
|     slice_cb_qp_offset | se(v) |
|     slice_cr_qp_offset | se(v) |
|     if( sps_joint_cbcr_enabled_flag ) | |
|       slice_joint_cbcr_qp_offset | se(v) |
|   } | |
|   if( pps_cu_chroma_qp_offset_list_enabled_flag ) | |

| | Descriptor |
|---|---|
| cu_chroma_qp_offset_enabled_flag | u(1) |
| if( sps_sao_enabled_flag && ! sao_info_in_ph_flag ) { | |
|   slice_sao_luma_flag | u(1) |
|   if( ChromaArrayType != 0 ) | |
|     slice_sao_chroma_flag | u(1) |
| } | |
| if( deblocking_filter_override_enabled_flag && !dbf_info_in_ph_flag ) | |
|   slice_deblocking_filter_override_flag | u(1) |
| if( slice_deblocking_filter_override_flag ) { | |
|   slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |
|     slice_cb_beta_offset_div2 | se(v) |
|     slice_cb_tc_offset_div2 | se(v) |
|     slice_cr_beta_offset_div2 | se(v) |
|     slice_cr_tc_offset_div2 | se(v) |
|   } | |
| } | |
| slice_ts_residual_coding_disabled_flag | u(1) |
| if( ph_lmcs_enabled_flag ) | |
|   slice_lmcs_enabled_flag | u(1) |
| if( pic_scaling_list_enabled_flag ) | |
|   slice_scaling_list_present_flag | u(1) |
| if( NumEntryPoints > 0 ) { | |
|   offset_len_minus1 | ue(v) |
|   for( i = 0; i < NumEntryPoints; i++ ) | |
|     entry_point_offset_minus1[ i ] | u(v) |
| } | |
| if( slice_header_extension_present_flag ) { | |
|   slice_header_extension_length | ue(v) |
|   for( i = 0; i < slice_header_extension_length; i++) | |
|     slice_header_extension_data_byte[ i ] | u(8) |
| } | |
| byte_alignment( ) | |
| } | |

3.4. Example Specifications for Tiles, Slices and Subpictures

3 Definitions picture-level slice index: An index of a slice to the list of slices in a picture in the order as they are signalled in the PPS when the rect_slice_flag is equal to 1.

subpicture-level slice index: An index of a slice to the list of slices in a subpicture in the order as they are signalled in the PPS when the rect_slice_flag is equal to 1.

6.5.1 CTB Raster Scanning, Tile Scanning, and Subpicture Scanning Processes

The variable NumTileColumns, specifying the number of tile columns, and the list colWidth[i] for i ranging from 0 to NumTileColumn−1, inclusive, specifying the width of the i-th tile column in units of CTBs, are derived as follows:

```
remainingWidthInCtbsY = PicWidthInCtbsY
for( i = 0; i < num_exp_tile_columns_minus1; i++ ) {
    colWidth[ i ] = tile_column_width_minus1[ i ] + 1
    remainingWidthInCtbsY -= colWidth[ i ]
}
uniformTileColWidth = tile_column_width_minus1[
    num_exp_tile_columns_minus1 ] +
1 (23)
while( remainingWidthInCtbsY >= uniformTileColWidth ) {
    colWidth[ i++ ] = uniformTileColWidth
    remainingWidthInCtbsY -= uniformTileColWidth
}
```

```
if( remainingWidthInCtbsY > 0 )
    colWidth[ i++ ] = remainingWidthInCtbsY
NumTileColumns = i
```

The variable NumTileRows, specifying the number of tile rows, and the list RowHeight[j] for j ranging from 0 to NumTileRows−1, inclusive, specifying the height of the j-th tile row in units of CTBs, are derived as follows:

```
remainingHeightInCtbsY = PicHeightInCtbsY
for( j = 0; j < num_exp_tile_rows_minus1; j++ ) {
    RowHeight[ j ] = tile_row_height_minus1[ j ] + 1
    remainingHeightInCtbsY -= RowHeight[ j ]
}
uniformTileRowHeight = tile_row_height_minus1[
    num_exp_tile_rows_minus1 ] + 1
(24)
while( remainingHeightInCtbsY >= uniformTileRowHeight ) {
    RowHeight[ j++ ] = uniformTileRowHeight
    remainingHeightInCtbsY -= uniformTileRowHeight
}
if( remainingHeightInCtbsY > 0 )
    RowHeight[ j++ ] = remainingHeightInCtbsY
NumTileRows = j
```

The variable NumTilesInPic is set equal to NumTileColumns*NumTileRows.

The list tileColBd[i] for i ranging from 0 to NumTileColumns, inclusive, specifying the location of the i-th tile column boundary in units of CTBs, is derived as follows:

```
for( tileColBd[ 0 ] = 0, i = 0; i < NumTileColumns; i++ )
    tileColBd[ i + 1 ] = tileColBd[ i ] + colWidth[ i ]        (25)
```

NOTE 1—The size of the array tileColBd[ ] is one greater than the actual number of tile columns in the derivation of CtbToTileColBd[ ].

The list tileRowBd[j] for j ranging from 0 to NumTileRows, inclusive, specifying the location of the j-th tile row boundary in units of CTBs, is derived as follows:

```
for( tileRowBd[ 0 ] = 0, j = 0; j < NumTileRows; j++ )
    tileRowBd[ j + 1 ] = tileRowBd[ j ] + RowHeight[ j ]        (26)
```

NOTE 2—The size of the array tileRowBd[ ] in the above derivation is one greater than the actual number of tile rows in the derivation of CtbToTileRowBd[ ].

The list CtbToTileColBd[ctbAddrX] for ctbAddrX ranging from 0 to PicWidthInCtbsY, inclusive, specifying the conversion from a horizontal CTB address to a left tile column boundary in units of CTBs, is derived as follows:

```
tileX = 0
for( ctbAddrX = 0; ctbAddrX <= PicWidthInCtbsY; ctbAddrX++ ) {
    if( ctbAddrX = = tileColBd[ tileX + 1 ] )                   (27)
        tileX++
    CtbToTileColBd[ ctbAddrX ] = tileColBd[ tileX ]
}
```

NOTE 3—The size of the array CtbToTileColBd[ ] in the above derivation is one greater than the actual number of picture width in CTBs in the derivaqiton slice_data( ) signalling.

The list CtbToTileRowBd[ctbAddrY] for ctbAddrY ranging from 0 to PicHeightInCtbsY, inclusive, specifying the conversion from a vertical CTB address to a top tile column boundary in units of CTBs, is derived as follows:

```
tileY = 0
for( ctbAddrY = 0; ctbAddrY <= PicHeightInCtbsY; ctbAddrY++ ) {
    if( ctbAddrY = = tileRowBd[ tileY + 1 ] )                   (28)
        tileY++
    CtbToTileRowBd[ ctbAddrY ] = tileRowBd[ tileY ]
}
```

NOTE 4—the size of the array CtbToTileRowBd[ ] in the above derivation is one greater than the actual number of picture height in CTBs in the slice_data( ) signalling.

For rectangular slices, the list NumCtusInSlice[i] for i ranging from 0 to num_slices_in_pic_minus1, inclusive, specifying the number of CTU in the i-th slice, the list SliceTopLeftTileIdx[i] for i ranging from 0 to num_slices_in_pic_minus1, inclusive, specifying the index of the top-left tile of the slice, and the matrix CtbAddrInSlice[i][j] for i ranging from 0 to num_slices_in_pic_minus1, inclusive, and j ranging from 0 to NumCtusInSlice[i]−1, inclusive, specifying the picture raster scan address of the j-th CTB within the i-th slice, are derived as follows:

```
if( single_slice_per_subpic_flag ) {
    for( i = 0; i <= sps_num_subpics_minus1; i++ )
        NumCtusInSlice[ i ] = 0
    for( i = 0; i < PicSizeInCtbsY; i ++ ) {
        sliceIdx = subpic_info_present_flag ? CtbToSubpicIdx[ i ] : 0
        CtbAddrInSlice[ sliceIdx ][ NumCtusInSlice[ sliceIdx ] ] = i
        NumCtusInSlice[ sliceIdx ]++
    }
} else {
    tileIdx = 0
    for( i = 0; i <= num_slices_in_pic_minus1; i++ )
        NumCtusInSlice[ i ] = 0
    for( i = 0; i <= num_slices_in_pic_minus1; i++ ) {
        SliceTopLeftTileIdx[ i ] = tileIdx
        tileX = tileIdx % NumTileColumns
        tileY = tileIdx / NumTileColumns
        if( i = = num_slices_in_pic_minus1 ) {
            slice_width_in_tiles_minus1[ i ] = NumTileColumns − 1 − tileX
            slice_height_in_tiles_minus1[ i ] = NumTileRows − 1 − tileY
            NumSlicesInTile[ i ] = 1
        }
        if( slice_width_in_tiles_minus1[ i ] = = 0 &&
            slice_height_in_tiles_minus1[ i ]
            = = 0 ) {                                            (29)
            ctbY = tileRowBd[ tileY ]
            for( j = 0; j < NumSlicesInTile[ i ] − 1; j++ ) {
                AddCtbsToSlice( i, tileColBd[ tileX ], tileColBd[ tileX + 1 ],
                    ctbY, ctbY + SliceHeightInCtusMinus1[ i ] + 1 )
                ctbY += SliceHeightInCtusMinus1[ i ] + 1
                i++
            }
            AddCtbsToSlice( i, tileColBd[ tileX ], tileColBd[ tileX + 1 ],
                ctbY, tileRowBd[ tileY + 1 ] )
        } else
            for( j = 0; j <= slice_height_in_tiles_minus1[ i ]; j++ )
                for( k = 0; k <= slice_width_in_tiles_minus1[ i ]; k++ )
                    AddCtbsToSlice( i, tileColBd[ tileX + k ], tileColBd[ tileX +
                        k + 1 ],
                        tileRowBd[ tileY + j ], tileRowBd[ tileY + j + 1 ] )
        if( tile_idx_delta_present_flag )
            tileIdx += tile_idx_delta[ i ]
        else {
            tileIdx += slice_width_in_tiles_minus1[ i ] + 1
            if( tileIdx % NumTileColumns = = 0 )
                tileIdx += slice_height_in_tiles_minus1[ i ] *
                    NumTileColumns
        }
    }
}
```

Where the function AddCtbsToSlice(sliceIdx, startX, stopX, startY, stopY) is specified as follows:

```
for( ctbY = startY; ctbY < stopY; ctbY++ )
    for( ctbX = startX; ctbX < stopX; ctbX++ ) {
        CtbAddrInSlice[ sliceIdx ][ NumCtusInSlice[ sliceIdx ] ] =
            ctbY * PicWidthInCtbsY + ctbX    (30)
        NumCtusInSlice[ sliceIdx ]++
    }
```

For bitstream conformance, the values of NumCtusInSlice[i] for i ranging from 0 to num_slices_in_pic_minus1, inclusive, may be greater than 0. Additionally, for bitstream conformance, the matrix CtbAddrInSlice[i][j] for i ranging from 0 to num_slices_in_pic_minus1, inclusive, and j ranging from 0 to NumCtusInSlice[i]−1, inclusive, may include all CTB may address in the range 0 to PicSizeInCtbsY−1 once and only once. The list CtbToSubpicIdx[ctbAddrRs] for ctbAddrRs ranging from 0 to PicSizeInCtbsY−1, inclusive, specifying the conversion from a CTB address in picture raster scan to a subpicture index, is derived as follows:

```
for( ctbAddrRs = 0; ctbAddrRs < PicSizeInCtbsY; ctbAddrRs++ ) {
  posX = ctbAddrRs % PicWidthInCtbsY
  posY = ctbAddrRs / PicWidthInCtbsY
  CtbToSubpicIdx[ ctbAddrRs ] = −1
  for( i = 0; CtbToSubpicIdx[ ctbAddrRs ] < 0 && i <= sps_num_  (31)
subpics_minus1; i++ ){
    if( ( posX >= subpic_ctu_top_left_x[ i ] ) &&
        ( posX < subpic_ctu_top_left_x[ i ] + subpic_width_minus1
[ i ] + 1 )
        &&
        ( posY >= subpic_ctu_top_left_y[ i ] ) &&
        ( posY < subpic_ctu_top_left_y[ i ] + subpic_height_minus1
[ i ] + 1 ) )
      CtbToSubpicIdx[ ctbAddrRs ] = i
  }
}
```

The list NumSlicesInSubpic[i], specifying the number of rectangular slices in the i-th subpicture, is derived as follows:

```
for( j = 0; j <= sps_num_subpics_minus1; j++ )
  NumSlicesInSubpic[ j ] = 0
for( i = 0; i <= num_slices_in_pic_minus1; i++ ) {
  posX = CtbAddrInSlice[ i ][ 0 ] % PicWidthInCtbsY
  posY = CtbAddrInSlice[ i ][ 0 ] / PicWidthInCtbsY
  for( j = 0; j <= sps_num_subpics_minus1; j++ ) {
    if( ( posX >= subpic_ctu_top_left_x[ j ] ) &&  (32)
        ( posX < subpic_ctu_top_left_x[ j ] + subpic_width_minus1
[ j ] + 1 )
        &&
        ( posY >= subpic_ctu_top_left_y[ j ] ) &&
        ( posY < subpic_ctu_top_left_y[ j ] + subpic_height_minus1[ j ]
+
1 ) ) {
      NumSlicesInSubpic[ j ]++
    }
  }
}
```

7.3.4.3 Picture Parameter Set RBSP Semantics subpic_id_mapping_in_pps_flag equal to 1 specifies that the subpicture ID mapping is signalled in the PPS. subpic_id_mapping_in_pps_flag equal to 0 specifies that the subpicture ID mapping is not signalled in the PPS. If subpic_id_mapping_explicitly_signalled_flag is 0 or subpic_id_mapping_in_sps_flag is equal to 1, the value of subpic_id_mapping_in_pps_flag may be equal to 0. Otherwise (subpic_id_mapping_explicitly_signalled_flag is equal to 1 and subpic_id_mapping_in_sps_flag is equal to 0), the value of subpic_id_mapping_in_pps_flag may be equal to 1.

pps_num_subpics_minus1 may be equal to sps_num_subpics_minus1.

pps_subpic_id_len_minus1 may be equal to sps_subpic_id_len_minus1.

pps_subpic_id[i] specifies the subpicture ID of the i-th subpicture. The length of the pps_subpic_id[i] syntax element is pps_subpic_id_len_minus1+1 bits.

The variable SubpicIdVal[i], for each value of i in the range of 0 to sps_num_subpics_minus1, inclusive, is derived as follows:

```
for( i = 0; i <= sps_num_subpics_minus1; i++ )
  if( subpic_id_mapping_explicitly_signalled_flag )
    SubpicIdVal[ i ] = subpic_id_mapping_in_pps_flag ? pps_subpic_
      id[ i ] :
sps_subpic_id[ i ]      (80)
  else
    SubpicIdVal[ i ] = i
```

For bitstream conformance, both of the following constraints may apply:
  For any two different values of i and j in the range of 0 to sps_num_subpics_minus1, inclusive, SubpicIdVal[i] may not be equal to SubpicIdVal[j].
  When the current picture is not the first picture of the CLVS, for each value of i in the range of 0 to sps_num_subpics_minus1, inclusive, if the value of SubpicIdVal[i] is not equal to the value of SubpicIdVal[i] of the previous picture in decoding order in the same layer, the nal_unit_type for all coded slice NAL units of the subpicture in the current picture with subpicture index i may be equal to a particular value in the range of IDR_W_RADL to CRA_NUT, inclusive.

no_pic_partition_flag equal to 1 specifies that no picture partitioning is applied to each picture referring to the PPS. no_pic_partition_flag equal to 0 specifies each picture referring to the PPS may be partitioned into more than one tile or slice.

For bitstream conformance, the value of no_pic_partition_flag may be the same for all PPSs that are referred to by coded pictures within a CLVS.

For bitstream conformance, the value of no_pic_partition_flag may not be equal to 1 when the value of sps_num_subpics_minus1+1 is greater than 1.

pps_log 2_ctu_size_minus5 plus 5 specifies the luma coding tree block size of each CTU. pps_log 2_ctu_size_minus5 may be equal to sps_log_2_ctu_size_minus5.

num_exp_tile_columns_minus1 plus 1 specifies the number of explicitly provided tile column widths. The value of num_exp_tile_columns_minus1 may be in the range of 0 to PicWidthInCtbsY−1, inclusive. When no_pic_partition_flag is equal to 1, the value of num_exp_tile_columns_minus1 is inferred to be equal to 0.

num_exp_tile_rows_minus1 plus 1 specifies the number of explicitly provided tile row heights. The value of num_exp_tile_rows_minus1 may be in the range of 0 to PicHeightInCtbsY−1, inclusive. When no_pic_partition_flag is equal to 1, the value of num_tile_rows_minus1 is inferred to be equal to 0.

tile_column_width_minus1[i] plus 1 specifies the width of the i-th tile column in units of CTBs for i in the range of 0 to num_exp_tile_columns_minus1−1, inclusive. tile_column_width_minus1[num_exp_tile_columns_minus1] is used to derive the width of the tile columns with index greater than or equal to num_exp_tile_columns_minus1 as specified in clause 6.5.1. The value of tile_column_width_minus1[i] may be in the range of 0 to PicWidthInCtbsY−1, inclusive. When not present, the value of tile_column_width_minus1[0] is inferred to be equal to PicWidthInCtbsY−1.

tile_row_height_minus1[i] plus 1 specifies the height of the i-th tile row in units of CTBs for i in the range of 0 to num_exp_tile_rows_minus1−1, inclusive. tile row height minus1[num_exp_tile_rows_minus1] is used to derive the height of the tile rows with index greater than or equal to num_exp_tile_rows_minus1 as specified in clause 6.5.1. The value of tile row height minus1[i] may be in the range of 0 to PicHeightInCtbsY−1, inclusive. When not present, the value of tile row height minus1[0] is inferred to be equal to PicHeightInCtbsY−1.

rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpic_infopresent_flag is equal to 1, the value of rect_slice_flag may be equal to 1.

single_slice_per_subpic_flag equal to 1 specifies that each subpicture consists of one and only one rectangular slice. single_slicerer_subpic_flag equal to 0 specifies that each subpicture may consist of one or more rectangular slices. When single_sliceper_subpic_flag is equal to 1, num_slices_in_pic_minus1 is inferred to be equal to sps_num_subpics_minus1. When not present, the value of single_sliceper_subpic_flag is inferred to be equal to 0.

num_slices_in_pic_minus1 plus 1 specifies the number of rectangular slices in each picture referring to the PPS. The value of num_slices_in_pic_minus1 may be in the range of 0 to MaxSlicesPerPicture−1, inclusive, where MaxSlicesPerPicture is specified in Annex A. When no_pic_partition_flag is equal to 1, the value of num_slices_in_pic_minus1 is inferred to be equal to 0.

tile_idx_delta_present_flag equal to 0 specifies that tile_idx_delta values are not present in the PPS and all rectangular slices in pictures referring to the PPS are specified in raster order according to the process defined in clause 6.5.1. tile_idx_delta_present_flag equal to 1 specifies that tile_idx_delta values may be present in the PPS and all rectangular slices in pictures referring to the PPS are specified in the order indicated by the values of tile_idx_delta. When not present, the value of tile_idx_delta_present_flag is inferred to be equal to 0.

slice_width_in_tiles_minus1[i] plus 1 specifies the width of the i-th rectangular slice in units of tile columns. The value of slice width in tiles minus1[i] may be in the range of 0 to NumTileColumns−1, inclusive.

When slice_width_in_tiles_minus1[i] is not present, the following applies:
  If NumTileColumns is equal to 1, the value of slice_width_in_tiles_minus1[i] is inferred to be equal to 0.
  Otherwise, the value of slice_width_in_tiles_minus1[i] is inferred as specified in clause 6.5.1.

slice_height_in_tiles_minus_1[i] plus 1 specifies the height of the i-th rectangular slice in units of tile rows. The value of slice height in tiles minus1[i] may be in the range of 0 to NumTileRows−1, inclusive.

When slice_height_in_tiles_minus1[i] is not present, the following applies:
  If NumTileRows is equal to 1, or tile_idx_delta_present flag is equal to 0 and tileIdx % NumTileColumns is greater than 0), the value of slice_height_in_tiles_minus1[i] is inferred to be equal to 0.
  Otherwise (NumTileRows is not equal to 1, and tile_idx_delta_present flag is equal to 1 or tileIdx % NumTileColumns is equal to 0), when tile_idx_delta_present flag is equal to 1 or tileIdx % NumTileColumns is equal to 0, the value of slice_height_in_tiles_minus1[i] is inferred to be equal to slice_height_in_tiles_minus1[i−1].

num_exp_slices_in_tile[i] specifies the number of explicitly provided slice heights in the current tile that contains more than one rectangular slices. The value of num_exp_slices_in_tile[i] may be in the range of 0 to RowHeight[tileY]−1, inclusive, where tileY is the tile row index containing the i-th slice. When not present, the value of num_exp_slices_in_tile[i] is inferred to be equal to 0. When num_exp_slices_in_tile[i] is equal to 0, the value of the variable NumSlicesInTile[i] is derived to be equal to 1.

exp_slice_height_in_ctus_minus1[j] plus 1 specifies the height of the j-th rectangular slice in the current tile in units of CTU rows. The value of exp_slice_height_in_ctus_minus1[j] may be in the range of 0 to RowHeight[tileY]−1, inclusive, where tileY is the tile row index of the current tile. When num_exp_slices_in_tile[i] is greater than 0, the variable NumSlicesInTile[i] and SliceHeightInCtusMinus1[i+k] for k in the range of 0 to NumSlicesInTile[i]−1 are derived as follows:

```
remainingHeightInCtbsY = RowHeight[ SliceTopLeftTileIdx[ i ] /
NumTileColumns ]
numExpSliceInTile = num_exp_slices_in_tile[ i ]
for( j = 0; j < numExpSliceInTile − 1; j++ ) {
    SliceHeightInCtusMinus1[ i++ ] = exp_slice_height_in_ctu_minus1[ j ]
    remainingHeightInCtbsY −= SliceHeightInCtusMinus1[ j ]
}
uniformSliceHeightMinus1 = SliceHeightInCtusMinus1[ i − 1 ]       (81)
while( remainingHeightInCtbsY >= (uniformSliceHeightMinus1 + 1) ) {
    SliceHeightInCtusMinus1[ i++ ] = uniformSliceHeightMinus1
    remainingHeightInCtbsY −= (uniformSliceHeightMinus1 + 1)
    j++
}
if( remainingHeightInCtbsY > 0 ) {
    SliceHeightInCtusMinus1[ i++ ] = remainingHeightInCtbsY
    j++
}
NumSlicesInTile[ i ] = j
``` tile_idx_delta[i] specifies the difference between the tile index of the first tile in the i-th rectangular slice and the tile index of the first tile in the (i+1)-th rectangular slice. The value of tile_idx_delta[i] may be in the range of −NumTilesInPic+1 to NumTilesInPic−1, inclusive. When not present, the value of tile_idx_delta[i] is inferred to be equal to 0. When present, the value of tile_idx_delta[i] may not be equal to 0.

7.4.2.4.5 Order of VCL NAL Units and their Association to Coded Pictures

The order of the VCL NAL units within a coded picture is constrained as follows:
  For any two coded slice NAL units A and B of a coded picture, let subpicIdxA and subpicIdxB be their subpicture level index values, and sliceAddrA and sliceddrB be their slice address values.
  When either of the following conditions is true, coded slice NAL unit A may precede coded slice NAL unit B:
    subpicIdxA is less than subpicIdxB.
    subpicIdxA is equal to subpicIdxB and sliceAddrA is less than sliceAddrB.

7.4.8.1 General Slice Header Semantics

The variable CuQpDeltaVal, specifying the difference between a luma quantization parameter for the coding unit containing cu_qp_delta_abs and its prediction, is set equal to 0. The variables $CuQpOffset_{Cb}$, $CuQpOffset_{Cr}$, and $CuQpOffset_{CbCr}$, specifying values to be used when determining the respective values of the $Qp'_{Cb}$, $Qp'_{Cr}$, and $Qp'_{CbCr}$ quantization parameters for the coding unit containing cu_chroma_qp_offset_flag, are all set equal to 0.

picture_header_in_slice_header_flag equal to 1 specifies that the PH syntax structure is present in the slice header. picture header in slice header flag equal to 0 specifies that the PH syntax structure is not present in the slice header. For bitstream conformance, the value of picture_header_in_slice_header_flag may be the same in all coded slices in a CLVS.

When picture_header_in_slice_header_flag is equal to 1 for a coded slice, for bitstream conformance, no VCL NAL unit with nal_unit_type equal to PH_NUT may be present in the CLVS.

When picture_header_in_slice_header_flag is equal to 0, all coded slices in the current picture may have picture_header_in_slice_header_flag is equal to 0, and the current PU may have a PH NAL unit.

slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), CurrSubpicIdx is derived to be equal to 0. The length of slice_subpic_id is sps_subpic_id_len_minus1+1 bits.

slice_address specifies the slice address of the slice. When not present, the value of slice_address is inferred to be equal to 0. When rect_slice_flag is equal to 1 and NumSlicesInSubpic[CurrSubpicIdx] is equal to 1, the value of slice_address is inferred to be equal to 0.

If rect_slice_flag is equal to 0, the following applies:
  The slice address is the raster scan tile index.
    The length of slice_address is Ceil(Log 2 (NumTilesInPic)) bits.
    The value of slice_address may be in the range of 0 to NumTilesInPic−1, inclusive.

Otherwise (rect_slice_flag is equal to 1), the following applies:
  The slice address is the subpicture-level slice index of the slice.
    The length of slice_address is Ceil(Log 2(NumSlicesInSubpic[CurrSubpicIdx])) bits.
    The value of slice_address may be in the range of 0 to NumSlicesInSubpic[CurrSubpicIdx]−1, inclusive.

For bitstream conformance, the following constraints may apply:
  If rect_slice_flag is equal to 0 or subpic_info_present flag is equal to 0, the value of slice_address may not be equal to the value of slice_address of any other coded slice NAL unit of the same coded picture.
  Otherwise, the pair of slice_subpic_id and slice_address values may not be equal to the pair of slice_subpic_id and slice_address values of any other coded slice NAL unit of the same coded picture.
  The shapes of the slices of a picture may be such that each CTU, when decoded, may have its entire left boundary and entire top boundary consisting of a picture boundary or consisting of boundaries of previously decoded CTU(s).

sh_extra_bit[i] may be equal to 1 or 0. Decoders conforming to this version of this Specification may ignore the value of sh_extra_bit[i]. Its value does not affect decoder conformance to profiles specified in this version of specification.

num_tiles_in_slice_minus1 plus 1, when present, specifies the number of tiles in the slice. The value of num_tiles_in_slice_minus1 may be in the range of 0 to NumTilesInPic−1, inclusive. The variable NumCtusInCurrSlice, which specifies the number of CTUs in the current slice, and the list CtbAddrInCurrSlice[i], for i ranging from 0 to NumCtusInCurrSlice−1, inclusive, specifying the picture raster scan address of the i-th CTB within the slice, are derived as follows:

```
if( rect_slice_flag ) {
   picLevelSliceIdx = slice_address
   for( j = 0; j < CurrSubpicIdx; j++ )
      picLevelSliceIdx += NumSlicesInSubpic[ j ]
   NumCtusInCurrSlice = NumCtusInSlice[ picLevelSliceIdx ]
   for( i = 0; i < NumCtusInCurrSlice; i++ )
      CtbAddrInCurrSlice[ i ] = CtbAddrInSlice[ picLevelSliceIdx ]
```

-continued
```
[ i ] (117)
} else {
   NumCtusInCurrSlice = 0
   for( tileIdx = slice_address; tileIdx <= slice_address + num_tiles_in_slice_minus1; tileIdx++ ) {
      tileX = tileIdx % NumTileColumns
      tileY = tileIdx / NumTileColumns
      for( ctbY = tileRowBd[ tileY ]; ctbY < tileRowBd[ tileY + 1 ]; ctbY++ ) {
         for( ctbX = tileColBd[ tileX ]; ctbX < tileColBd[ tileX + 1 ]; ctbX++ ) {
            CtbAddrInCurrSlice[ NumCtusInCurrSlice ] = ctbY * PicWidthInCtb + ctbX
            NumCtusInCurrSlice++
         }
      }
   }
}
```

The variables SubpicLeftBoundaryPos, SubpicTopBoundaryPos, SubpicRightBoundaryPos, and SubpicBotBoundaryPos are derived as follows:

```
if( subpic_treated_as_pic_flag[ CurrSubpicIdx ] ) {
   SubpicLeftBoundaryPos = subpic_ctu_top_left_x[ CurrSubpicIdx ] * CtbSizeY
   SubpicRightBoundaryPos =
   Min( pic_width_max_in_luma_samples − 1,
      ( subpic_ctu_top_left_x[ CurrSubpicIdx ] +
      subpic_width_minus1[ CurrSubpicIdx ] + 1 ) * CtbSizeY − 1 )
   SubpicTopBoundaryPos = subpic_ctu_top_left_y[ CurrSubpicIdx ] * CtbSizeY
      (118)
   SubpicBotBoundaryPos =
   Min( pic_height_max_in_luma_samples − 1,
      ( subpic_ctu_top_left_y[ CurrSubpicIdx ] +
      subpic_height_minus1[ CurrSubpicIdx ] + 1 ) * CtbSizeY − 1 )
}
```

3.5. Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

3.5.1. 4:4:4

Each of the three Y'CbCr components have the same sample rate, thus there is no chroma subsampling. This scheme is sometimes used in high-end film scanners and cinematic post production.

3.5.2. 4:2:2

Figure 5:
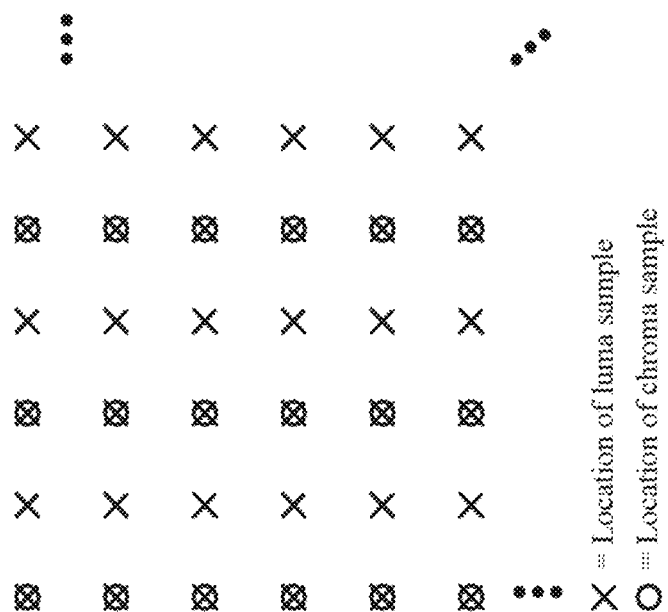
FIG. 5 shows a nominal vertical and horizontal locations of 4:2:2 luma and chroma samples in a picture.

The two chroma components are sampled at half the sample rate of luma: the horizontal chroma resolution is halved while the vertical chroma resolution is unchanged. This reduces the bandwidth of an uncompressed video signal by one-third with little to no visual difference. An example of nominal vertical and horizontal locations of 4:2:2 color format is depicted in FIG. 5 in VVC working draft.

3.5.3. 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are co-sited horizontally. Cb and Cr are sited between pixels in the vertical direction (sited interstitially).

In JPEG/JFIF, H.261, and MPEG-1 Cb and Cr are sited interstitially, halfway between alternate luma samples.

In 4:2:0 DV, Cb and Cr are co-sited in the horizontal direction. In the vertical direction, they are co-sited on alternating lines.

TABLE 3-1

SubWidthC and SubHeightC values derived from chroma_format_idc and separate_colour_plane_flag

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

4. Examples of Technical Problems Solved by Disclosed Embodiments

The existing designs for signalling of SPS/PPS/Picture header/Slice header in VVC have the following problems:
1) When rect_slice_flag is equal to 1, according to the current VVC text, the following applies:
   a. slice address represents the subpicture-level slice index of the slice.
   b. The subpicture-level slice index is defined as the index of a slice to the list of slices in a subpicture in the order as they are signalled in the PPS.
   c. The picture-level slice index is defined as the index of a slice to the list of slices in a picture in the order as they are signalled in the PPS.
   d. For any two slices belonging to two different subpictures, the one associated with the less subpicture index goes earlier in decoding order, and for any two slices belonging to the same subpicture, the one with the less subpicture-level slice index goes earlier in decoding order.
   e. And the derivation of the variable NumCtusInCurrSlice, which specifies the number of CTUs in the current slice, by Equation 117 in the current VVC text, assumes that the order of increasing picture-level slice index values is the same as the decoding order of slices.

However, when some slices are resulted from splitting one tile, some of the above aspects may be violated. As an example shown in FIG. 6, when a picture is partitioned into two tiles by a vertical tile boundary, and each of the two tiles is partitioned into two slices by the same horizontal boundary across the entire picture, and the upper two slices are included into the first subpicture and the lower two slices are included into the second subpicture. In this case, according to the current VVC text, the picture-level slice index values of the four slices in slice raster scan order would be 0, 2, 1, 3, while the decoding order index values of the four slices in slice raster scan order would be 0, 1, 2, 3. Consequently, the derivation of NumCtusInCurrSlice would be incorrect, and in turn the parsing of slice_data would be problematic, the decoded sample values won't be correct, and the decoder would likely to crash.

2) There are two types of slice signalling methods. With the rectangular mode, all the slice partitioning information is signalled in PPS. With the non-rectangular mode, partial of the slice partitioning information is signalled in the slice header, thus in this mode the full slice partitioning of a picture may not be known before parsing all slices of the picture.

3) With the rectangular mode, the slices may be signalled arbitrarily by setting tile_idx_delta. An evil bitstream may make the decoder crash with this mechanism.

4) In some embodiments, an uninitialized tile_idx_delta[i] when i is equal to num_slices_in_pic_minus1.

Figure 6:
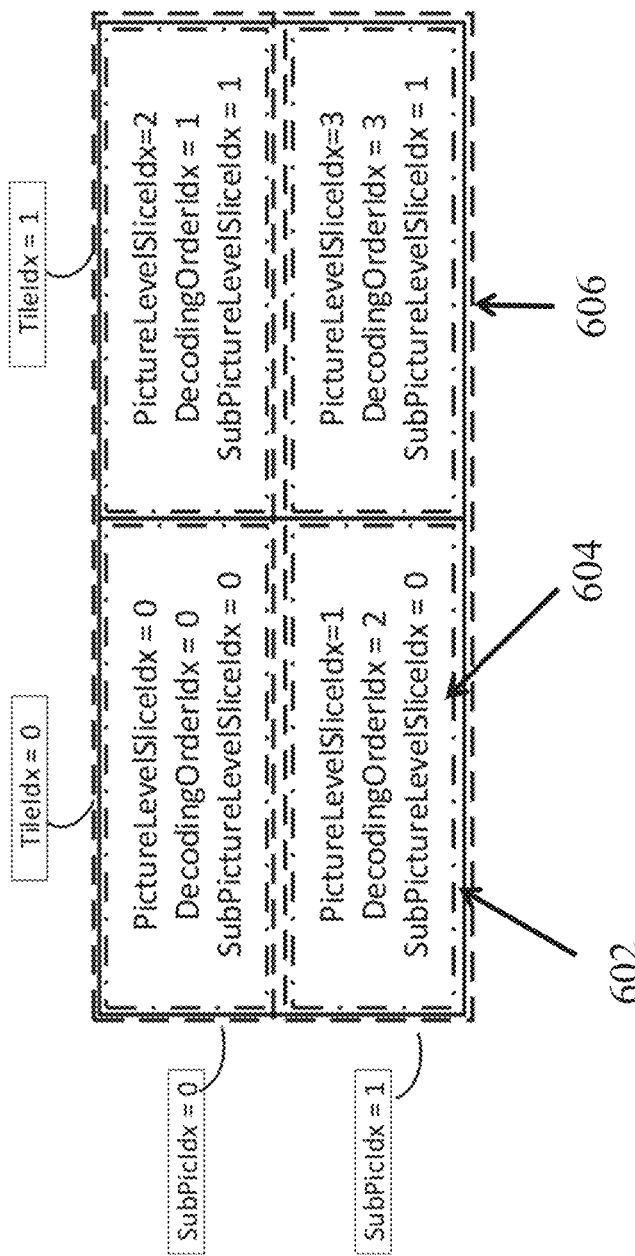
FIG. 6 shows an example of picture partitioning, in which blue lines represent boundaries of tiles, green lines represent boundaries of slices and red dashed lines represent boundaries of subpictures, and in which the picture-level indices, decoding order indices, subpicture-level indices of the four slices and the indices of subpictures and tiles are indicated in the figure.

FIG. 6 shows an example of picture partitioning. Solid lines 602 represent boundaries of tiles; dashed lines 604 represent boundaries of slices and dashed lines 606 represent boundaries of subpictures. The picture-level indices, decoding order indices, subpicture-level indices of the four slices and the indices of subpictures and tiles are indicated in the figure.

5. Example Embodiments and Techniques

To solve the above problems, and others, methods as summarized below are disclosed. The embodiments should be considered as examples to explain the general concepts and should not be interpreted in a narrow way. Furthermore, these embodiments can be applied individually or combined in any manner.

1. For slices of the rectangular slices mode (i.e., when rect_slice_flag is equal to 1), the picture-level slice index for each slice in each subpicture is derived, and the derived value is used for the derivation of the number of CTUs in each slice.

2. The subpicture-level slice index may be defined/derived in the following ways:
   a. In one example, the subpicture-level slice index is defined as "The index of a slice to the list of slices in a subpicture in their decoding order when the rect_slice_flag is equal to 1."
   b. Alternatively, the subpicture-level slice index is defined as "The index of a slice to the list of slices in a subpicture when the rect_slice_flag is equal to 1, as specified by the variable SubpicLevelSliceIdx[i] as derived in Equation 32 (as in Embodiment 1), where i is the picture-level slice index of the slice."
   c. In one example, the subpicture index of each slice with a particular value of picture-level slice index is derived.
   d. In one example, the subpicture-level slice index of each slice with a particular value of picture-level slice index is derived.
   e. In one example, when rect_slice_flag is equal to 1, the semantics of the slice address is specified as "The slice address is the subpicture-level slice index of the slice as specified by the variable SubpicLevelSliceIdx[i] as derived in Equation 32 (e.g., as in Embodiment 1), where i is the picture-level slice index of the slice."
3. A subpicture-level slice index of the slice is assigned to a slice in a first subpicture which contains the slice. The subpicture-level slice index for each slice may be stored in an array (e.g. SubpicLevelSliceIdx[i] in Embodiment 1) indexed by the picture-level slice index.
   a. In one example, the subpicture-level slice index is a non-negative integer.
   b. In one example, the value of a subpicture-level slice index of the slice is greater than or equal to 0.
   c. In one example, the value of a subpicture-level slice index of the slice is smaller than N, wherein N is the number of slices in the subpicture.
   d. In one example, a first subpicture-level slice index (denoted as subIdxA) of a first slice (slice A) may be different to a second subpicture-level slice index (denoted as subIdxB) of a second slice (slice B) if the first slice and the second slice are in the same subpicture but they are different.
   e. In one example, if a first subpicture-level slice index (denoted as subIdxA) of a first slice (slice A) in a first subpicture is smaller than a second subpicture-level slice index (denoted as subIdxB) of a second slice (slice B) in the same first subpicture, IdxA is smaller than IdxB, wherein idxA and idxB represent the slice index in the whole picture (a.k.a. picture-level slice index, e.g. sliceIdx) for slice A and slice B, respectively.
   f. In one example, if a first subpicture-level slice index (denoted as subIdxA) of a first slice (slice A) in a first subpicture is smaller than a second subpicture-level slice index (denoted as subIdxB) of a second slice (slice B) in the same first subpicture, slice A is ahead of slice B in the decoding order.
   g. In one example, the subpicture-level slice index in a subpicture is derived based on the picture-level slice index (e.g. sliceIdx).
4. It is proposed to derive a mapping function/table between the subpicture-level slice index in a subpicture and the picture-level slice index.
   a. In one example, a two-dimensional array PicLevelSliceIdx[subPicIdx][SubPicLevelSliceIdx] is derived to map the subpicture-level slice index in a sub-picture to the picture-level slice index, wherein PicLevelSliceIdx denotes the picture-level slice index of a slice, subPicIdx denotes the index of the subpicture, and SubPicLevelSliceIdx denotes the subpicture-level slice index of the slice in the subpicture.
      i. In one example, an array NumSlicesInSubpic[subPicIdx] is used to derive PicLevelSliceIdx, wherein NumSlicesInSubpic[subPicIdx] denotes the number of slices in the subpicture with index equal to subPicIdx.
         1) In one example, NumSlicesInSubpic[subPicIdx] and PicLevelSliceIdx[subPicIdx][SubPicLevelSliceIdx] are derived in a single process by scanning all the slices in the order of picture-level slice index.
            a. NumSlicesInSubpic[subPicIdx] is set equal to 0 for all valid subPicIdx before the process.
            b. When checking a slice with picture level index equal to S, if it is in the subpicture with subpicture index equal to P, PicLevelSliceIdx[P][NumSlicesInSubpic[P]] is set equal to S, and then NumSlicesInSubpic[P] is set equal to NumSlicesInSubpic[P]+1.
      ii. In one example, SliceIdxInPic[subPicIdx][SubPicLevelSliceIdx] is used to derive the picture level slice index (e.g. picLevelSliceIdx), which is then used to derive the number and/or addresses of CTBs in the slice when parsing the slice header.
5. For a conformance bitstream, one tile may not be permitted to be in more than one subpictures.
6. For a conformance bitstream, one subpicture may not be permitted to include two slices, denoted as slice A and slice B, wherein slice A is in but is smaller than a tile A, and slice B is in but is smaller than a tile B, and tile A and tile B are different.
7. It is proposed that the tile and/or slice portioning information of a picture may be signalled in the associated picture header.
   a. In one example, it is signalled in an associated PPS whether the tile and/or slice portioning information of a picture is signalled in the PPS or in the associated picture header.
   b. In one example, it is signalled in the picture header whether the tile and/or slice portioning information of a picture is in the associated picture header.
      i. In one example, if the tile and/or slice portioning information of a picture is signalled both in an associated PPS and in an associated picture header, the tile and/or slice portioning information of a picture signalled in the picture header will be used.
      ii. In one example, if the tile and/or slice portioning information of a picture is signalled both in an associated PPS and in an associated picture header, the tile and/or slice portioning information of a picture signalled in the PPS will be used.
   c. In one example, it is signalled in a video unit at a level higher than picture (such as in SPS) to indicate whether the tile and/or slice portioning information of a picture is signalled in the associated PPS or in the associated picture header.
8. It is proposed that the slice partitioning information is signalled in a higher-level video unit (such as in PPS and/or picture header) higher than the slice level when the associated picture is partitioned in slices with the non-rectangular mode.
   a. In one example, the information to indicate the number of slices (e.g. num_slices_in_pic_minus1) may be signalled in the higher-level video unit when the associated picture is partitioned in slices with the non-rectangular mode.
   b. In one example, the information to indicate the index (or address, or location, or coordinate) of the first block-unit of a slice in the higher-level video unit when the associated picture is partitioned in slices with the non-rectangular mode. For example, the block-unit may be a CTU or a tile.
   c. In one example, the information to indicate the number of the block-units of a slice in the higher-level video unit when the associated picture is partitioned in slices with the non-rectangular mode. For example, the block-unit may be a CTU or a tile.
   d. In one example, the slice partitioning information (e.g. num_tiles_in_slice_minus1) is not signalled in the slice header when the associated picture is partitioned in slices with the non-rectangular mode.

e. In one example, the slice index is signalled in the slice header when the associated picture is partitioned in slices with the non-rectangular mode.
   i. In one example, slice_address is interpreted as the picture-level slice index when the associated picture is partitioned in slices with the non-rectangular mode.
f. In one example, the partitioning information (such as the index of the first block-unit and/or the number of the block-units) of each slice in a picture may be signalled in an order in the higher-level video unit when the associated picture is partitioned in slices with the non-rectangular mode.
   i. In one example, the index of a slice may be signalled for each slice in the higher-level video unit when the associated picture is partitioned in slices with the non-rectangular mode.
   ii. In one example, the partitioning information of each slice is signalled in an ascending order of slice indices.
      1) In one example, the partitioning information of each slice is signalled in the order of slice 0, slice 1, . . . , slice K−1, slice K, slice K+1, . . . slice S−2, slice S−1, wherein K represents a slice index and S represents the number of slices in the picture.
   iii. In one example, the partitioning information of each slice is signalled in a descending order of slice indices.
      1) In one example, the partitioning information of each slice is signalled in the order of slice S−2, slice S−1, . . . , slice K+1, slice K, slice K−1, . . . , slice 1, slice 0, wherein K represents a slice index and S represents the number of slices in the picture.
   iv. In one example, the index of the first block-unit for a slice may not be signalled in the higher-level video unit when the associated picture is partitioned in slices with the non-rectangular mode.
      1) For example, the index of the first block-unit for slice 0 (the slice with the slice index equal to 0) is inferred to be 0.
      2) For example, the index of the first block-unit for slice K (the slice with the slice index equal to K, K>0) is inferred to be $$\sum_{i=0}^{K-1} N_i,$$

wherein $N_i$ represents the number of block-units in slice i.
   v. In one example, the index of the first block-unit for a slice may not be signalled in the higher-level video unit when the associated picture is partitioned in slices with the non-rectangular mode.
      1) For example, the index of the first block-unit for slice 0 (the slice with the slice index equal to 0) is inferred to be 0.
      2) For example, the index of the first block-unit for slice K (the slice with the slice index equal to K, K>0) is inferred to be $$\sum_{i=0}^{K-1} N_i,$$

wherein $N_i$ represents the number of block-units in slice i.
   vi. In one example, the number of block-units for a slice may not be signalled in the higher-level video unit when the associated picture is partitioned in slices with the non-rectangular mode.
      1) The number of block-units for slice 0 is M when there is only one slice in the picture and there are M blocks units in the picture.
      2) For example, the number of block-units for slice K (the slice with the slice index equal to 0) is inferred to be $T_{K+1}-T_K$, wherein $T_K$ represents the index of the first block-unit for slice K when K<S−1, wherein S is the number of slices in the picture and S>1.
      3) For example, the number of block-units for slice S−1 is inferred to be $$M - \sum_{i=0}^{S-2} N_i,$$

wherein S is the number of slices in the picture and S>1, M is the number of blocks units in the picture.
   vii. In one example, the partitioning information of one or more slices may NOT be signalled in the higher-level video unit when the associated picture is partitioned in slices with the non-rectangular mode.
      1) In one example, the partitioning information of one or more slices may NOT be signalled in the higher-level video unit may be inferred by the partitioning information of other slices to be signalled.
      2) In one example, the partitioning information of the last C slices may NOT be signalled. E.g. C is equal to 1.
      3) For example, the number of block-units for slice S−1 is not signalled, wherein S is the number of slices in the picture and S>1.
         a. For example, the number of block-units for slice S−1 is inferred to be $$M - \sum_{i=0}^{S-2} N_i,$$

wherein there are M blocks units in the picture.
9. It is proposed that the minimum number of slices in a picture may be different depending on whether rectangular partitioning is applied, or non-rectangular partitioning is applied.
   a. In one example, the picture is partitioned into at least two slices if non-rectangular partitioning mode is applied, and the picture is partitioned into at least one slice if rectangular partitioning mode is applied.
      i. For example, num_slices_in_pic_minus2 plus 2 specifying the number of slices in a picture may be signalled if non-rectangular partitioning mode is applied.
   b. In one example, the picture is partitioned into at least one slices if non-rectangular partitioning mode is applied, and the picture is partitioned into at least one slice if rectangular partitioning mode is applied.

i. For example, num_slices_in_pic_minus2 plus 2 specifying the number of slices in a picture may be signalled if rectangular partitioning mode is applied.
c. In one example, the minimum number of slices in a picture may be different depending on whether rectangular partitioning is applied, or non-rectangular partitioning is applied when the picture is not partitioned into subpictures or partitioned into only one subpicture.
10. It is proposed that a slice is represented by the top-left location and the width/height of the slice when the partitioning information is signalled in a video unit such as PPS or picture header.
   a. In one example, the index/location/coordinate of the top-left block-unit (such as CTU or tile) and/or the width measured with video unit (such as CTU or tile), and/or height measured with video unit (such as CTU or tile) of a slice is signalled.
   b. In one example, the information of top-left location and the width/height of each slice is signalled in an order.
      i. For example, the information of top-left location and the width/height of each slice is signalled in an ascending order of slice indices, such as 0, 1, 2, . . . , S−1, wherein S is the number of slices in a picture.
11. It is proposed that the partitioning information (such as location/width/height) for slices in a subpicture is signalled in a video unit such as SPS/PPS/picture header.
   a. In one example, the slice partitioning information for each subpicture is signalled in an order.
      i. For example, the slice partitioning information for each subpicture is signalled in an ascending order of subpicture index.
   b. In one example, the partitioning information (such as location/width/height) for each slice in a subpicture is signalled in an order.
      i. In one example, the partitioning information (such as location/width/height) for each slice in a subpicture is signalled in an ascending order of subpicture-level slice index.
12. It is proposed that the difference between the tile index of the first tile in the i-th rectangular slice and the tile index of the first tile in the (i+1)-th rectangular slice (denoted as tile_idx_delta[i]) is not signalled but derived.
   a. In one example, the tile index of the first tile in the (i+1)-th rectangular slice is derived based on the rectangular slices from the $0^{th}$ rectangular slice to the i-th rectangular slice.
   b. In one example, the tile index of the first tile in the (i+1)-th rectangular slice is derived to be the minimum index of the tiles, which are not inside the rectangular slices from the $0^{th}$ rectangular slice to the i-th rectangular slice.
13. It is proposed that the signalling of information to derive the number of tile columns/rows (e.g. NumTileColumns or NumTileRows) may be conditioned on the relationship between the width of a picture and the size of a CTU.
   a. For example, num_exp_tile_columns_minus1 and/or tile_column_width_minus1 may not be signalled if the width of a picture is smaller than or equal to the size or width of a CTU.
   b. For example, num_exp_tile_rows_minus1 and/or tile_row_height_minus1 may not be signalled if the height of a picture is smaller than or equal to the size or height of a CTU.
14. There may be one and only one CurrSubpicIdx that satisfies SubpicIdVal[CurrSubpicIdx] is equal to slice_subpic_id when slice_subpic_id is present.
15. If rect_slice_flag is equal to 0 or subpic_info_present flag is equal to 0, the value of slice_address+i, wherein i is in the range of 0 to num_tiles_in_slice_minus1, inclusively, may not be equal to the value of slice_address+j, wherein j is in the range of 0 to num_tiles_in_slice_minus1, inclusively, of any other coded slice NAL unit of the same coded picture, wherein i is in the range.
16. In case that there are both uniform spacing tiles and non-uniform spacing tiles in pictures, a syntax element may be signalled in PPS (or SPS) to specify the type of tile layout.
   a. In one example, there may be a syntax flag signalled in PPS to specify whether the tile layout is non-uniform spacing followed by uniform spacing, or, uniform spacing followed by non-uniform spacing.
   b. For example, whenever there are non-uniform spacing tiles, the number of explicitly provided tile columns/rows (e.g., num_exp_tile_columns_minus1, num_exp_tile_rows_minus1) may be NO less than the total number of non-uniform tiles.
   c. For example, whenever there are uniform spacing tiles, the number of explicitly provided tile columns/rows (e.g., num_exp_tile_columns_minus1, num_exp_tile_rows_minus1) may be less or equal to the total number of uniform tiles.
   d. If the tile layout is like uniform spacing followed by non-uniform spacing (i.e., a picture is starting with uniform spacing tiles and ended with multiple non-uniform spacing tiles).
      i. In one example, the widths of tile columns for non-uniform spacing tiles located in the latter of picture may be firstly assigned in inverse order (i.e., with the order of the tile index equal to NumTileColumns, NumTileColumns−1, NumTileColumns−2, . . . ), and then the widths of tile columns for uniform spacing tiles located in the former of picture may be implicitly derived in inverse order (i.e., with the order of the tile index equal to NumTileColumns−T, NumTileColumns−T−1, . . . , 2, 1, 0, where T indicate the number of non-uniform tile columns).
      ii. The heights of tile rows may be derived in a same way of the width of tile columns as mentioned above.
17. The syntax element to specify the difference between the representative tile indices of two rectangular slices, wherein one of them is the i-th slice (e.g. tile_idx_delta[i]) can only be used when a condition is true.
   a. In one example, the condition is (i<num_slices_in_pic_minus1), wherein num_slices_in_pic_minus1 plus 1 represents the number of slices in the picture.
   b. In one example, the condition is (i!=num_slices_in_pic_minus1), wherein num_slices_in_pic_minus1 plus 1 represents the number of slices in the picture.
18. Whether to and/or how to signal or interpret or restrict the Merge Estimation Region (MER) size (e.g. signalled by log 2_parallel_merge_level_minus2) may depend on the minimum allowed coding block size (e.g. signalled/denoted as log 2_min_luma_coding_block_size_minus2 and/or MinCbSizeY).
  a. In one example, the size of MER may not be smaller than the minimum allowed coding block size.
    i. For example, log 2_parallel_merge_level_minus2 may be equal to or larger than log 2 min luma coding block size minus2.
    ii. For example, log 2_parallel_merge_level_minus2 may be in the range of log 2 min luma coding block size minus2 to CtbLog 2SizeY−2.
  b. In one example, the difference between Log 2(MER size) and Log 2(MinCbSizeY) is signalled, which is denoted as log 2_parallel_merge_level_minus_log 2_mincb.
    i. For example, log 2_parallel_merge_level_minus_log 2_mincb is coded by a unary code (ue).
    ii. For example, log 2_parallel_merge_level_minus_log 2_mincb may be in the range of 0 to CtbLog 2SizeY−log 2 min luma coding block size minus2-2.
    iii. For example, Log 2ParMrgLevel=log 2_parallel_merge_level_minus_log 2_mincb+log 2 min luma coding block size minus2+2, wherein Log 2ParMrgLevel is used to control the MER size.
19. It is proposed that, when num_exp_slices_in_tile[i] is equal to 0, the slice height in units of CTU rows for the i-th slice, e.g., denoted as sliceHeightInCtus[i], is derived.
  a. In one example, sliceHeightInCtus[i] is derived to be equal to RowHeight[SliceTopLeftTileIdx[i]/NumTileColumns] when num_exp_slices_in_tile[i] is equal to 0.
20. It is proposed that the (num_exp_slices_in_tile[i]−1)-th slice in the tile containing the i-th slice in a picture always exists and the height is always exp_slice_height_in_ctus_minus1[i][num_exp_slices_in_tile[i]−1]+1 CTU rows.
  a. Alternatively, the (num_exp_slices_in_tile[i]−1)-th slice in the tile containing the i-th slice in a picture may or may not exist and the height is less than or equal to exp_slice_height_in_ctus_minus1[i][num_exp_slices_in_tile[i]−1]+1 CTU rows.
21. It is proposed that, during the derivation of information for rectangular slices, the variable tileIdx is only updated for slices with picture-level slice index less than num_slices_in_pic_minus1, i.e., not updated for the last slice in each picture referring to the PPS.
22. It is proposed that the num_exp_tile_columns_minus1-th tile column always exists in pictures referring to the PPS and the width is always tile_column_width_minus1[num_exp_tile_columns_minus1]+1 CTBs.
23. It is proposed that the num_exp_tile_rows_minus1-th tile row always exists in pictures referring to the PPS and the height is always tile_column_height_minus1[num_exp_tile_rows_minus1]+1 CTBs.
24. It is proposed that, when the max picture width and the max picture height are both not greater than CtbSizeY, the signalling of the syntax element sps_num_subpics_minus1 may be skipped.
  a. Alternatively, additionally, the value of sps_num_subpics_minus1 is inferred to be equal to 0 when the above condition is true.
25. It is proposed that, when the picture width is not greater than CtbSizeY, the signalling of the syntax element num_exp_tile_columns_minus1 may be skipped.
  b. Alternatively, additionally, the value of num_exp_tile_columns_minus1 is inferred to be equal to 0 when the above condition is true.
26. It is proposed that, when the picture height is not greater than CtbSizeY, the signalling of the syntax element num_exp_tile_rows_minus1 may be skipped.
  c. Alternatively, additionally, the value of num_exp_tile_row_minus1 is inferred to be equal to 0 when the above condition is true.
27. It is proposed that, when num_exp_tile_columns_minus1 is equal to PicWidthInCtbsY−1, the signalling of the syntax elements tile_column_width_minus1[i] for i ranging from 0 to num_exp_tile_columns_minus1, inclusive, may be skipped.
  d. Alternatively, additionally, the value of tile_column_width_minus1[i] is inferred to be equal to 0.
28. It is proposed that, when num_exp_tile_rows_minus1 is equal to PicHeightInCtbsY−1, the signalling of the syntax elements tile row height minus1[i] for i ranging from 0 to num_exp_tile_rows_minus1, inclusive, may be skipped.
  e. Alternatively, additionally, the value of tile row height minus1[i] is inferred to be equal to 0.
29. It is proposed that the height of uniform slices that partition a tile is indicated by the last entry of exp_slice_height_in_ctus_minus1[ ]s that indicate height of slices in that tile. Uniform slices are slices below slices explicitly signalled. For example: uniformSliceHeight=exp_slice_height_in_ctus_minus1[i][num_exp_slices_in_tile[i]−1]+1
30. It is proposed that the width of 'num_exp_tile_columns_minus1'-th tile column is disallowed to be reset, that is, the parsed value from the bitstream (e.g., denoted by tile_column_width_minus1[num_exp_tile_columns_minus1]) may be directly used to derive the width without referring other information.
  a. In one example, the width of 'num_exp_tile_columns_minus1'-th tile column is directly set to tile_column_width_minus1[num_exp_tile_columns_minus1] plus 1. Alternatively, furthermore, tile_column_width_minus1[num_exp_tile_columns_minus1] is used to derive the width of the tile columns with index greater than num_exp_tile_columns_minus1, e.g., as specified in clause 6.5.1.
  b. Similarly, for the height of 'num_exp_tile_columns_minus1'-th tile row is disallowed to be reset, that is, the parsed value from the bitstream (e.g., denoted by tile_row_height_minus1[num_exp_tile_columns_minus1]) may be directly used to derive the height without referring other information.
    i. In one example, the height of 'num_exp_tile_columns_minus1'-th tile row is directly set to tile_row_height_minus1[num_exp_tile_columns_minus1] plus 1. Alternatively, furthermore, tile_row_height_minus1[num_exp_tile_columns_minus1] is used to derive the height of the tile rows with index greater than num_exp_tile_columns_minus1, e.g., as specified in clause 6.5.1.

31. It is proposed that the height of the (num_exp_slices_in_tile[i]−1)-th slice in a tile is disallowed to be reset, that is, the parsed value from the bitstream (e.g., denoted by exp_slice_height_in_ctus_minus1[i][num_exp_slices_in_tile[i]−1]) may be directly used to derive the height without referring other information.
   a. In one example, the height of the (num_exp_slices_in_tile[i]−1)-th slice in a tile is directly set to exp_slice_height_in_ctus_minus1[i][num_exp_slices_in_tile[i]−1] plus 1. Alternatively, furthermore, exp_slice_height_in_ctus_minus1[i][num_exp_slices_in_tile[i]−1] is used to derive the height of the slices with index greater than num_exp_slices_in_tile[i]−1.

6. Embodiments

In the embodiments below, the added portions are marked as bold, underlined, and italicized texts. The deleted portions are marked within [[ ]].

6.1. Embodiment 1: Example Subpicture Level Slice Index Changes

3 Definitions picture-level slice index: [[An]] *The* index of a slice to the list of slices in a picture in the order as they are signalled in the PPS when the rect_slice_flag is equal to 1.
[[subpicture-level slice index: An index of a slice to the list of slices in a subpicture in the order as they are signalled in the PPS when the rect_slice_flag is equal to 1.]]
*subpicture - level slice index* : *The index of a slice to the list of slices in a subpicture in their decoding order when the rect_slice flag is equal to 1.*

6.5.1 CTB Raster Scanning, Tile Scanning, and Subpicture Scanning Processes
[[The list NumSlicesInSubpic[i], specifying the number of rectangular slices in the i-th subpicture,]] *The varibale NumSlices InSubpic[ j ], specifying the number of rectangular slices in the j-th subpicture*, *the variable SubpicIdxOfSlice[ i ], specifying the subpicture index of the slice with picture-level slice index i, the variable SubpicLevelSliceIdx[ i ], specifying the subpicture-level slice index of the slice with picture-level slice index i,* and the variable *PicLevelSliceIdx[ m ][ n ], specfiying the picture-level slice index for the slice with subpicture-level slice index n in the m-th subpicture, are* [[is]] derived as follows:

```
for( j = 0; j <= sps_num_subpics_minus1; j++ )
    NumSlicesInSubpic[ j ] = 0
for( i = 0; i <= num_slices_in_pic_minus1; i++ ) {
    posX = CtbAddrInSlice[ i ][ 0 ] % PicWidthInCtbsY
    posY = CtbAddrInSlice[ i ][ 0 ] / PicWidthInCtbsY
    for( j=0; j <= sps_num_subpics_minus1; j++ ) {
        if( ( posX >= subpic_ctu_top_left_x[ j ] ) &&          (32)
            ( posX < subpic_ctu_top_left_x[ j ] +
subpic_width_minus1[ j ] + 1 )
&&
            ( posY >= subpic_ctu_top_left_y[ j ] ) &&
            ( posY < subpic_ctu_top_left_y[ j ] + subpic_height_minus1[ j ] +
1 ) ) {
```

-continued

```
            SubpicIdxOfSlice[ i ] = j
            SubpicLevelSliceIdx[ i ]  =  NumSlicesInSubpic[ j ]
            PicLevelSliceIdx[ j ][ SubpicLevel SliceIdx[ i ] ] = i
            NumSlicesInSubpic[ j ]++
        }
    }
}
...
```

7.4.8.1 General Slice Header Semantics
. . .
slice_address specifies the slice address of the slice. When not present, the value of slice address is inferred to be equal to 0. When rect_slice_flag is equal to 1 and NumSlicesInSubpic[CurrSubpicIdx] is equal to 1, the value of slice address is inferred to be equal to 0.
If rect_slice_flag is equal to 0, the following applies:
  The slice address is the raster scan tile index.
  The length of slice_address is Ceil(Log 2 (NumTilesInPic)) bits.
  The value of slice_address may be in the range of 0 to NumTilesInPic−1, inclusive.
Otherwise (rect_slice_flag is equal to 1), the following applies:
  The slice_address is the subpicture-level slice index of the slice *as specified by the variable SubpicLevelSliceIdx[ i ] derived in Equation 32, where i is the picture-level slice index of the slice.*
  The length of slice_address is Ceil(Log 2(NumSlicesInSubpic[CurrSubpicIdx])) bits.
  The value of slice_address may be in the range of 0 to NumSlicesInSubpic[CurrSubpicIdx]−1, inclusive.
For bitstream conformance, the following constraints may apply:
  If rect_slice_flag is equal to 0 or subpic_info_present flag is equal to 0, the value of slice_address may not be equal to the value of slice_address of any other coded slice NAL unit of the same coded picture.
  Otherwise, the pair of slice_subpic_id and slice_address values may not be equal to the pair of slice_subpic_id and slice_address values of any other coded slice NAL unit of the same coded picture.
The shapes of the slices of a picture may be such that each CTU, when decoded, may have its entire left boundary and entire top boundary consisting of a picture boundary or consisting of boundaries of previously decoded CTU(s).
. . .
  num_tiles_in_slice_minus1 plus 1, when present, specifies the number of tiles in the slice. The value of num_tiles_in_slice_minus1 may be in the range of 0 to NumTilesInPic−1, inclusive.
  The variable NumCtusInCurrSlice, which specifies the number of CTUs in the current slice, and the list CtbAddrInCurrSlice[i], for i ranging from 0 to NumCtusInCurrSlice−1, inclusive, specifying the picture raster scan address of the i-th CTB within the slice, are derived as follows:

```
if( rect_slice_flag ) {
    picLevelSliceIdx = PicLevelSliceIdx[ CurrSubpicIdx ][
slice_address ]
    [[ for( j = 0; j < CurrSubpicIdx; j++ )
        picLevelSliceIdx += NumSlicesInSubpic[ j ]]]
    NumCtusInCurrSlice = NumCtusInSlice[ picLevelSliceIdx ]
```

```
    for( i = 0; i < NumCtusInCurrSlice; i++ )
        CtbAddrInCurrSlice[ i ] = CtbAddrInSlice[ picLevelSliceIdx ]
[ i ]                                                           (117)
} else {
    NumCtusInCurrSlice = 0
    for( tileIdx = slice_address; tileIdx <=
slice_address + num_tiles_in_slice_minus1; tileIdx++ ) {
        tileX = tileIdx % NumTileColumns
        tileY = tileIdx / NumTileColumns
        for( ctbY = tileRowBd[ tileY ]; ctbY < tileRowBd[ tileY + 1 ];
ctbY++ ) {
            for( ctbX = tileColBd[ tileX ]; ctbX < tileColBd[ tileX + 1 ];
ctbX++ ) {
                CtbAddrInCurrSlice[ NumCtusInCurrSlice ] =
                    ctbY * PicWidthInCtb + ctbX
                NumCtusInCurrSlice++
            }
        }
    }
}
...
```

6.2. Embodiment 2: Signalling Slices in PPS for Non-Rectangular Mode

7.3.2.4 Picture Parameter Set RBSP Syntax

| | Descriptor |
|---|---|
| pic_parameter_set_rbsp( ) { | |
|   pps_pic_parameter_set_id | ue(v) |
|   ... | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     if( NumTilesInPic > 1 ) | |
|       rect_slice_flag | u(1) |
|     if( rect_slice_flag ) | |
|       single_slice_per_subpic_flag | u(1) |
|       <u>*if(!single_slice_per_subpic_flag)*</u> | |
|         <u>*num_slices_in_pic_minus1*</u> | <u>*ue(v)*</u> |
|     <u>*if( !rect_slice_flag ){*</u> | |
|       <u>*for( i = 0; i < num_slices_in_pic_minus1; i++ )*</u> | |
|         <u>*num_tiles_in_slice_minus1[ i ]*</u> | <u>*ue(v)*</u> |
|     <u>*}*</u> | |
|     <u>*else*</u> if( [[rect_slice_flag &&]] !single_slice_per_subpic_flag ) { | |
|       [[ num_slices_in_pic_minus1 | ue(v)]] |
|       if( num_slices_in_pic_minus1 > 0 ) | |
|         tile_idx_delta_present_flag | u(1) |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && | |
|           ( tile_idx_delta_present_flag \|\| tileIdx % NumTileColumns == 0 ) ) | |
|           slice_height_in_tiles_minus1[ i ] | ue(v) |
|         if( slice_width_in_tiles_minus1[ i ] == 0 && | |
|           slice_height_in_tiles_minus1[ i ] == 0 && | |
|           RowHeight[ SliceTopLeftTileIdx[ i ] / NumTileColumns ] > 1 ) { | |
|           num_exp_slices_in_tile[ i ] | ue(v) |
|           numExpSlicesInTile = num_exp_slices_in_tile[ i ] | |
|           for( j = 0; j < numExpSlicesInTile; j++ ) | |
|             exp_slice_height_in_ctus_minus1[ j ] | ue(v) |
|           i += NumSlicesInTile[ i ] | |
|         } | |
|         if( tile_idx_delta_present_flag && i < num_slices_in_pic_minus1 ) | |
|           tile_idx_delta[ i ] | se(v) |
|       } | |
|     } | |
|     loop_filter_across_tiles_enabled_flag | u(1) |
|     loop_filter_across_slices_enabled_flag | u(1) |
|   } | |

7.3.7.1 General Slice Header Syntax

|  | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic | |
|     [ CurrSubpicIdx ] > 1 ) || | |
|       ( !rect_slice_flag && *NumSlicesInPic* | |
|       [[NumTilesInPic]] > 1 ) ) | |
|     slice_address | u(v) |
|   for( I = 0; I < NumExtraPhBits; i++ ) | |
|     sh_extra_bit[ I ] | u(1) |
|   [[if( !rect_slice_flag && NumTilesInPic > 1 ) | |
|     num_tiles_in_slice_minus1 | ue(v)]] |
|   if( ph_inter_slice_allowed_flag ) | |
|     slice_type | ue(v) |
|   ... | |

7.4.3.4 Picture Parameter Set RBSP Semantics num_slices_in_pic_minus1 plus 1 specifies the number of [[rectangular]] slices in each picture referring to the PPS. The value of num_slices_in_pic_minus1 may be in the range of 0 to MaxSlicesPerPicture−1, inclusive, where MaxSlicesPerPicture is specified in Annex A. When no_pic_partition_flag is equal to 1, the value of num_slices_in_pic_minus1 is inferred to be equal to 0. *NumSliceInPic is set equal to be num_slices_in_pic_minus1 + 1. num_tiles_in_slice minus1[ i ] plus 1, when present, specifies the number_of_tiles in the slice with the picture level slice index equal to i. The value of num_tiles_in_slice_minus1[ i ] may be in the range of 0 to NumTilesInPic 1, inclusive. − The array FirstTile InSlice[ i ] specifying the tile index of the first tile in a slice with the picture- level slice index equal to i, and The array Num TileInSlice[ i ] specifying the number of tiles in a slice with the picture-level slice index equal to i are derived as follows when rect_slice_flag is equal to 0:*
*FirstTileInSlice[0]=0*
*CurrNumSlices=0*
*for(i=0;i<num_slices_in_pic_minus1;i++){*
*NumTileInSlice[i] =num_tiles_in)slice_minus1[i]+1*
*CurrNumSlices*
*= CurrNumSlices + NumTileInSlice[ i ]*
*  FirstTileInSlice[ i + 1 ]*
*= FirstTileInSlice[ i ] + NumTileInSlice[ i ] }*
*NumTileInSlice [ num_slice_in_pic_minus1 ]*
*= NumTilesInPic*
*− CurrNumSlices FirstTileInSlice[ i ]*
*may be no smaller than 0 and not bigger than NumTilesInPic − 1. NumTileInSlice [ i ] may be no smaller than 1 and not bigger than NumTilesInPic. The sum of Num TileInSlice [ i ] for i from 0 to NumSlicesInPic may be equal to NumTilesInPic.*

7.4.8.1 General Slice Header Semantics

...
slice_address specifies the slice_address of the slice. When not present, the value of slice_address is inferred to be equal to 0. When rect_slice_flag is equal to 1 and NumSlicesInSubpic[CurrSubpicIdx] is equal to 1, the value of slice_address is inferred to be equal to 0. When rect_slice_flag is equal to 0 and NumSlicesInPic is equal to 1, the value of slice_address is inferred to be equal to 0

If rect_slice_flag is equal to 0, the following applies:
  The slice_address is the *picture-level slice index of the slice* [[raster scan tile index]].
  The length of slice_address is Ceil(Log 2 ( *NumSlicesInPic* [[NumTilesInPic]])) bits.
  The value of slice_address may be in the range of 0 to *NumSlicesInPic* [[NumTilesInPic]]−1, inclusive.
Otherwise (rect_slice_flag is equal to 1), the following applies:
  The slice_address is the subpicture-level slice index of the slice.
  The length of slice_address is Ceil(Log 2(NumSlicesInSubpic[CurrSubpicIdx])) bits.
  The value of slice_address may be in the range of 0 to NumSlicesInSubpic[CurrSubpicIdx]−1, inclusive.
For bitstream conformance, the following constraints may apply:
  [[If rect_slice_flag is equal to 0 or subpic_info_present flag is equal to 0, the value of slice_address may not be equal to the value of slice_address of any other coded slice NAL unit of the same coded picture.
  Otherwise,]] *If rect_slice flag is equal to 1,* the pair of slice_subpic_id and slice_address values may not be equal to the pair of slice_subpic_id and slice_address values of any other coded slice NAL unit of the same coded picture.
  The shapes of the slices of a picture may be such that each CTU, when decoded, may have its entire left boundary and entire top boundary consisting of a picture boundary or consisting of boundaries of previously decoded CTU(s).

...

The variable NumCtusInCurrSlice, which specifies the number of CTUs in the current slice, and the list CtbAddrInCurrSlice[i], for i ranging from 0 to NumCtusInCurrSlice−1, inclusive, specifying the picture raster scan address of the i-th CTB within the slice, are derived as follows:

```
if( rect_slice_flag ) {
  picLevelSliceIdx = slice_address
  for( j = 0; j < CurrSubpicIdx; j++ )
    picLevelSliceIdx += NumSlicesInSubpic[ j ]
  NumCtusInCurrSlice = NumCtusInSlice[ picLevelSliceIdx ]
  for( i = 0; i < NumCtusInCurrSlice; i++ )
    CtbAddrInCurrSlice[ i ] = CtbAddrInSlice[ picLevelSliceIdx ]
[ i ]   (117)
} else {
  NumCtusInCurrSlice = 0
  for( tileIdx = FirstTileInSlice[ slice_address ]; tileIdx [[<=]]
< FirstTileInSlice[
slice_address ] + NumTileInSlice[ slice_address ]
[[num_tiles_in_slice_minus1]]; tileIdx++ ) {
    tileX = tileIdx % NumTileColumns
    tileY = tileIdx / NumTileColumns
    for( ctbY = tileRowBd[ tileY ]; ctbY < tileRowBd[ tileY + 1 ];
ctbY++ ) {
      for( ctbX = tileColBd[ tileX ]; ctbX < tileColBd[ tileX + 1 ];
ctbX++ ) {
        CtbAddrInCurrSlice[ NumCtusInCurrSlice ] =
ctbY * PicWidthInCtb + ctbX
        NumCtusInCurrSlice++
      }
    }
  }
}
```

6.3. Embodiment 3: Signalling Tiles Conditioned on Picture Dimensions

7.3.2.4 Picture Parameter Set RBSP Syntax

|  | Descriptor |
|---|---|
| pic_parameter_set_rbsp( ) { | |
|   pps_pic_parameter_set_id | ue(v) |
| ... | |
|   no_pic_partition_flag | u(1) |
|   if( !no_pic_partition_flag ) { | |
|     pps_log2_ctu_size_minus5 | u(2) |
|     [[num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v)]] |
|     <u>if(pic_width_in_luma_samples>CtbSizeY){</u> | |
|       <u>num_exp_tile_columns_minus1</u> | <u>ue(v)</u> |
|       <u>for(i=0;i <= num_exp_tile_columns_minus1; i++ )</u> | |
|         <u>tile_column_width_minus1[ i ]</u> | <u>ue(v)</u> |
|     <u>}</u> | |
|     <u>if( pic_height_in_luma_samples > CtbSizeY ) {</u> | |
|       <u>num_exp_tile_rows_minus1</u> | <u>ue(v)</u> |
|       <u>for( i = 0; i <= num_exp_tile_rows_minus1; i++ )</u> | |
|         <u>tile_row_height_minus1[ i ]</u> | <u>ue(v)</u> |
|     <u>}</u> | |
|     if( NumTilesInPic > 1 ) | |
|       rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       if( num_slices_in_pic_minus1 > 0 ) | |
|         tile_idx_delta_present_flag | u(1) |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && | |
|           ( tile_idx_delta_present_flag \|\| tileIdx % NumTileColumns = = 0 ) ) | |
|           slice_height_in_tiles_minus1[ i ] | ue(v) |
|         if( slice_width_in_tiles_minus1[ i ] = = 0 && | |
|           slice_height_in_tiles_minus1[ i ] = = 0 && | |
|           RowHeight[ SliceTopLeftTileIdx[ i ] / NumTileColumns ] > 1 ) | |
|         { | |
|           num_exp_slices_in_tile[ i ] | ue(v) |
|           numExpSlicesInTile = num_exp_slices_in_tile[ i ] | |
|           for( j = 0; j < numExpSlicesInTile; j++ ) | |
|             exp_slice_height_in_ctus_minus1[ j ] | ue(v) |
|           i += NumSlicesInTile[ i ] | |
|         } | |
|         if( tile_idx_delta_present_flag && i < num_slices_in_pic_minus1 ) | |
|           tile_idx_delta[ i ] | se(v) |
|       } | |
|     } | |
|     loop_filter_across_tiles_enabled_flag | u(1) |
|     loop_filter_across_slices_enabled_flag | u(1) |
|   } | |
| ... | |

6.4. Embodiment 4: Example 1 of Semantics on Tile_Column_Width_Minus1 and Tile_Row_Height_Minus1

7.4.3.4 Picture Parameter Set RBSP Semantics

. . .

tile_column_width_minus1[i] plus 1 specifies the width of the i-th tile column in units of CTBs for i in the range of 0 to num_exp_tile_columns_minus1−1, inclusive, <u>when num_exp_tile columns_minus1 is larger than 0.</u> tile_column_width_minus1[num_exp_tile_columns_minus1] is used to derive the width of the tile columns with index greater than or equal to num_exp_tile_columns_minus1 as specified in clause 6.5.1. The value of tile_column_width_minus1[i] may be in the range of 0 to PicWidthInCtbsY−1, inclusive. When not present, the value of tile_column_width_minus1[0] is inferred to be equal to PicWidthInCtbsY−1.

tile_row_height_minus1[i] plus 1 specifies the height of the i-th tile row in units of CTBs for i in the range of 0 to num_exp_tile_rows_minus1−1, inclusive, <u>when num_exp_tile_rows_minus1 is larger than 0.</u> tile_row_height_minus1[num_exp_tile_rows_minus1] is used to derive the height of the tile rows with index greater than or equal to num_exp_tile_rows_minus1 as specified in clause 6.5.1. The value of tile_row_height_minus1[i] may be in the range of 0 to PicHeightInCtbsY−1, inclusive. When not present, the value of tile_row_height_minus1[0] is inferred to be equal to PicHeightInCtbsY−1.

6.5. Embodiment 5: Example 2 of Semantics on Tile_Column_Width_Minus1 and Tile_Row_Height_Minus1

7.4.3.4 Picture Parameter Set RBSP Semantics
. . .
tile_column_width_minus1[i] plus 1 specifies the width of the i-th tile column in units of CTBs for i in the range of 0 to Max( 0, num_exp_tile_columns_minus1−1) inclusive, tile_column_width_minus1[num_exp_tile_columns_minus1] is used to derive the width of the tile columns with index greater than or equal to num_exp_tile_columns_minus1 as specified in clause 6.5.1. The value of tile_column_width_minus1[i] may be in the range of 0 to PicWidthInCtbsY−1, inclusive. When not present, the value of tile_column_width_minus1[0] is inferred to be equal to PicWidthInCtbsY−1.
tile_row_height_minus1[i] plus 1 specifies the height of the i-th tile row in units of CTBs for i in the range of 0 to Max( 0, num_exp_tile_rows_minus1) inclusive. tile_row_height_minus1[num_exp_tile_rows_minus1] is used to derive the height of the tile rows with index greater than or equal to num_exp_tile_rows_minus1 as specified in clause 6.5.1. The value of tile_row_height_minus1[i] may be in the range of 0 to PicHeightInCtbsY−1, inclusive. When not present, the value of tile_row_height_minus1[0] is inferred to be equal to PicHeightInCtbsY−1.
. . .

6.6. Embodiment 6: Example Derivation of CTUs in Slices 6.5 Scanning Processes
6.5.1 CTB Raster Scanning, Tile Scanning, and Subpicture Scanning Processes
. . .
For rectangular slices, the list NumCtusInSlice[i] for i ranging from 0 to num_slices_in_pic_minus1, inclusive, specifying the number of CTU in the i-th slice, the list SliceTopLeftTileIdx[i] for i ranging from 0 to num_slices_in_pic_minus1, inclusive, specifying the index of the top-left tile of the slice, and the matrix CtbAddrInSlice[i][j] for i ranging from 0 to num_slices_in_pic_minus1, inclusive, and j ranging from 0 to NumCtusInSlice[i]−1, inclusive, specifying the picture raster scan address of the j-th CTB within the i-th slice, are derived as follows:

```
if( single_slice_per_subpic_flag ) {
   for( i = 0; i <= sps_num_subpics_minus1; i++ )
      NumCtusInSlice[ i ] = 0
   for( i = 0; i < PicSizeInCtbsY; i ++ ) {
      sliceIdx = subpic_info_present_flag ? CtbToSubpicIdx[ i ] : 0
      CtbAddrInSlice[ sliceIdx ][ NumCtusInSlice[ sliceIdx ] ] = i
      NumCtusInSlice[ sliceIdx ]++
   }
} else {
   tileIdx = 0
   for( i = 0; i <= num_slices_in_pic_minus1; i++ )
      NumCtusInSlice[ i ] = 0
   for( i = 0; i <= num_slices_in_pic_minus1; i++ ) {
      SliceTopLeftTileIdx[ i ] = tileIdx
      tileX = tileIdx % NumTileColumns
      tileY = tileIdx / NumTileColumns
      if( i = = num_slices_in_pic_minus1 ) {
         slice_width_in_tiles_minus1[ i ] = NumTileColumns − 1 − tileX
         slice_height_in_tiles_minus1[ i ] = NumTileRows − 1 − tileY
      }
      if( slice_width_in_tiles_minus1[ i ] = = 0
   && slice_height_in_tiles_minus1[ i ] = = 0 ) {     (29)
         ctbY = tileRowBd[ tileY ]
         for( j = 0; j < NumSlicesInTile[ i ] − 1; j++ ) {
            AddCtbsToSlice( i, tileColBd[ tileX ], tileColBd[ tileX + 1 ],
                ctbY, ctbY + SliceHeightInCtusMinus1[ i ] + 1 )
            ctbY += SliceHeightInCtusMinus1[ i ] + 1
            i++
         }
         AddCtbsToSlice( i, tileColBd[ tileX ], tileColBd[ tileX + 1 ], ctbY,
             tileRowBd[ tileY + 1 ] )
      } else
         for( j = 0; j <= slice_height_in_tiles_minus1[ i ]; j++ )
            for( k = 0; k <= slice_width_in_tiles_minus1[ i ]; k++ )
               AddCtbsToSlice( i, tileColBd[ tileX + k ], tileColBd[ tileX +
k + 1 ],
                   tileRowBd[ tileY + j ], tileRowBd[ tileY + j + 1 ] )
         if( i < num_slices_in_pic_minus1) {
            if( tile_idx_delta_present_flag)
               tileIdx += tile_idx_delta[ i ]
            else {
               tileIdx += slice_width_in_tiles_minus1[ i ] + 1
               if( tileIdx % NumTileColumns = = 0 )
                  tileIdx += slice_height_in_tiles_minus1[ i ] * NumTileColumns
            }
         }
   }
}
```

6.7. Embodiment 7: About Signalling of MER Size 7.3.2.3 Sequence Parameter Set RBSP Syntax

| | Descriptor |
|---|---|
| seq_parameter_set_rbsp( ) { | |
|   sps_seq_parameter_set_id | u(4) |
| … | |
|   log2_parallel_merge_level_minus_log2_mincb | ue(v) |
| … | |
| } | |

7.4.3.3 Sequence Parameter Set RBSP Semantics
log 2_parallel_merge_level_minus_log 2_mincb plus log 2 min luma coding block size minus2+2 specifies the value of the variable Log 2ParMrgLevel, which is used in the derivation process for spatial merging candidates as specified in clause 8.5.2.3, the derivation process for motion vectors and reference indices in subblock merge mode as specified in clause 8.5.5.2, and to control the invocation of the updating process for the history-based motion vector predictor list in clause 8.5.2.1. The value of log 2_parallel_merge_level_minus_log 2_mincb may be in the range of 0 to CtbLog 2SizeY−log 2 min luma coding block size minus2−2, inclusive. The variable Log 2ParMrgLevel is derived as follows:

Log 2ParMrgLevel=log 2_parallel_merge_level_minus2+log 2_min_luma_coding_block_size_minus2+2    (68)

6.8. Embodiment 8: About Signalling of Rectangular Slices 6.5.1 CTB Raster
Scanning, Tile Scanning, and Subpicture Scanning Processes
. . .
The list ctbToSubpicIdx[ctbAddrRs] for ctbAddrRs ranging from 0 to PicSizeInCtbsY−1, inclusive, specifying the conversion from a CTB address in picture raster scan to a subpicture index, is derived as follows:

```
for( ctbAddrRs = 0; ctbAddrRs < PicSizeInCtbsY; ctbAddrRs++ ) {
  posX = ctbAddrRs % PicWidthInCtbsY
  posY = ctbAddrRs / PicWidthInCtbsY
  ctbToSubpicIdx[ ctbAddrRs ] = −1
  for( i = 0; ctbToSubpicIdx[ ctbAddrRs ] < 0 && i <=
sps_num_subpics_minus1; i++ ){                                   (29)
    if( ( posX >= subpic_ctu_top_left_x[ i ] ) &&
      ( posX < subpic_ctu_top_left_x[ i ]+ subpic_width_minus1[ i ] +
1 ) &&
      ( posY >= subpic_ctu_top_left_y[ i ] ) &&
      ( posY < subpic_ctu_top_left_y[ i ] + subpic_height_minus1[ i ] +
1 ) )
      ctbToSubpicIdx[ ctbAddrRs ] = i
  }
}
```

When rect_slice_flag is equal to 1, the list NumCtusInSlice[i] for i ranging from 0 to num_slices_inpic_minus1, inclusive, specifying the number of CTUs in the i-th slice, the list SliceTopLeftTileIdx[i] for i ranging from 0 to num_slices_in_pic_minus1, inclusive, specifying the tile index of the tile containing the first CTU in the slice, and the matrix CtbAddrinSlice[i][j] for i ranging from 0 to num_slices_in_pic_minus1, inclusive, and j ranging from 0 to NumCtusInSlice[i]−1, inclusive, specifying the picture raster scan address of the j-th CTB within the i-th slice, _the variable NumSlices InTile[ i ], specifying the number of slices in the tile containing the i-th slice (i.e., the tile with tile index equal to Slice TopLeftTileIdx[ i ])_, are derived as follows:

```
if( single_slice_per_subpic_flag ) {
  for( i = 0; i <= sps_num_subpics_minus1; i++ )
    NumCtusInSlice[ i ] = 0
  for( i = 0; i < PicSizeInCtbsY; i ++ ) {
    sliceIdx = ctbToSubpicIdx[ i ]
    CtbAddrInSlice[ sliceIdx ][ NumCtusInSlice[ sliceIdx ] ] = i
    NumCtusInSlice[ sliceIdx ]++
  }
} else {
  tileIdx = 0
  for( i = 0; i <= num_slices_in_pic_minus1; i++ )
    NumCtusInSlice[ i ] = 0
  for( i = 0; i <= num_slices_in_pic_minus1; i++ ) {
    SliceTopLeftTileIdx[ i ] = tileIdx
    tileX = tileIdx % NumTileColumns
    tileY = tileIdx / NumTileColumns
    if( i < num_slices_in_pic_minus1 ) {
      sliceWidthInTiles[ i ] = slice_width_in_tiles_minus1[ i ] + 1
      sliceHeightInTiles[ i ] = slice_height_in_tiles_minus1[ i ] + 1
    } else {
      sliceWidthInTiles[ i ] = NumTileColumns - tileX
      sliceHeightInTiles[ i ] = NumTileRows - tileY
      NumSlicesInTile[ i ] = 1
    }
    if( sliceWidthInTiles[ i ] = = 1 && sliceHeightInTiles[ i ] = =
1 ) {                                                             (30)
      if( num_exp_slices_in_tile[ i ] = = 0 ) {
        NumSlicesInTile[ i ] = 1
        sliceHeightInCtus[ i ] =
RowHeight[ SliceTopLeftTileIdx[ i ] / NumTileColumns ]
      }
      else {
        remainingHeightInCtbsY =
RowHeight[ SliceTopLeftTileIdx[ i ] / NumTileColumns ]
        for( j = 0; j < num_exp_slices_in_tile[ i ] ; j++ ) {
          sliceHeightInCtus[ i+j ] = exp_slice_height_in_ctus_minus1
[ i ][ j ] + 1
          remainingHeightInCtbsY −= sliceHeightInCtus[ i+j ]
        }
        uniformSliceHeight = sliceHeightInCtus[ i+j - 1 ]
        while( remainingHeightInCtbsY >= uniformSliceHeight ) {
          sliceHeightInCtus[ i+j ] = uniformSliceHeight
          remainingHeightInCtbsY −= uniformSliceHeight
          j++
        }
        if( remainingHeightInCtbsY > 0 ) {
          sliceHeightInCtus[ i+j ] = remainingHeightInCtbsY
          j++
        }
        NumSlicesInTile[ i ] = j
      }
      ctbY = tileRowBd[ tileY ]
      for( j = 0; j < NumSlicesInTile[ i ] − 1; j++ ) {
        AddCtbsToSlice( i, tileColBd[ tileX ], tileColBd[ tileX + 1 ],
          ctbY, ctbY + sliceHeightInCtus[ i ] )
        ctbY += sliceHeightInCtus[ i ]
        i++
      }
      AddCtbsToSlice( i, tileColBd[ tileX ], tileColBd[ tileX + 1 ], ctbY,
tileRowBd[ tileY + 1 ] )
    } else
      for( j = 0; j < sliceHeightInTiles[ i ]; j++ )
        for( k = 0; k < sliceWidthInTiles[ i ]; k++ )
          AddCtbsToSlice( i, tileColBd[ tileX + k ], tileColBd[ tileX +
k + 1 ],
            tileRowBd[ tileY + j ], tileRowBd[ tileY + j + 1 ] )
    if( i < num_slices_in_pic_minus1 ) {
      if( tile_idx_delta_present_flag )
        tileIdx += tile_idx_delta[ i ]
      else {
        tileIdx += sliceWdithInTiles[ i ]
        if( tileIdx % NumTileColumns = = 0 )
          tileIdx += ( sliceHeightInTiles[ i ] − 1 ) * NumTileColumns
      }
    }
  }
}
```

For bitstream conformance, the values of NumCtusInSlice[i] for i ranging from 0 to num_slices_in_pic_minus1, inclusive, may be greater than 0. Additionally, for bitstream conformance, the matrix CtbAddrinSlice[i][j] for i ranging from 0 to num_slices_in_pic_minus1, inclusive, and j ranging from 0 to NumCtusInSlice[i]−1, inclusive, may include each of all CTB may address in the range of 0 to PicSizeInCtbsY−1, inclusive, once and only once.

. . .

7.3.2.4 Picture Parameter Set RBSP Syntax

|  | Descriptor |
|---|---|
| pic_parameter_set_rbsp( ) { | |
| ... | |
|   if( rect_slice_flag && !single_slice_per_subpic_flag ) { | |
|     num_slices_in_pic_minus1 | ue(v) |
|     if( num_slices_in_pic_minus1 > 0 ) | |
|       tile_idx_delta_present_flag | u(1) |
|     for( i = 0; i < num_slices_in_pic_minus1; i++ ) { | |
|       if( NumTileColumns > 1 ) | |
|         slice_width_in_tiles_minus1[ i ] | ue(v) |
|       if( NumTileRows > 1 && (tile_idx_delta_present_flag \|\| | |
|         *SliceTopLeftTileIdx[i]* % NumTileColumns = = 0 ) ) | |
|         slice_height_in_tiles_minus1[ i ] | ue(v) |
|       if( slice_width_in_tiles_minus1[ i ] = = 0 && | |
|         slice_height_in_tiles_minus1[ i ] = = 0 && | |
|         RowHeight[ SliceTopLeftTileIdx[ i ] / NumTileColumns ] > 1 ) | |
|   { | |
|       num_exp_slices_in_tile[ i ] | ue(v) |
|       for( j = 0; j < num_exp_slices_in_tile[ i ]; j++ ) | |
|         exp_slice_height_in_ctus_minus1 *[i]* [ j ] | ue(v) |
|       i += NumSlicesInTile[ i ] − 1 | |
|     } | |
|     if( tile_idx_delta_present_flag && i < num_slices_in_pic_minus1 ) | |
|       tile_idx_delta[ i ] | se(v) |
|     } | |
|   } | |
| ... | |
| } | |

7.4.3.4 Picture Parameter Set Semantics

. . .

tile_idx_delta_present_flag equal to 0 specifies that tile_idx_delta[i] syntax elements are not present in the PPS and all pictures referring to the PPS are partitioned into rectangular slice rows and rectangular slice columns in slice raster order. tile_idx_delta_present_flag equal to 1 specifies that tile_idx_delta[i] syntax elements may be present in the PPS and all rectangular slices in pictures referring to the PPS are specified in the order indicated by the values of the tile_idx_delta[i] in increasing values of i. When not present, the value of tile_idx_delta_present_flag is inferred to be equal to 0.

slice_width_in_tiles_minus1[i] plus 1 specifies the width of the i-th rectangular slice in units of tile columns. The value of slice_width_in_tiles_minus1[i] may be in the range of 0 to NumTileColumns−1, inclusive.

When i is less than num_slices_in_pic_minus1 and NumTileColumns is equal to 1, the value of slice_width_in_tiles_minus1[i] is inferred to be equal to 0.

slice_height_in_tiles_minus1[i] plus 1 specifies the height of the i-th rectangular slice in units of tile rows when num_exp_slices_in_tile[i] is equal to 0. The value of slice_height_in_tiles_minus1[i] may be in the range of 0 to NumTileRows−1, inclusive.

When i is less than num_slices_in_pic_minus1 and slice_height_in_tiles_minus1[i] is not present, it is inferred to be equal to NumTileRows==1?0: slice_height_in_tiles_minus1[i−1].

num_exp_slices_in_tile[i] specifies the number of explicitly provided slice heights for the slices in the tile containing the i-th slice (i.e., the tile with tile index equal to SliceTopLeftTileIdx[i]). The value of num_exp_slices_in_tile[i] may be in the range of 0 to RowHeight[SliceTopLeftTileIdx[i]/NumTileColumns]−1, inclusive. When not present, the value of num_exp_slices_in_tile[i] is inferred to be equal to 0.

*NOTE 3 - If num_exp_slices_in_tile[ i ] is equal to 0, the tile containing the i-th slice is not split into multiple slices. Otherwise (num_exp_slices_in_tile[ i ] is greater than 0), the tile containing the i-th slice may or may not be split into multiple slices.*

*exp_slice_height_in_ctus_minus1[ i ][ j ] plus 1 specifies the height of the j-th rectangular slice in the tile containing the i-th slice in units of CTU rows. The value of exp_slice_height_in_ctus_minus1[ i ][ j ] may be in range of 0 RowHeight[ SliceTopLeftTileIdx[ i ]/ NumTileColumns ] 1, inclusive.*

*the difference between the tile index of the tile containing the first CTU in the ( i + 1 ) -th rectangular slice and the tile index of the tile containing the first CTU in the i-th rectangular slice.* The value of tile_idx_delta[i] may be in the range of −NumTilesInPic+1 to NumTilesIn-Pic−1, inclusive. When not present, the value of tile_idx_delta[i] is inferred to be equal to 0. When present, the value of tile_idx_delta[i] may not be equal to 0.

6.9. Embodiment 9: About Signalling of Rectangular Slices

6.5.1 CTB Raster Scanning, Tile Scanning, and Subpicture Scanning Processes

. . .

When rect_slice_flag is equal to 1, the list NumCtusInSlice[i] for i ranging from 0 to num_slices_in_pic_minus1, inclusive, specifying the number of CTUs in the i-th slice, the list SliceTopLeftTileIdx[i] for i ranging from 0 to num_slices_in_pic_minus1, inclusive, specifying the tile index of the tile containing the first CTU in the slice, and the matrix CtbAddrinSlice[i][j] for i ranging from 0 to num_slices_in_pic_minus1, inclusive, and j ranging from 0 to NumCtusInSlice[i]−1, inclusive, specifying the picture raster scan address of the j-th CTB within the i-th slice, the variable NumSlicesInTile[i], specifying the number of slices in the tile containing the i-th slice (i.e., the tile with tile index equal to SliceTopLeftTileIdx[i]), are derived as follows:

```
if( single_slice_per_subpic_flag ) {
   for( i = 0; i <= sps_num_subpics_minus1; i++ )
      NumCtusInSlice[ i ] = 0
   for( i = 0; i < PicSizeInCtbsY; i ++ ) {
      sliceIdx = ctbToSubpicIdx[ i ]
      CtbAddrInSlice[ sliceIdx ][ NumCtusInSlice[ sliceIdx ] ] = i
      NumCtusInSlice[ sliceIdx ]++
   }
} else {
   tileIdx = 0
   for( i = 0; i <= num_slices_in_pic_minus1; i++ )
      NumCtusInSlice[ i ] = 0
   for( i = 0; i <= num_slices_in_pic_minus1; i++ ) {
      SliceTopLeftTileIdx[ i ] = tileIdx
      tileX = tileIdx % NumTileColumns
      tileY = tileIdx / NumTileColumns
      if( i < num_slices_in_pic_minus1 ) {
         sliceWidthInTiles[ i ] = slice_width_in_tiles_minus1[ i ] + 1
         sliceHeightInTiles[ i ] = slice_height_in_tiles_minus1[ i ] + 1
      } else {
         sliceWidthInTiles[ i ] = NumTileColumns − tileX
         sliceHeightInTiles[ i ] = NumTileRows − tileY
         NumSlicesInTile[ i ] = 1
      }
      if( sliceWidthInTiles[ i ] = = 1 && sliceHeightInTiles[ i ] = =
1 ) { (30)
         if( num_exp_slices_in_tile[ i ] = = 0 ) {
            NumSlicesInTile[ i ] = 1
            sliceHeightInCtus[ i ] =
RowHeight[ SliceTopLeftTileIdx[ i ] / NumTileColumns ]
         }
         else {
            remainingHeightInCtbsY =
RowHeight[ SliceTopLeftTileIdx[ i ] / NumTileColumns ]
            [[for( j = 0; j < num_exp_slices_in_tile[ i ]; j++ ) { }]]
            for( j = 0; j < num_exp_slices_in_tile[ i ] − 1; j++ ) {
               sliceHeightInCtus[ i + j ] =
exp_slice_height_in_ctus_minus1[ i ][ j ] + 1
               remainingHeightInCtbsY −= sliceHeightInCtus[ i + j ]
            }
            [[uniformSliceHeight = sliceHeightInCtus[ i + j − 1 ]]]
            uniformSliceHeight = exp_slice_height_in_
ctus_minus1[ i ][ j ] + 1
            while( remainingHeightInCtbsY >= uniformSliceHeight ) {
               sliceHeightInCtus[ i + j ] = uniformSliceHeight
               remainingHeightInCtbsY −= uniformSliceHeight
               j++
            }
            if( remainingHeightInCtbsY > 0 ) {
               sliceHeightInCtus[ i + j ] = remainingHeightInCtbsY
               j++
            }
            NumSlicesInTile[ i ] = j
         }
         ctbY = tileRowBd[ tileY ]
         for( j = 0; j < NumSlicesInTile[ i ] − 1; j++ ) {
            AddCtbsToSlice( i, tileColBd[ tileX ], tileColBd[ tileX + 1 ],
               ctbY, ctbY + sliceHeightInCtus[ i ] )
            ctbY += sliceHeightInCtus[ i ]
            i++
         }
         AddCtbsToSlice( i, tileColBd[ tileX ], tileColBd[ tileX + 1 ],
ctbY,
            tileRowBd[ tileY + 1 ] )
      } else
         for( j = 0; j < sliceHeightInTiles[ i ]; j++ )
            for( k = 0; k < sliceWidthInTiles[ i ]; k++ )
               AddCtbsToSlice( i, tileColBd[ tileX + k ],
tileColBd[ tileX + k + 1 ],
                  tileRowBd[ tileY + j ],
tileRowBd[ tileY + j + 1 ] )
      if( i < num_slices_in_pic_minus1 ) {
         if( tile_idx_delta_present_flag )
            tileIdx += tile_idx_delta[ i ]
         else {
            tileIdx += sliceWdithInTiles[ i ]
            if( tileIdx % NumTileColumns = = 0 )
               tileIdx += ( sliceHeightInTiles[ i ] − 1 ) * NumTileColumns
         }
      }
   }
}
...
```

Alternatively, in the above, the following line:

**uniformSliceHeight exp_slice_height_in_
ctus_minus1[i][j]+1** is changed to be as follows:

**uniformSliceHeight= exp_slice_height_in_
ctus_minus1[i][ num_exp_slices_in_tile[i]-1]+1**

6.10. Embodiment 10: About Signalling of Subpictures and Tiles 6.5.1 CTB Raster Scanning, Tile Scanning, and Subpicture Scanning Processes The variable NumTileColumns, specifying the number of tile columns, and the list colWidth[i] for i ranging from 0 to NumTileColumns−1, inclusive, specifying the width of the i-th tile column in units of CTBs, are derived as follows:

```
remainingWidthInCtbsY = PicWidthInCtbsY
for( i = 0; i <= num_exp_tile_columns_minus1; i++ ) {
   colWidth[ i ] = tile_column_width_minus1[ i ] + 1
   remainingWidthInCtbsY −= colWidth[ i ]
}
uniformTileColWidth = tile_column_width_minus1[ num_exp_tile_columns_minus1 ] +
1 (23)
while( remainingWidthInCtbsY >= uniformTileColWidth ) {
   colWidth[ i++ ] = uniformTileColWidth
   remainingWidthInCtbsY −= uniformTileColWidth
}
if( remainingWidthInCtbsY > 0 )
   colWidth[ i++ ] = remainingWidthInCtbsY
NumTileColumns = i
```

The variable NumTileRows, specifying the number of tile rows, and the list RowHeight[ j ] for j ranging from 0 to NumTileRows − 1, inclusive, specifying the height of the j-th tile row in units of CTBs, are derived as follows:

```
  remainingHeightInCtbsY = PicHeightInCtbsY
  for( j = 0; j <= num_exp_tile_rows_minus1; j++ ) {
     RowHeight[ j ] = tile_row_height_minus1[ j ] + 1
     remainingHeightInCtbsY -= RowHeight[ j ]
  }
  uniformTileRowHeight = tile_row_height_minus1[ num_exp_tile_rows_minus1 ] + 1
     (24)
  while( remainingHeightInCtbsY >= uniformTileRowHeight ) {
     RowHeight[ j++ ] = uniformTileRowHeight
     remainingHeightInCtbsY -= uniformTileRowHeight
  }
  if( remainingHeightInCtbsY > 0 )
     RowHeight j++ ] = remainingHeightInCtbsY
  NumTileRows = j
```

7.3.2.3 Sequence Parameter Set RBSP Syntax

| | Descriptor |
|---|---|
| seq_parameter_set_rbsp( ) { | |
| ... | |
|   if( subpic_info_present_flag ) { | |
|     **if( _pic_width_max_in_luma_samples_ > _CtbSizeY_ \|\|** | |
|     _pic_height_max_in_luma_samples_ > _CtbSizeY_ ) | |
|     sps_num_subpics_minus1 | ue(v) |
| ... | |
| } | |

7.3.2.4 Picture Parameter Set RBSP Syntax

| | Descriptor |
|---|---|
| pic_parameter_set_rbsp( ) { | |
| ... | |
|   no_pic_partition_flag | u(1) |
|   if( !no_pic_partition_flag ) { | |
|     pps_log2_ctu_size_minus5 | u(2) |
|     if( _pic_width_in_luma_samples_ > _CtbSizeY_ ) | |
|       num_exp_tile_columns_minus1 | ue(v) |
|     if( _pic_heigh_in_luma_samples_ > _CtbSizeY_ ) | |
|       num_exp_tile_rows_minus1 | ue(v) |
|     for( i = 0; i <= num_exp_tile_columns_minus1 | |
|     && _num_exp_tile_columns_minus1_ != _PicWidthInCtbsY - 1_ ; i++ ) | |
|       tile_column_width_minus1[ i ] | ue(v) |
|     for( i = 0; i <= num_exp_tile_rows_minus1 && | |
|       _num_exp_tile_rows_minus1_ != _PicHeightInCtbsY - 1_ ; i++ ) | |
|       tile_row_height_minus1[ i ] | ue(v) |
|   ... | |
| } | |

7.4.3.4 Picture Parameter Set Semantics

. . .

num_exp_tile_columns_minus1 plus 1 specifies the number of explicitly provided tile column widths. The value of num_exp_tile_columns_minus1 may be in the range of 0 to PicWidthInCtbsY−1, inclusive. When not present, the value of num_exp_tile_columns_minus1 is inferred to be equal to 0.
num_exp_tile_rows_minus1 plus 1 specifies the number of explicitly provided tile row heights. The value of num_exp_tile_rows_minus1 may be in the range of 0 to PicHeightInCtbsY−1, inclusive. When not present, the value of num_tile_rows_minus1 is inferred to be equal to 0. tile_column_width_minus1[i] plus 1 specifies the width of the i-th tile column in units of CTBs for i in the range of 0 to num_exp_tile_columns_minus1, inclusive. tile_column_width_minus1[num_exp_tile_columns_minus1] is used to derive the width of the tile columns with index greater than num_exp_tile_columns_minus1 as specified in clause 6.5.1. The value of tile_column_width_minus1[i] may be in the range of 0 to PicWidthInCtbsY−1, inclusive. When not present, the value of tile_column_width_minus1[i] is inferred to be equal to no_pic_partition_flag ? ( PicWidthInCtbsY - 1 ) : 0.
tile_row_height_minus1[i] plus 1 specifies the height of the i-th tile row in units of CTBs for i in the range of 0 to num_exp_tile_rows_minus1,, inclusive. tile_row_height_minus1[num_exp_tile_rows_minus1] is used to derive the height of the tile rows with index greater than num_exp_tile_rows_minus1 as specified in clause 6.5.1. The value of tile_row_height_minus1[i] may be in the range of 0 to PicHeightInCtbsY−1, inclusive. When not present, the value of tile_row_height_minus1[i] is inferred to be equal to no_pic_partition_flag ? ( PicHeightInCtbsY - 1 ) : 0.

. . .

Figure 7:
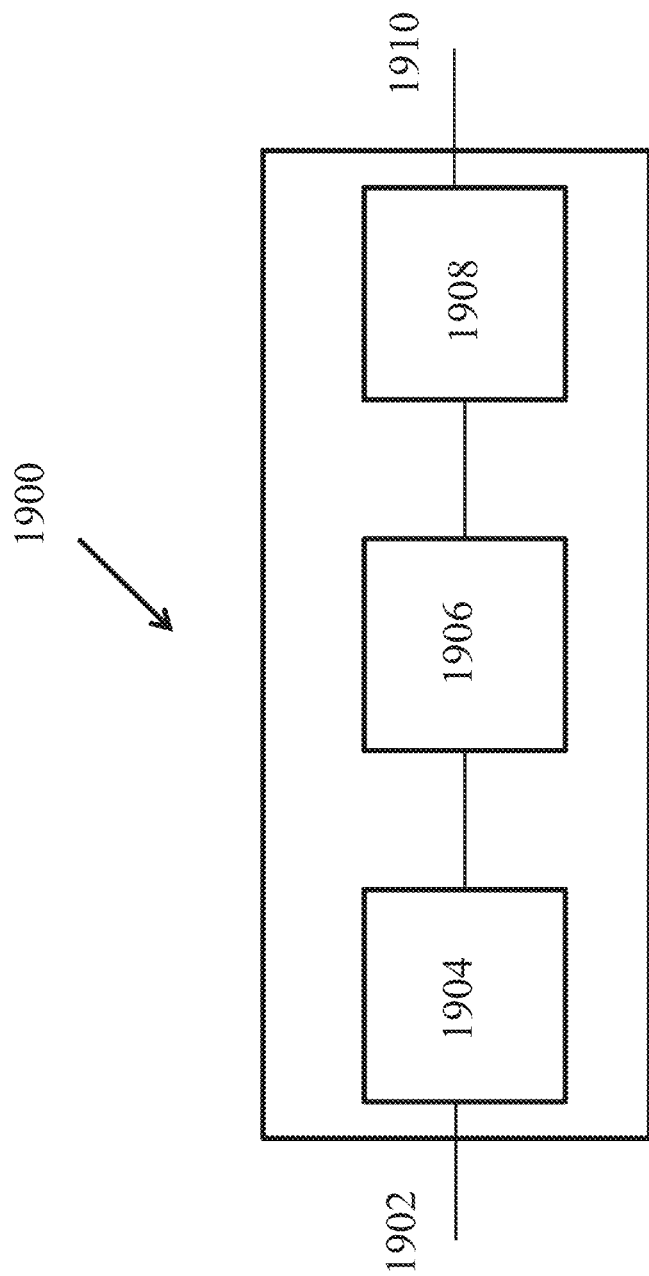
FIG. 7 is a block diagram of an example video processing system.

FIG. 7 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 8:
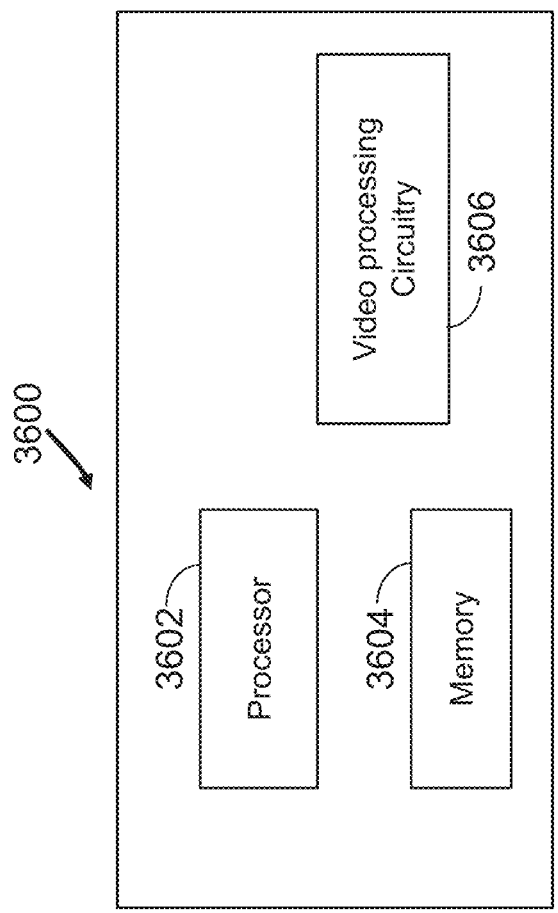
FIG. 8 is a block diagram of a video processing apparatus.

FIG. 8 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 10:
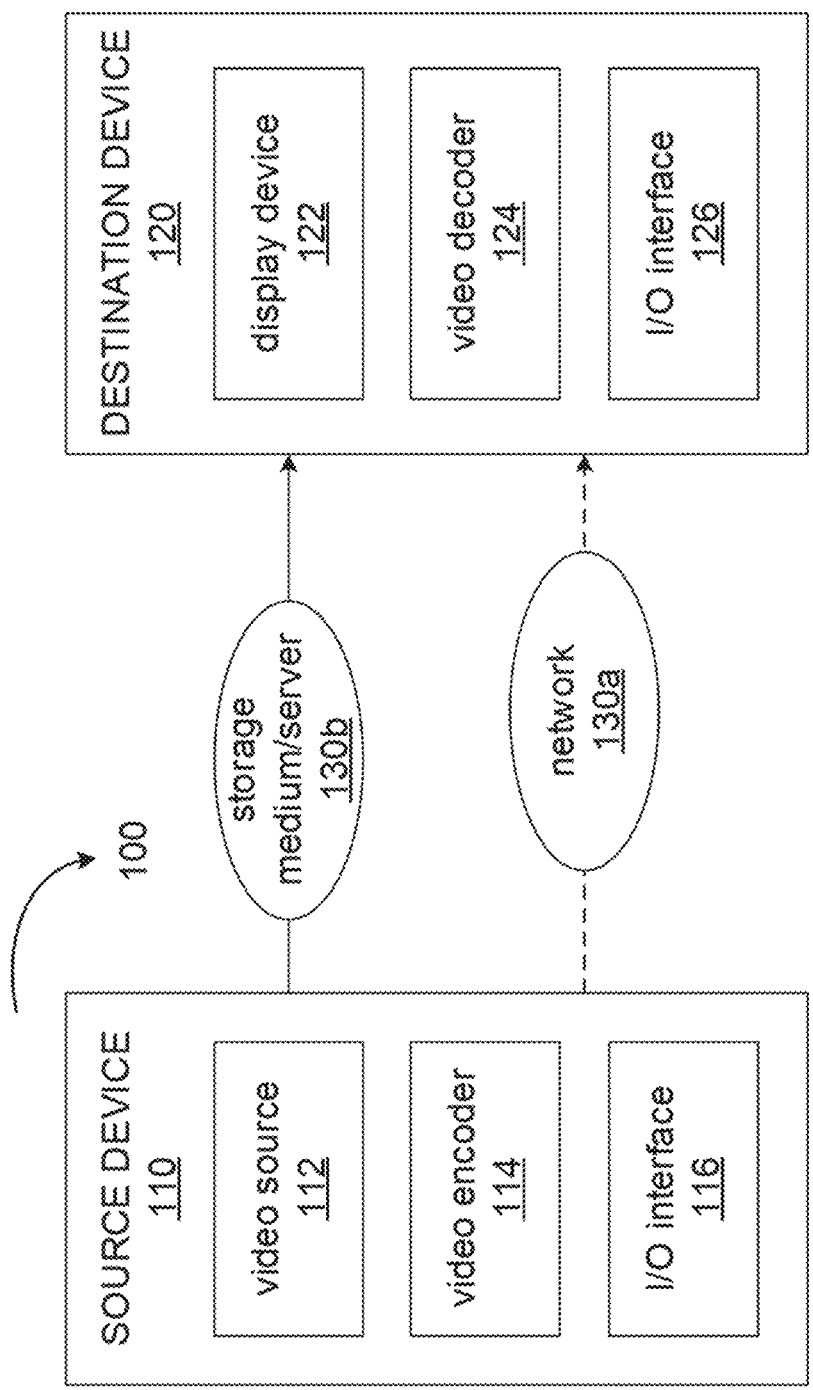
FIG. 10 is a block diagram that illustrates a video coding system according to various embodiments of the present disclosure.

FIG. 10 is a block diagram that illustrates an example video coding system 100 that may utilize the techniques of this disclosure.

As shown in FIG. 10, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which may be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 11:
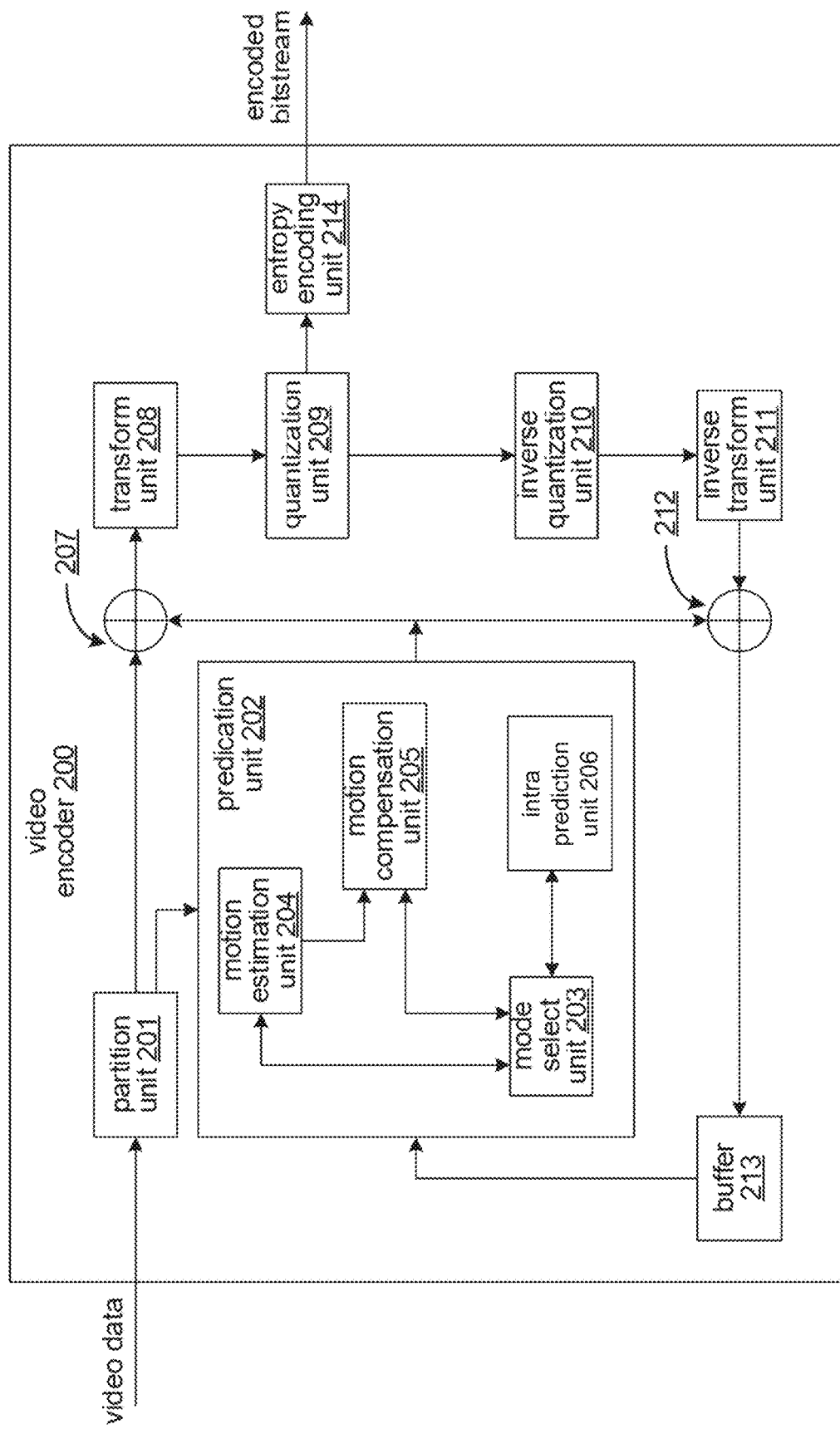
FIG. 11 is a block diagram that illustrates an encoder according to various embodiments of the present disclosure.

FIG. 11 is a block diagram illustrating an example of video encoder 200, which may be video encoder 114 in the system 100 illustrated in FIG. 10.

Video encoder 200 may be configured to perform any or all of the techniques of this disclosure. In the example of FIG. 11, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205, an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 11 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the other video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector predication (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed to reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 12:
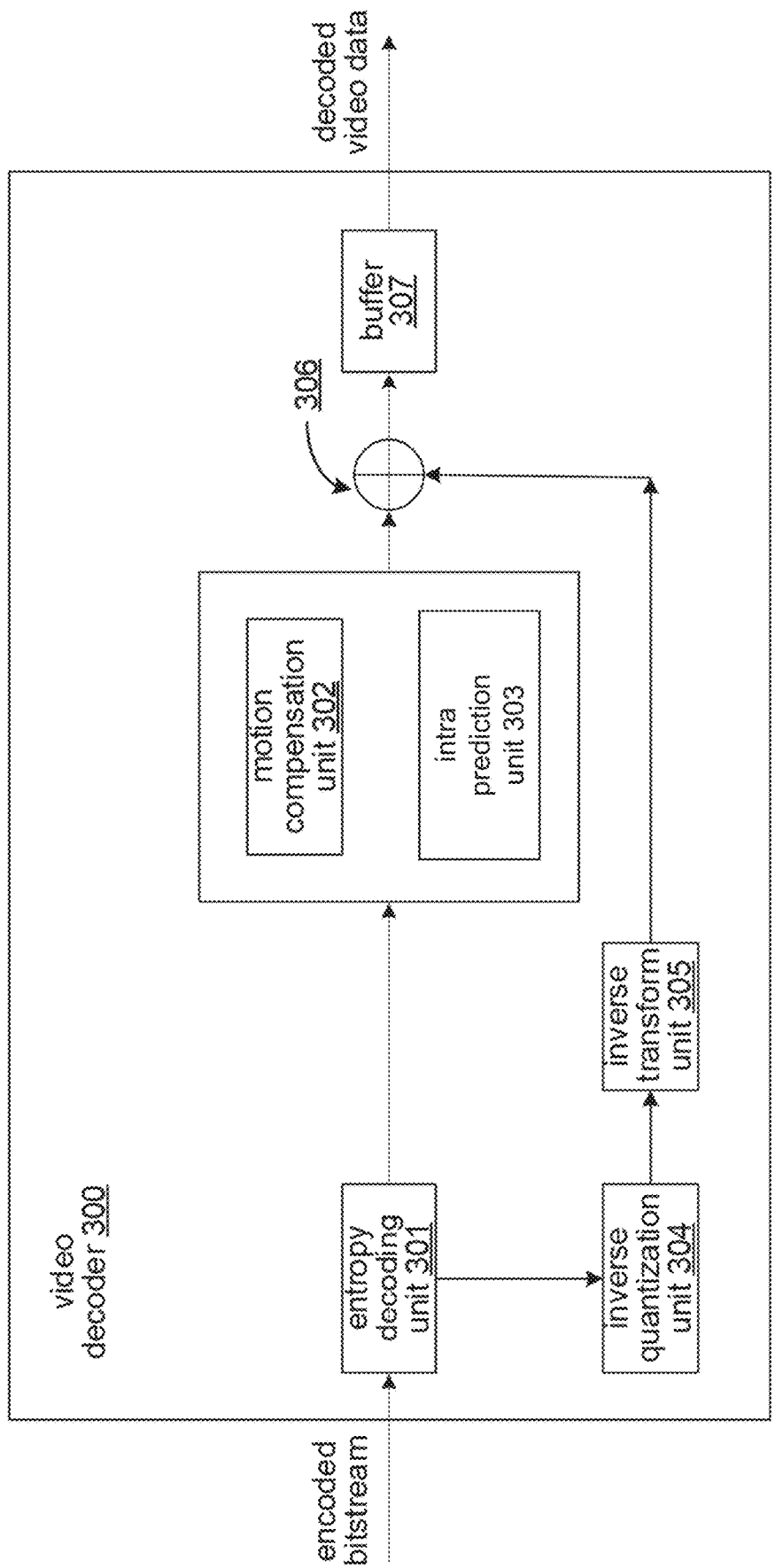
FIG. 12 is a block diagram that illustrates a decoder according to various embodiments of the present disclosure.

FIG. 12 is a block diagram illustrating an example of video decoder 300 which may be video decoder 124 in the system 100 illustrated in FIG. 10.

The video decoder 300 may be configured to perform any or all of the techniques of this disclosure. In the example of FIG. 12, the video decoder 300 includes a plurality of functional components. The techniques described in this disclosure may be shared among the various components of the video decoder 300. In some examples, a processor may be configured to perform any or all of the techniques described in this disclosure.

In the example of FIG. 12, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 11).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

The following solutions show example embodiments of techniques discussed in the previous section (e.g., item 1).

Figure 9:
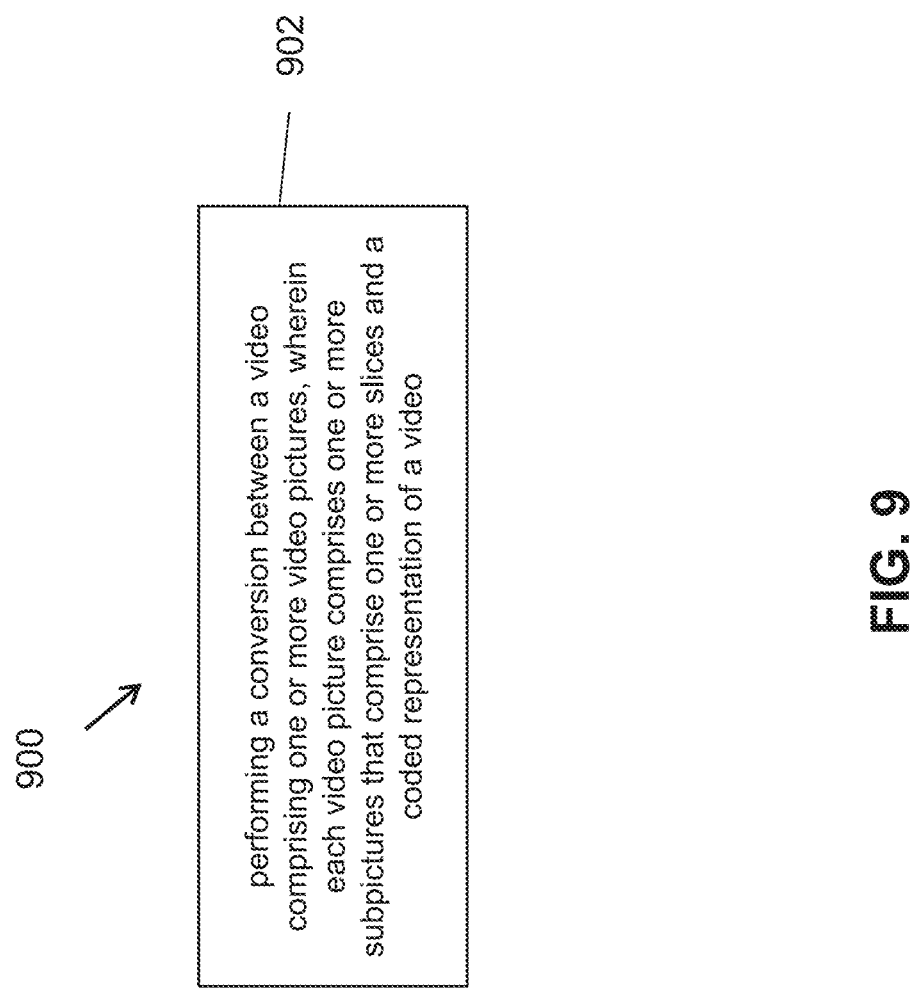
FIG. 9 is a flowchart for an example method of video processing.

1. A video processing method (e.g., method 900 depicted in FIG. 9), comprising: performing (902) a conversion between a video comprising one or more video pictures, wherein each video picture comprises one or more subpictures that comprise one or more slices and a coded representation of a video, wherein the coded representation conforms to a format rule; wherein the format rule specifies that, in case that a rectangular slices mode is enabled for a video picture, then a picture-level slice index for each slice in each subpicture in the video picture is derived without explicit signalling in the coded representation; and wherein the format rule specifies that a number of coding tree units in each slice is derivable from the picture-level slice index.

The following solutions show example embodiments of techniques discussed in the previous section (e.g., item 2).

2. A video processing method, comprising: performing a conversion between a video comprising one or more video pictures, wherein each video picture comprises one or more subpictures that comprise one or more slices and a coded representation of a video, wherein the coded representation conforms to a format rule; wherein the format rule specifies that a subpicture level slice index is derivable based on information in the coded representation without signalling the sub-picture level slice index in the coded representation.

3. The method of solution 2, wherein the format rule specifies that, due to use of a rectangular slice structure, the subpicture level slice index corresponds to an index to the slice in a list of slices in a subpicture.

4. The method of solution 2, wherein the format rule specifies that the subpicture level slice index is derived from a particular value of picture-level slice index.

The following solutions show example embodiments of techniques discussed in the previous sections (e.g., items 5, 6).

5. A video processing method, comprising: performing a conversion between a video comprising one or more video pictures, wherein each video picture comprises one or more subpictures and/or one or more tiles and a coded representation of a video, wherein the coded representation conforms to a format rule; and wherein the conversion conforms to a constraint rule.

6. The method of solution 5, wherein the constraint rule specifies that a tile cannot be in more than one subpictures.

7. The method of solution 5, wherein the constraint rule specifies that a subpicture cannot include two slices that are smaller than corresponding tiles to which the two slices belong.

The following solutions show example embodiments of techniques discussed in the previous section (e.g., items 7, 8).

8. A video processing method, comprising: performing a conversion between a video comprising one or more video pictures, wherein each video picture comprises one or more tiles and/or one or more slices; wherein the coded representation conforms to a format rule; wherein the format rule specifies that a field at a video picture level carries information about portioning of slices and/or tiles in the video picture.

9. The method of solution 8, wherein the field comprises a video picture header.

10. The method of solution 8, wherein the field comprises a picture parameter set.

11. The method of any of solutions 8-10, wherein the format rule specifies to omit slice partitioning information at slice level by including the slice partitioning information in the field at the video picture level.

The following solutions show example embodiments of techniques discussed in the previous section (e.g., item 9).

12. A video processing method, comprising: performing a conversion between a video comprising one or more pictures and a coded representation of the video, wherein the conversion conforms to a partitioning rule that a minimum number of slices in which a video picture is partitioned is a function of whether rectangular partitioning is used for partitioning the video picture.

13. The method of solution 12, wherein the partitioning rule specifies to use at least two slices for non-rectangular partitioning and at least one slice for rectangular partitioning.

14. The method of solution 12, wherein the partitioning rule is also a function of whether and/or how many subpictures are used for partitioning the video picture.

The following solutions show example embodiments of techniques discussed in the previous section (e.g., items 10, 11).

15. A method of video processing, comprising: performing a conversion between a video slice of a video region of a video and a coded representation of the video; wherein the coded representation conforms to a format rule; wherein the format rule specifies that the coded representation signals the video slice based on a top-left location of the video slice and wherein the format rule specifies that the coded representation signals a height and/or a width of the video slice in partitioning information that is signalled at a video unit level.

16. The method of solution 15, wherein the format rule specifies that the video slice is signalled in an order of slices defined by the format rule.

17. The method of solution 15, wherein the video region corresponds to a subpicture and wherein the video unit level corresponds to a video picture.

The following solutions show example embodiments of techniques discussed in the previous section (e.g., item 12).

18. A method of video processing, comprising: performing a conversion between a video comprising video pictures and a coded representation of the video; wherein the coded representation conforms to a format rule; wherein the format rule specifies to omit signalling a difference between a tile index of a first tile in a rectangular slice and a tile index of a first tile in a next rectangular slice.

19. The method of solution 18, wherein the difference is derivable from a zeroth slice in the video picture and the rectangular slice.

The following solutions show example embodiments of techniques discussed in the previous section (e.g., item 13).

20. A video processing method, comprising: performing a conversion between a video and a coded representation of the video, wherein the coded representation conforms to a format rule, wherein the format rule specifies that a relationship between a width of a video picture and a size of a coding tree unit controls signalling of information used for deriving a number of tile columns or rows in the video picture.

21. The method of solution 20, wherein the format rule specifies to exclude signalling a number of tile rows or a number of tile columns in case that the width of the video picture is smaller than or equal to a width of the coding tree unit.

The following solutions show example embodiments of techniques discussed in the previous section (e.g., item 16).

22. A method of video processing, comprising: performing a conversion between a video comprising one or more video pictures and a coded representation of the video, wherein the coded representation conforms to a format rule, wherein the format rule specifies that a tile layout information is included in the coded representation for a video picture that comprises uniform spacing tiles and non-uniform spacing tiles.

23. The method of solution 22, wherein the tile layout information includes in a syntax flag that is included in a picture parameter set.

24. The method of any of solutions 22-23, wherein a number of explicitly signalled number of tile rows or columns is no less than a number of non-uniform spacing tiles.

25. The method of any of solutions 22-23, wherein a number of explicitly signalled number of tile rows or columns is no less than a number of uniform spacing tiles.

26. The method of any of above solutions, wherein the video region comprises a video coding unit.

27. The method of any of above solutions, wherein the video region comprises a video picture.

28. The method of any of solutions 1 to 27, wherein the conversion comprises encoding the video into the coded representation.

29. The method of any of solutions 1 to 27, wherein the conversion comprises decoding the coded representation to generate pixel values of the video.

30. A video decoding apparatus comprising a processor configured to implement a method recited in one or more of solutions 1 to 29.

31. A video encoding apparatus comprising a processor configured to implement a method recited in one or more of solutions 1 to 29.

32. A computer program product having computer code stored thereon, the code, when executed by a processor, causes the processor to implement a method recited in any of solutions 1 to 29.

33. A method, apparatus or system described in the present document.

FIG. 13 is flowchart representation of a method for video processing in accordance with the present technology. The method 1300 includes, at operation 1310, performing a conversion between a video picture of a video and a bitstream of the video according to a rule. The video picture comprises one or more slices. The rule specifies that a syntax element indicating a difference between tile indices of two rectangular slices is signalled responsive to a condition being satisfied, wherein one of the slice indices is represented as i, where i is an integer.

In some embodiments, a second rectangular slice of the two rectangular slices is represented as (i+1)-th rectangular slice, and the syntax element indicates the difference between a first tile index of a first tile containing a first coding tree unit in the (i+1)-th rectangular slice and a second tile index of a second tile containing a first coding tree unit in the i-th rectangular slice. In some embodiments, the at least one condition being satisfied comprises i being smaller than (a number of rectangular slices in the video picture−1). In some embodiments, the at least one condition being satisfied comprises i being not equal to (a number of rectangular slices in the video picture−1).

Figure 14:
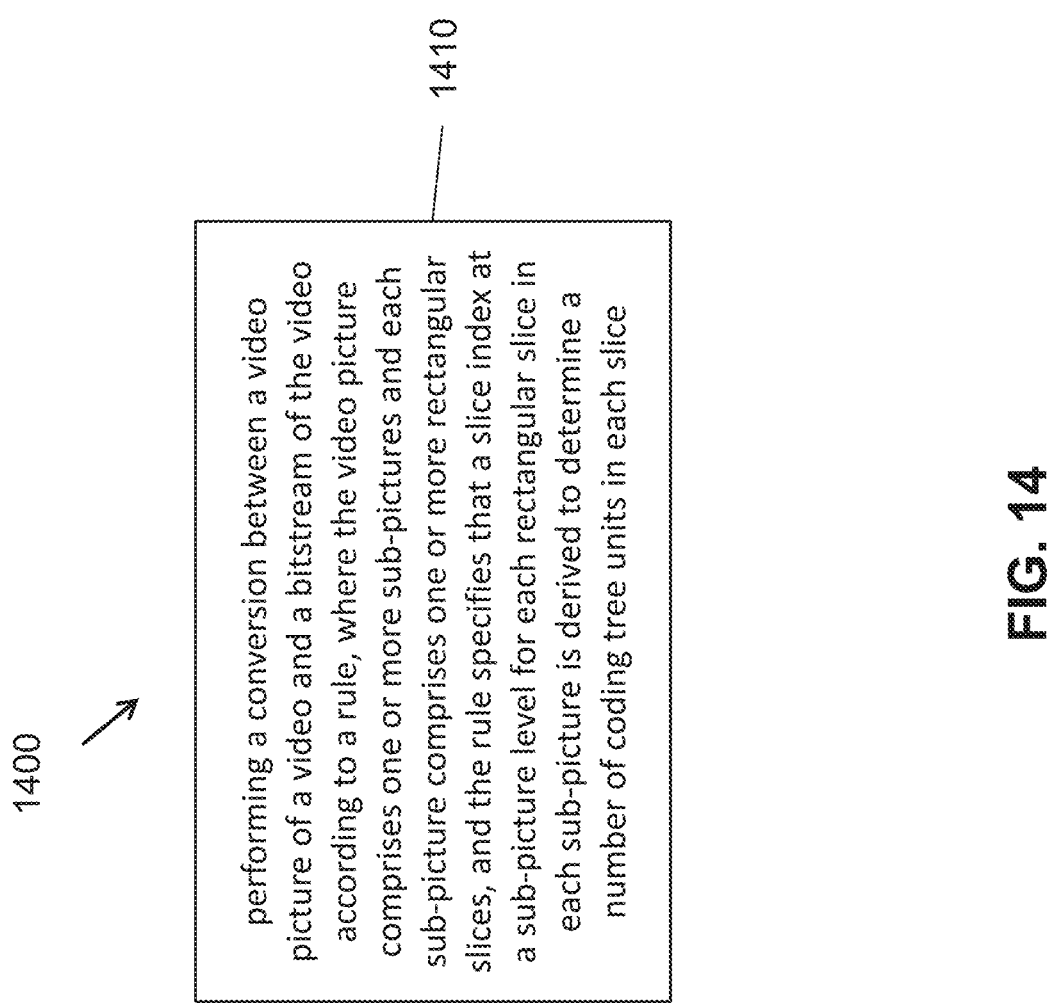
FIG. 14 is flowchart representation of another method for video processing according to various embodiments of the present disclosure.

FIG. 14 is flowchart representation of a method for video processing in accordance with the present technology. The method 1400 includes, at operation 1410, performing a conversion between a video picture of a video and a bitstream of the video according to a rule. The video picture comprises one or more sub-pictures and each sub-picture comprises one or more rectangular slices. The rule specifies that a slice index at a sub-picture level for each rectangular slice in each sub-picture is derived to determine a number of coding tree units in each slice.

In some embodiments, the slice index at the sub-picture level is determined based on a decoding order of a corresponding slice in a list of slices in a sub-picture. In some embodiments, in case a first slice index at the sub-picture level for a first slice is smaller than a second slice index at the sub-picture level for a second slice, the first slice is processed ahead of the second slice according to the decoding order. In some embodiments, the slice index at the sub-picture level is represented using a variable SubpicLevelSliceIdx. In some embodiments, a slice_address is determined based on the slice index at the sub-picture level. In some embodiments, the slice index at the sub-picture level of a slice is determined based on a first sub-picture that includes the slice. In some embodiments, the slice index at the sub-picture level is a non-negative integer. In some embodiments, the slice index at the sub-picture level is greater than or equal to 0 and smaller than N, N being a number of slices in a sub-picture.

In some embodiments, a first slice index at the sub-picture level for a first slice is different than a second slice index at the sub-picture level for a second slice in case the first slice and the second slice are different, where the first slice and the second slice are in a same sub-picture. In some embodiments, in case a first slice index at the sub-picture level for a first slice is smaller than a second slice index at the sub-picture level for a second slice, a first slice index at a picture-level for the first slice is smaller than a second slice index at the picture-level for the second slice. In some embodiments, the slice index at the sub-picture level of a slice is determined based on a slice index at a picture level of the slice.

Figure 15:
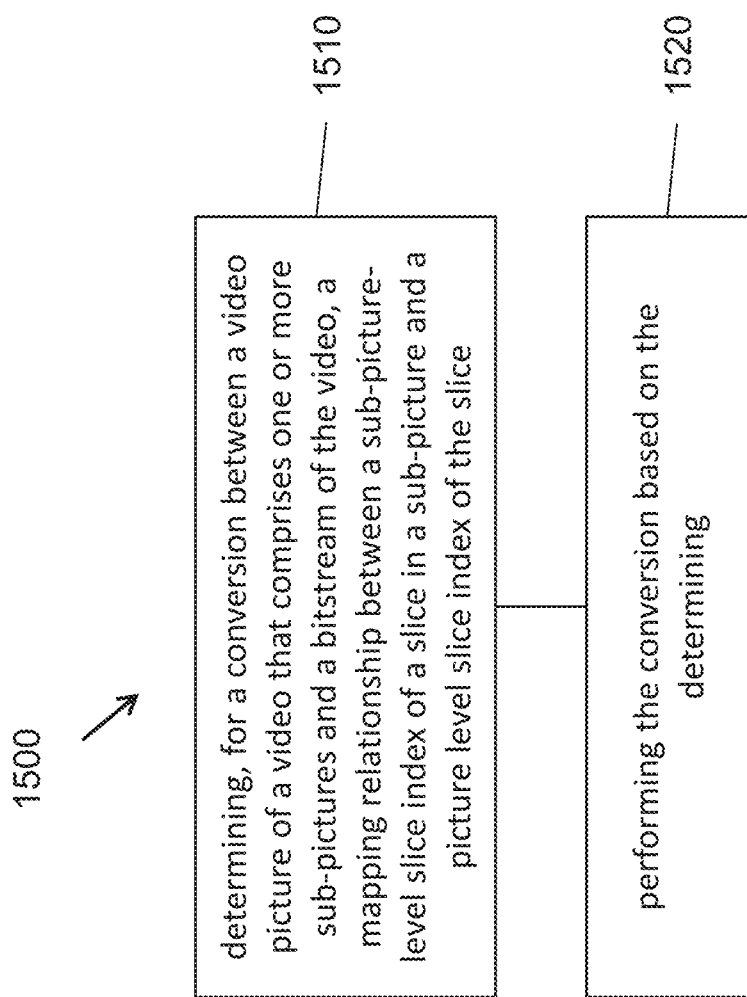
FIG. 15 is flowchart representation of another method for video processing according to various embodiments of the present disclosure.

FIG. 15 is flowchart representation of a method for video processing in accordance with the present technology. The method 1500 includes, at operation 1510, determining, for a conversion between a video picture of a video that comprises one or more sub-pictures and a bitstream of the video, a mapping relationship between a sub-picture-level slice index of a slice in a sub-picture and a picture level slice index of the slice. The method 1500 also includes, at operation 1520, performing the conversion based on the determining.

In some embodiments, the mapping relationship is represented as a two-dimensional array that is indexed using the picture-level slice index and a sub-picture index of the sub-picture. In some embodiments, the picture-level slice index is determined based on an array indicating a number of slices in each of the one or more sub-pictures. In some embodiments, the two-dimensional array and the array indicating the number of slices in each of the one or more sub-pictures are determined based on a process that scans all slices in an order of picture-level slice index. In some embodiments, the picture-level slice index of the slice is determined using the mapping relationship, and a number of coding tree blocks and/or addresses of the coding tree blocks in the slice are determined based on the picture-level slice index of the slice.

Figure 16:
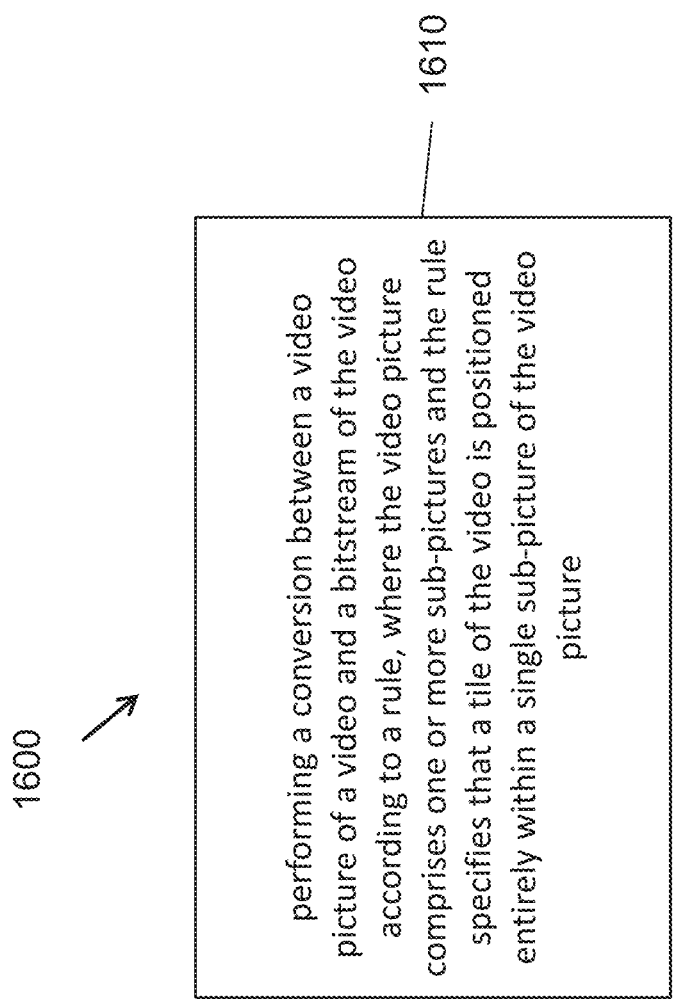
FIG. 16 is flowchart representation of another method for video processing according to various embodiments of the present disclosure.

FIG. 16 is flowchart representation of a method for video processing in accordance with the present technology. The method 1600 includes, at operation 1610, performing a conversion between a video picture of a video and a bitstream of the video according to a rule. The video picture comprises one or more sub-pictures. The rule specifies that a tile of the video is positioned entirely within a single sub-picture of the video picture.

In some embodiments, a first slice is located in a first tile, the first slice being smaller than the first tile. A second slice is located in a second tile, the second slice being smaller than the second tile. The first tile is different than the second tile, and the first slice and the second slice are located in different slices of a sub-picture.

Figure 17:
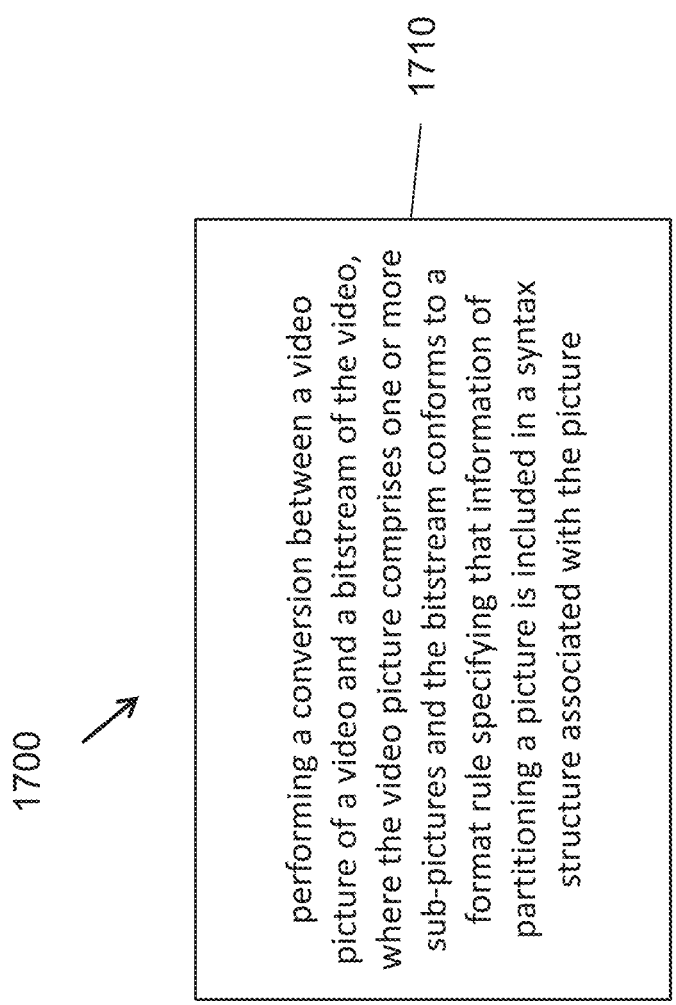
FIG. 17 is flowchart representation of another method for video processing according to various embodiments of the present disclosure.

FIG. 17 is flowchart representation of a method for video processing in accordance with the present technology. The method 1700 includes, at operation 1710, performing a conversion between a video picture of a video and a bitstream of the video. The video picture comprises one or more sub-pictures. The bitstream conforms to a format rule specifying that information of partitioning a picture is included in a syntax structure associated with the picture.

In some embodiments, the syntax structure comprises a picture header or a picture parameter set. In some embodiments, a video unit includes a flag indicating whether the information of partitioning a picture is included in the syntax structure. In some embodiments, the video unit comprises a picture header, a picture parameter set, or a sequence parameter set. In some embodiments, in case the information of partitioning a picture is included in both the picture header and the picture parameter set, the information included in the picture header is used for the conversion.

Figure 18:
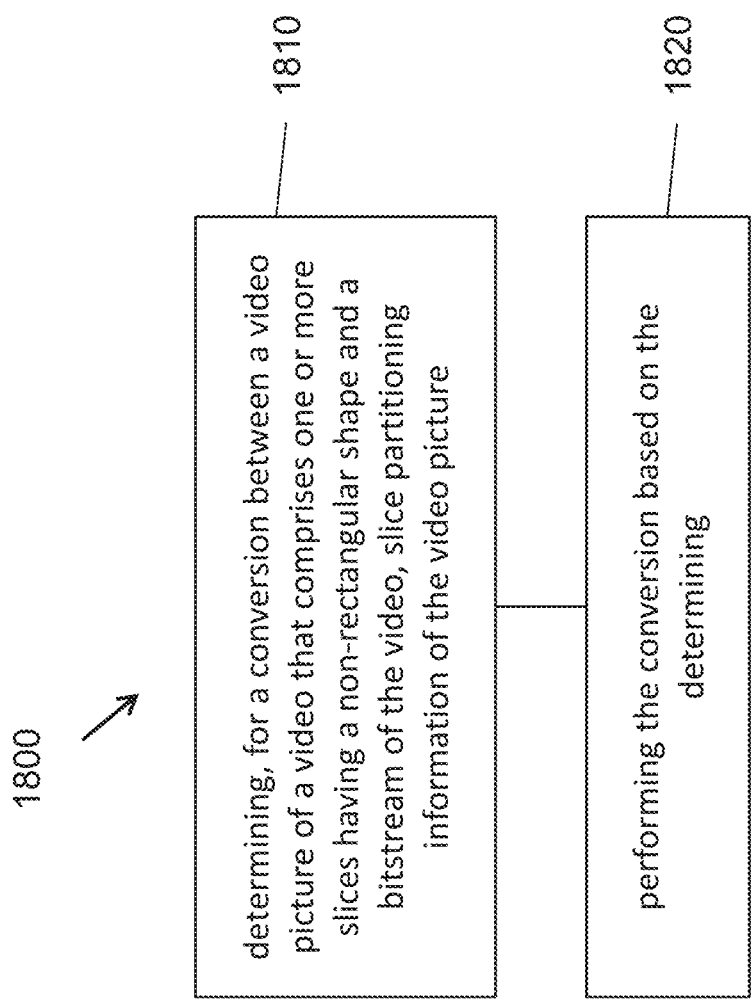
FIG. 18 is flowchart representation of another method for video processing according to various embodiments of the present disclosure.

FIG. 18 is flowchart representation of a method for video processing in accordance with the present technology. The method 1800 includes, at operation 1810, determining, for a conversion between a video picture of a video that comprises one or more slices having a non-rectangular shape and a bitstream of the video, slice partitioning information of the video picture. The method 1800 also includes, at operation 1820, performing the conversion based on the determining.

In some embodiments, the slice partitioning information is stored in a video unit of the video, and wherein the video unit comprises a picture parameter set or a picture header. In some embodiments, the bitstream conforms to a format rule specifying that the slice partitioning information of the video picture is included in a syntax structure associated with a video unit that includes the one or more slices. In some embodiments, the slice partitioning information of the video picture includes a value indicating a number of slices in a picture. In some embodiments, the slice partitioning information of the video picture comprises a value that indicates an index of a block-unit within a slice. In some embodiments, a value that indicates an index of a block-unit within a slice is omitted from the slice partitioning information of the video picture. In some embodiments, the slice partitioning information of the video picture comprises a value that indicates a number of block-units within a slice. In some embodiments, a value that indicates a number of block-units within a slice is omitted from the slice partitioning information of the video picture. In some embodiments, the block-unit is a coding tree unit or a tile. In some embodiments, the slice partitioning information of the video picture is omitted in a slice header. In some embodiments, a slice index of a slice is included in a slice header, and a picture-level slice index of the slice is determined based on an address of the slice.

In some embodiments, the slice partitioning information of each of the one or more slices is organized in an order in the syntax structure associated with the video unit. In some embodiments, the slice partitioning information of each of the one or more slices is included in the syntax structure in an ascending order. In some embodiments, the slice partitioning information of each of the one or more slices is included in the syntax structure in a descending order.

In some embodiments, the slice partitioning information of at least one of the one or more slices is omitted in the bitstream. In some embodiments, the slice partitioning information of the at least one of the one or more slices is inferred from slice partitioning information of other slices included in the bitstream. In some embodiments, a number of block-units for slice S−1 is not included in the bitstream, where S represent a number of slices in the video picture, S being greater than 1.

Figure 19:
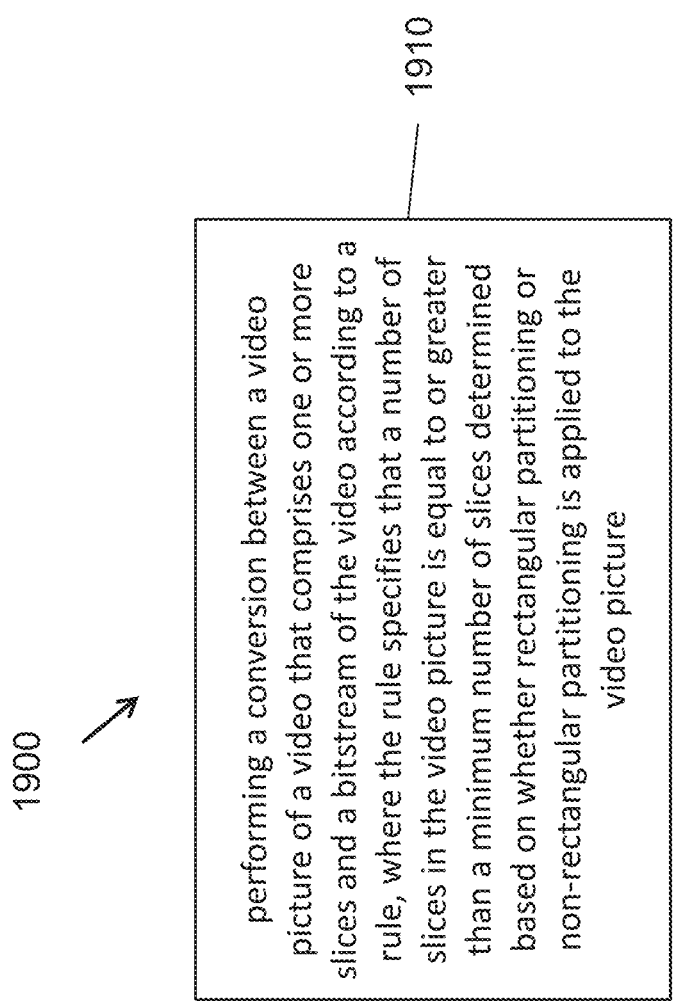
FIG. 19 is flowchart representation of another method for video processing according to various embodiments of the present disclosure.

FIG. 19 is flowchart representation of a method for video processing in accordance with the present technology. The method 1900 includes, at operation 1910, performing a conversion between a video picture of a video that comprises one or more slices and a bitstream of the video according to a rule. The rule specifies that a number of slices in the video picture is equal to or greater than a minimum number of slices determined based on whether rectangular partitioning or non-rectangular partitioning is applied to the video picture.

In some embodiments, the minimum number of slices is two in case the non-rectangular partitioning is applied, and the minimum number of slices is one in case the rectangular partitioning is applied. In some embodiments, the minimum number of slices is one in case the non-rectangular partitioning is applied, and the minimum number of slices is one in case the rectangular partitioning is applied. In some embodiments, the minimum number of slices is further determined based on a number of sub-pictures in the video picture.

Figure 20:
FIG. 20 is flowchart representation of another method for video processing according to various embodiments of the present disclosure.

FIG. 20 is flowchart representation of a method for video processing in accordance with the present technology. The method 2000 includes, at operation 2010, performing a conversion between a video picture of a video and a bitstream of the video according to a rule. The video picture comprises one or more slices. In case slice partitioning information of the video picture is included in a syntax structure of a video unit, a slice is represented by a top-left location and a dimension of the slice.

In some embodiments, the top-left location and the dimension of the slice are indicated using a top-left location of a block-unit that is within the slice, a dimension of the block-unit, and the dimension of the slice measured using the dimension of the block-unit. In some embodiments, a top-left location of each slice and a dimension of each slice is included in the syntax structure in an order.

Figure 21:
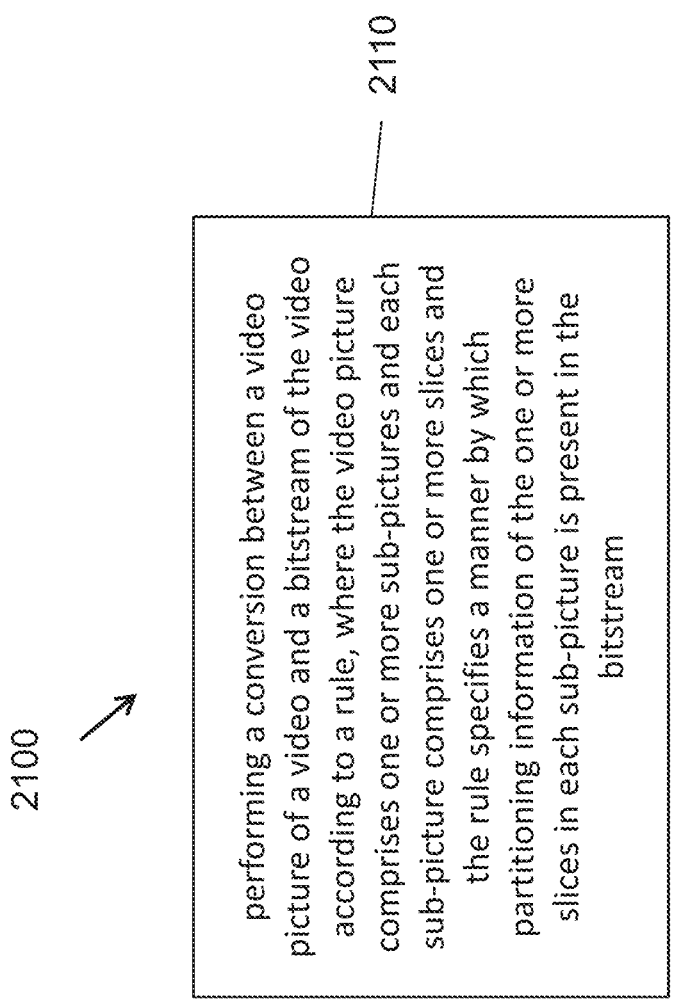
FIG. 21 is flowchart representation of another method for video processing according to various embodiments of the present disclosure.

FIG. 21 is flowchart representation of a method for video processing in accordance with the present technology. The method 2100 includes, at operation 2110, performing a conversion between a video picture of a video and a bitstream of the video according to a rule. The video picture comprises one or more sub-pictures and each sub-picture comprises one or more slices. The rule specifies a manner by which partitioning information of the one or more slices in each sub-picture is present in the bitstream.

In some embodiments, the video unit comprises a sequence parameter set, a picture parameter set, or a picture header. In some embodiments, the partitioning information of the one or more sub-pictures is arranged in an ascending order based on sub-picture indices. In some embodiments, the partitioning information of the one or more slices in each sub-picture is arranged in an ascending order based on sub-picture-level slice indices.

FIG. 22 is flowchart representation of a method for video processing in accordance with the present technology. The method 2200 includes, at operation 2210, performing a conversion between a video picture of a video and a bitstream of the video according to a rule. The video picture comprises one or more rectangular slices and each slice comprises one or more tiles. The rule specifies that signalling between a difference between a first tile index of a first tile in $i^{th}$ rectangular slice and a second tile index of a first tile in $(i+1)^{th}$ rectangular slice is omitted in the bitstream.

In some embodiments, the second tile index of the first tile in $(i+1)^{th}$ rectangular slice is derived based on rectangular slices indexed from $0^{th}$ to $i^{th}$. In some embodiments, the second tile index of the first tile in $(i+1)^{th}$ rectangular slice is derived to be a minimum tile index that is out of a range defined by rectangular slices indexed from $0^{th}$ to $i^{th}$.

Figure 23:
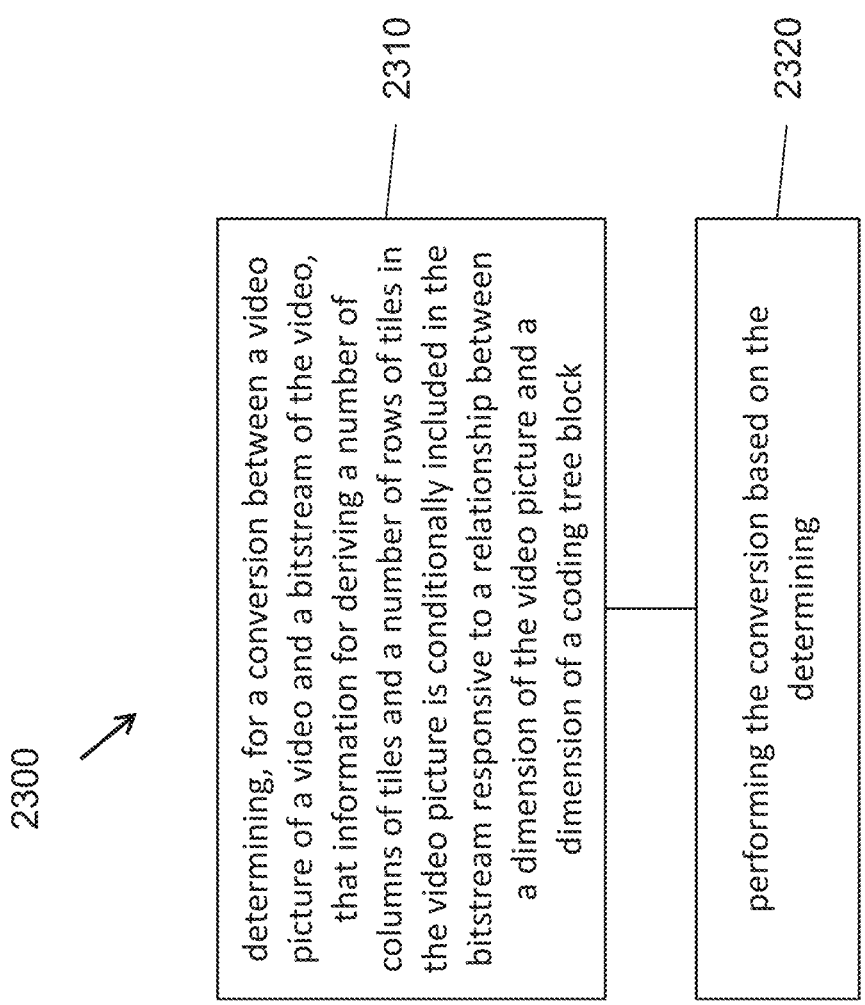
FIG. 23 is flowchart representation of another method for video processing according to various embodiments of the present disclosure.

FIG. 23 is flowchart representation of a method for video processing in accordance with the present technology. The method 2300 includes, at operation 2310, determining, for a conversion between a video picture of a video and a bitstream of the video, that information for deriving a number of columns of tiles and a number of rows of tiles in the video picture is conditionally included in the bitstream responsive to a relationship between a dimension of the video picture and a dimension of a coding tree block. The method 2300 also includes, at operation 2320, performing the conversion based on the determining.

In some embodiments, the information is omitted in case a width of the video picture is smaller than or equal to a width of the coding tree block. In some embodiments, the information is omitted in case a height of the video picture is smaller than or equal to a height of the coding tree block.

FIG. 24 is flowchart representation of a method for video processing in accordance with the present technology. The method 2400 includes, at operation 2410, performing a conversion between a video picture of a video and a bitstream of the video. The video picture comprises one or more sub-pictures. The bitstream conforms to a format rule specifying that, in case a variable that specifies a subpicture identifier of a subpicture that includes a slice is present in the bitstream, there is one and only one syntax element that satisfies a condition that a second variable corresponding to the syntax element is equal to the variable.

In some embodiments, the variable is represented as slice_subpic_id and the second variable is represented as SubpicIdVal. The syntax element corresponding to the syntax element is represented as SubpicIdVal[CurrSubpicIdx].

FIG. 25 is flowchart representation of a method for video processing in accordance with the present technology. The method 2500 includes, at operation 2510, performing a conversion between a video picture of a video and a bitstream of the video. The video picture comprises one or more sub-pictures. In case a non-rectangular partitioning is applied or sub-picture information is omitted in the bitstream, two tiles in a slice have different addresses.

In some embodiments, a first syntax flag rect_slice_flag indicates whether the non-rectangular partitioning is applied, and a second syntax flag subpic_info_present_info indicates whether the sub-picture information is present in the bitstream.

FIG. 26 is flowchart representation of a method for video processing in accordance with the present technology. The method 2600 includes, at operation 2610, performing a conversion between a video picture of a video and a bitstream of the video according to a rule. The video picture comprises one or more tiles. The rule specifies that a syntax element is used to indicate a type of tile layout in case the one or more tiles are organized in both uniform spacing and non-uniform spacing.

In some embodiments, the syntax element is included in a picture parameter set indicating whether uniform spacing is followed by non-uniform spacing or non-uniform spacing is followed by uniform spacing in the tile layout. In some embodiments, the tile layout includes non-uniformly spaced tiles and wherein a number of explicitly indicated tile columns or rows is equal to or greater than a total number of the non-uniformly spaced tiles. In some embodiments, the tile layout includes uniformly spaced tiles, and a number of explicitly indicated tile columns or rows is equal to or greater than a total number of the uniformly spaced tiles. In some embodiments, uniform spacing is followed by non-uniform spacing in the tile layout, dimensions of non-uniformly spaced tiles are determined first according to a first inverse order, and dimensions of uniformly spaced tiles are determined next according to a second inverse order. In some embodiments, the dimensions comprise widths of tile columns or heights of tile rows.

Figure 27:
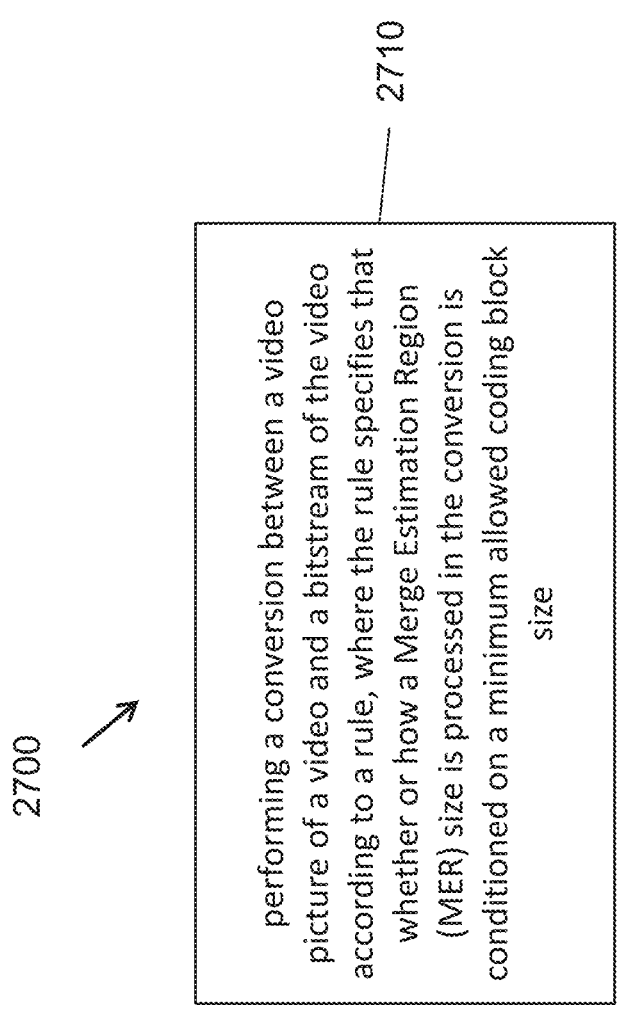
FIG. 27 is flowchart representation of another method for video processing according to various embodiments of the present disclosure.

FIG. 27 is flowchart representation of a method for video processing in accordance with the present technology. The method 2700 includes, at operation 2710, performing a conversion between a video picture of a video and a bitstream of the video according to a rule. The rule specifies that whether or how a Merge Estimation Region (MER) size is processed in the conversion is conditioned on a minimum allowed coding block size.

In some embodiments, the MER size is equal to or greater than the minimum allowed coding block size. In some embodiments, the MER size is indicated by MER_size and the minimum allowed coding block size is indicated by MinCbSizeY, and a difference between Log 2(MER_size) and Log 2(MinCbSizeY) is included in the bitstream.

Figure 28:
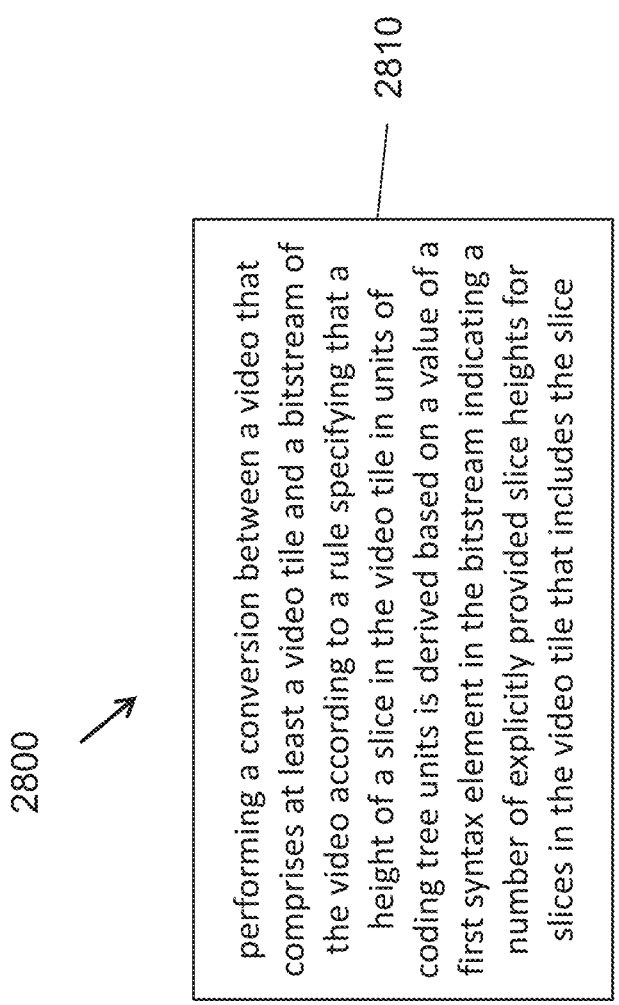
FIG. 28 is flowchart representation of another method for video processing according to various embodiments of the present disclosure.

FIG. 28 is flowchart representation of a method for video processing in accordance with the present technology. The method 2800 includes, at operation 2810, performing a conversion between a video that comprises at least a video tile and a bitstream of the video according to a rule. The rule specifies that a height of a slice in the video tile in units of coding tree units is derived based on a value of a first syntax element in the bitstream indicating a number of explicitly provided slice heights for slices in the video tile that includes the slice.

In some embodiments, the height of the slice in the video tile in units of coding tree units is derived from information for the video in response to the value of the first syntax element being equal to 0. In some embodiments, the height of the slice in the video tile in units of coding tree units is represented as sliceHeightInCtus [i]. sliceHeightInCtus [i] is equal to a value of a row height RowHeight [SliceTopLeftTileIdx [i]/NumTileColumns], where SliceTopLeftTileIdx specifies a tile index of a tile that includes a first coding tree unit in the slice and NumTileColumns specifies a number of tile columns, and the value of the row height RowHeight[j] specifies a height of a j-th tile row in units of coding tree blocks.

In some embodiments, the height of the slice in the video tile in units of coding tree units is derived from information for the video in response to the height for the slice in the video tile being not present in the bitstream. In some embodiments, the height of the slice in the video tile in units of coding tree units is derived according to a second syntax element present in the bitstream that indicates the height of the slice in the video tile. In some embodiments, in response to the first syntax element being equal to 0, the video tile that includes the slice is not split into multiple slices.

FIG. 29 is flowchart representation of a method for video processing in accordance with the present technology. The method 2900 includes, at operation 2910, performing a conversion between a video comprising a video picture comprising a video tile including one or more slices and a bitstream of the video according to a rule. The rule specifies that a second slice in a tile that includes a first slice in a picture has a height that is represented in a unit of coding tree units. The first slice has a first slice index, and the second slice has a second slice index that is determined based on the first slice index and a number of explicitly provided slice heights in the video tile. The height of the second slice is determined based on the first slice index and the second slice index.

In some embodiments, the first slice index is represented as i, and the second slice index is represented as (num_exp_slices_in_tile[i]−1), where num_exp_slices_in_tile specifies a number of explicitly provided slice heights in the video tile. The height of the second slice is determined based on exp_slice_height_in_ctus_minus1[i][num_exp_slices_in_tile[i]−1]+1, where exp_slice_height_in_ctus_minus1 specifies slice heights in the unit of coding tree units in the video tile. In some embodiments, a height of uniform slices that partition the video tile is indicated by a last entry of exp_slice_height_in_ctus_minus1. In some embodiments, the second slice always exists in the picture. In some embodiments, the height of the second slice is disallowed to be reset for the conversion. In some embodiments, a height of a third slice having an index greater than (num_exp_slices_in_tile[i] 1) is determined based on exp_slice_height_in_ctus_minus1[i][num_exp_slices_in_tile[i]−1]. In some embodiments, the second slice does not exist in the video tile. In some embodiments, the height of the second slice is smaller than or equal to exp_slice_height_in_ctus_minus1[i][num_exp_slices_in_tile[i] — 1]+1.

FIG. 30 is flowchart representation of a method for video processing in accordance with the present technology. The method 3000 includes, at operation 3010, performing a conversion between a video comprising a video picture including one or more tiles and a bitstream of the video. The video picture refers to a picture parameter set. The picture parameter set conforms to a format rule specifying that the picture parameter set includes a list of column widths for N tile columns, where N is an integer. An (N−1)-th tile column exists in the video picture and the (N−1)-th tile column has a width that is equal to an (N−1)-th entry in a list of explicitly included tile column widths plus one number of coding tree blocks.

In some embodiments, N−1 is represented as num_exp_tile_columns_minus1. In some embodiments, a width of the tile column in a unit of coding tree blocks is determined based on tile_column_width_minus1[num_exp_tile_columns_minus1]+1, where tile_column_width_minus1 specifies a width of a tile column in the unit of coding tree blocks. In some embodiments, the width of the tile column in the unit of coding tree blocks is disallowed to be reset and is determined solely based on tile_column_width_minus1[num_exp_tile_columns_minus1]. In some embodiments, the width of the tile column in the unit of coding tree blocks is equal to tile_column_width_minus1[num_exp_tile_columns_minus1]+1. In some embodiments, a width of a second tile column having an index that is greater than num_exp_tile_columns_minus1 is determined based on tile_column_width_minus1[num_exp_tile_columns_minus1].

FIG. 31 is flowchart representation of a method for video processing in accordance with the present technology. The method 3100 includes, at operation 3110, performing a conversion between a video comprising a video picture including one or more tiles and a bitstream of the video. The video picture refers to a picture parameter set. The picture parameter set conforms to a format rule specifying that the picture parameter set includes a list of row heights for N tile rows, where N is an integer. An (N−1)-th tile row exists in the video picture and the (N−1)-th tile row has a height that is equal to an (N−1)-th entry in a list of explicitly included tile row heights plus one number of coding tree blocks.

In some embodiments, N−1 is represented as num_exp_tile_rows_minus1. In some embodiments, a height of the tile row in a unit of coding tree blocks is determined based on tile_row_height_minus1[num_exp_tile_row_minus1]+1, where tile_row_height_minus1 specifies a height of a tile row in the unit of coding tree blocks. In some embodiments, the height of the tile row in the unit of coding tree blocks is disallowed to be reset and is determined solely based on tile_row_height_minus1[num_exp_tile_row_minus1]. In some embodiments, the height of the tile row in the unit of coding tree blocks is equal to tile_row_height_minus1[num_exp_tile_row_minus1]+1. In some embodiments, a height of a second tile row having an index that is greater than num_exp_tile_rows_minus1 is determined based on tile_row_height_minus1[num_exp_tile_row_minus1].

In some embodiments, the conversion includes encoding the video into the bitstream. In some embodiments, the conversion includes decoding the video from the bitstream.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically EPROM (EEPROM), and flash memory devices; magnetic disks, e.g., internal hard disks or removable disks; magneto optical disks; and compact disc read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
determining, for a conversion between a video comprising a video picture and a bitstream of the video, a scanning process is applied to the video picture, wherein the video picture is partitioned into one or more tiles, one or more slices, and a plurality of coding tree units CTUs;
determining, in the scanning process, whether a height of a first slice in a video tile comprising the first slice in units of CTUs is derived or is included in the bitstream based on a value of a first syntax element corresponding to the first slice; and
performing the conversion based on the determining,
wherein the first syntax element is included in a picture parameter set in the bitstream in response to a set of conditions being satisfied,
wherein the set of conditions comprises that the first slice is in a rectangular mode, a value of a syntax element specifying a difference between a width of the first slice in units of tile columns and 1 is equal to 0, and a value of a syntax element specifying a difference between a height of the first slice in units of tile rows and 1 is equal to 0, and
wherein the height of the first slice is derived for the video in response to the value of the first syntax element being a first value.

2. The method of claim 1, wherein when the first syntax element is not present in the bitstream, the first syntax element is inferred to have the first value.

3. The method of claim 1, wherein when the value of the first syntax element is the first value, the height of the first slice is equal to RowHeight [TileIdx/NumTileColumns],
where RowHeight[j] specifies a height of a j-th tile row in units of coding tree blocks,
where TileIdx specifies a tile index of a tile containing a first CTU in the first slice, and
where NumTileColumns specifies a number of tile columns.

4. The method of claim 1, wherein when the first syntax element has a value of N different from the first value, N second syntax elements specifying values of heights of slices in the video tile containing the first slice in units of CTU rows are included in the picture parameter set of the bitstream, respectively.

5. The method of claim 1, wherein the scanning process is applied to the video picture when a syntax element indicating a count of rectangular slices in the video picture is equal to 0, or
wherein the scanning process is applied to the video picture when a value of a second syntax element, which plus 1, specifies that the width of the first slice in units of tile columns is equal to 0 and a value of a third syntax element, which plus 1, specifies the height of the first slice in units of tile rows is equal to 0.

6. The method of claim 1, wherein the conversion includes encoding the video into the bitstream.

7. The method of claim 1, wherein the conversion includes decoding the video from the bitstream.

8. An apparatus for processing video data comprising a processor and a non-transitory memory with instructions thereon, wherein the instructions upon execution by the processor, cause the processor to:
determine, for a conversion between a video comprising a video picture and a bitstream of the video, a scanning process is applied to the video picture, wherein the video picture is partitioned into one or more tiles, one or more slices, and multiple coding tree units (CTUs);
determine, in the scanning process, whether a height of a first slice in a video tile containing the first slice in units of CTUs is derived or is included in the bitstream based on a value of a first syntax element corresponding to the first slice; and
perform the conversion based on the determining,
wherein the first syntax element is included in a picture parameter set in the bitstream in response to a set of conditions being satisfied,
wherein the set of conditions comprises that the first slice is in a rectangular mode, a value of a syntax element specifying a difference between a width of the first slice in units of tile columns and 1 is equal to 0, and a value of a syntax element specifying a difference between a height of the first slice in units of tile rows and 1 is equal to 0, and
wherein the height of the first slice is derived for the video in response to the value of the first syntax element being a first value.

9. The apparatus of claim 8, wherein when the first syntax element is not present in the bitstream, the first syntax element is inferred to have the first value.

10. The apparatus of claim 8, wherein when the value of the first syntax element is the first value, the height of the first slice is equal to RowHeight [TileIdx/NumTileColumns],
where RowHeight[j] specifies a height of a j-th tile row in units of coding tree blocks,
where TileIdx specifies a tile index of a tile containing a first CTU in the first slice, and
where NumTileColumns specifies a number of tile columns.

11. The apparatus of claim 8, wherein when the first syntax element has a value of N different from the first value, N second syntax elements specifying values of heights of slices in the video tile containing the first slice in units of CTU rows are included in the picture parameter set of the bitstream, respectively.

12. The apparatus of claim 8, wherein the scanning process is applied to the video picture when a syntax element indicating a count of rectangular slices in the video picture is equal to 0, or
wherein the scanning process is applied to the video picture when a value of a second syntax element, which plus 1, specifies that the width of the first slice in units of tile columns is equal to 0 and a value of a third syntax element, which plus 1, specifies that the height of the first slice in units of tile rows is equal to 0.

13. A non-transitory computer-readable storage medium storing instructions that cause a processor to:
determine, for a conversion between a video comprising a video picture and a bitstream of the video, a scanning process is applied to the video picture, wherein the video picture is partitioned into one or more tiles, one or more slices, and a plurality of coding tree units (CTUs);
determine, in the scanning process, whether a height of a first slice in a video tile comprising the first slice in units of CTUs is derived or is included in the bitstream based on a value of a first syntax element corresponding to the first slice; and
perform the conversion based on the determining, wherein the first syntax element is included in a picture parameter set in the bitstream in response to a set of conditions being satisfied, wherein the set of conditions comprises that the first slice is in a rectangular mode, a value of a syntax element specifying a difference between a width of the first slice in units of tile columns and 1 is equal to 0, and a value of a syntax element specifying a difference between a height of the first slice in units of tile rows and 1 is equal to 0, and wherein the height of the first slice is derived for the video in response to the value of the first syntax element being a first value.

14. The non-transitory computer-readable storage medium of claim 13, wherein when the first syntax element is not present in the bitstream, the first syntax element is inferred to have the first value.

15. The non-transitory computer-readable storage medium of claim 13, wherein when the value of the first syntax element is the first value, the height of the first slice is equal to RowHeight [TileIdx/NumTileColumns], where RowHeight[j] specifies a height of a j-th tile row in units of coding tree blocks, where TileIdx specifies a tile index of a tile containing a first CTU in the first slice, and where NumTileColumns specifies a number of tile columns.

16. The non-transitory computer-readable storage medium of claim 13, wherein when the first syntax element has a value of N different from the first value, N second syntax elements specifying values of heights of slices in the video tile containing the first slice in units of CTU rows are included in the picture parameter set of the bitstream, respectively.

17. The non-transitory computer-readable storage medium of claim 13, wherein the scanning process is applied to the video picture when a syntax element indicating a count of rectangular slices in the video picture is equal to 0, or wherein the scanning process is applied to the video picture when a value of a second syntax element, which plus 1, specifies that the width of the first slice in units of tile columns is equal to 0 and a value of a third syntax element, which plus 1, specifies that the height of the first slice in units of tile rows is equal to 0.

18. A non-transitory computer-readable recording medium storing a bitstream of a video which is generated by a method performed by a video processing apparatus, wherein the method comprises:

determining, for a video comprising a video picture, a scanning process is applied to the video picture, wherein the video picture is partitioned into one or more tiles, one or more slices, and a plurality of coding tree units (CTUs);

determining, in the scanning process, whether a height of a first slice in a video tile comprising the first slice in units of CTUs is derived or is included in the bitstream based on a value of a first syntax element corresponding to the first slice; and generating the bitstream based on the determining, wherein the first syntax element is included in a picture parameter set in the bitstream in response to a set of conditions being satisfied, wherein the set of conditions comprises that the first slice is in a rectangular mode, a value of a syntax element specifying a difference between a width of the first slice in units of tile columns and 1 is equal to 0, and a value of a syntax element specifying a difference between a height of the first slice in units of tile rows and 1 is equal to 0, and wherein the height of the first slice is derived for the video in response to the value of the first syntax element being a first value.

19. The non-transitory computer-readable recording medium of claim 18, wherein when the first syntax element is not present in the bitstream, the first syntax element is inferred to have the first value.

20. The non-transitory computer-readable recording medium of claim 18, wherein when the value of the first syntax element is the first value, the height of the first slice is equal to RowHeight [TileIdx/NumTileColumns], where RowHeight[j] specifies a height of a j-th tile row in units of coding tree blocks, where TileIdx specifies a tile index of a tile containing a first CTU in the first slice, and where NumTileColumns specifies a number of tile columns.

* * * * *